(12) United States Patent
Shutzberg et al.

(10) Patent No.: US 12,118,200 B1
(45) Date of Patent: Oct. 15, 2024

(54) FUZZY HIT TESTING

(71) Applicant: Apple Inc., Cupertino, CA (US)

(72) Inventors: Julian K Shutzberg, San Francisco, CA (US); David M Teitelbaum, San Francisco, CA (US); Chase B Lortie, San Francisco, CA (US); David J Meyer, Menlo Park, CA (US); Lorenzo Soto Doblado, Madrid (ES)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/375,260

(22) Filed: Sep. 29, 2023

Related U.S. Application Data

(60) Provisional application No. 63/470,608, filed on Jun. 2, 2023.

(51) Int. Cl.
| | |
|---|---|
| *G06F 3/0487* | (2013.01) |
| *G06F 3/01* | (2006.01) |
| *G06F 3/04815* | (2022.01) |
| *G06F 3/04842* | (2022.01) |

(52) U.S. Cl.
CPC ............ *G06F 3/0487* (2013.01); *G06F 3/013* (2013.01); *G06F 3/04815* (2013.01); *G06F 3/04842* (2013.01); *G06F 2203/04804* (2013.01)

(58) Field of Classification Search
CPC .... G06F 3/0487; G06F 3/013; G06F 3/04815; G06F 3/04842; G06F 2203/04804
See application file for complete search history.

(56) References Cited

U.S. PATENT DOCUMENTS

| | | |
|---|---|---|
| 1,173,824 A | 2/1916 | McKee |
| 5,515,488 A | 5/1996 | Hoppe |
| 5,524,195 A | 6/1996 | Clanton, III |

(Continued)

FOREIGN PATENT DOCUMENTS

| | | |
|---|---|---|
| CA | 3033344 A1 | 2/2018 |
| CN | 104714771 A | 6/2015 |

(Continued)

OTHER PUBLICATIONS

European Patent Office, International Search Report issued Dec. 21, 2021, which pertains to PCT Application No. PCT/US2021/049131, filed Sep. 3, 2021. 4 pgs.

(Continued)

*Primary Examiner* — Afroza Chowdhury
(74) *Attorney, Agent, or Firm* — Thompson Hine LLP

(57) ABSTRACT

Various implementations disclosed herein include devices, systems, and methods that associate user activities with user interface (UI) elements within a 3D environment. Some implementations do so in ways that account for inaccuracies (i.e., fuzziness) in sensor-based detection of the user activities, e.g., inaccuracy in sensor data-based gaze tracking or sensor data-based hand/joint position. Some implementations use a sampling technique to associate user activity in a 3D environment with an appropriate portion of a UI positioned within a 3D environment. For example, a sampling technique may be used to identify sample locations within the 3D environment (e.g., sample locations around a gaze direction) to evaluate and ultimately select from to associate with a user activity, e.g., associating a particular UI button with a gaze direction.

25 Claims, 12 Drawing Sheets

(56) References Cited

U.S. PATENT DOCUMENTS

| | | |
|---|---|---|
| 5,610,828 A | 3/1997 | Kodosky |
| 5,737,553 A | 4/1998 | Bartok |
| 5,740,440 A | 4/1998 | West |
| 5,751,287 A | 5/1998 | Hahn |
| 5,758,122 A | 5/1998 | Corda |
| 5,794,178 A | 8/1998 | Caid |
| 5,877,766 A | 3/1999 | Bates |
| 5,900,849 A | 5/1999 | Gallery |
| 5,933,143 A | 8/1999 | Kobayashi |
| 5,990,886 A | 11/1999 | Serdy |
| 6,061,060 A | 5/2000 | Berry |
| 6,108,004 A | 8/2000 | Medl |
| 6,112,015 A | 8/2000 | Planas |
| 6,154,559 A | 11/2000 | Beardsley |
| 6,456,296 B1 | 9/2002 | Cataudella |
| 6,584,465 B1 | 6/2003 | Zhu |
| 6,756,997 B1 | 6/2004 | Ward, III |
| 7,035,903 B1 | 4/2006 | Baldonado |
| 7,137,074 B1 | 11/2006 | Newton |
| 7,230,629 B2 | 6/2007 | Reynolds |
| 8,793,620 B2 | 7/2014 | Stafford |
| 8,803,873 B2 | 8/2014 | Yoo |
| 8,947,323 B1 | 2/2015 | Raffle |
| 8,970,478 B2 | 3/2015 | Johansson |
| 8,970,629 B2 | 3/2015 | Kim |
| 8,994,718 B2 | 3/2015 | Latta |
| 9,007,301 B1 | 4/2015 | Raffle |
| 9,185,062 B1 | 11/2015 | Yang |
| 9,201,500 B2 | 12/2015 | Srinivasan |
| 9,256,785 B2 | 2/2016 | Qvarfordt |
| 9,400,559 B2 | 7/2016 | Latta |
| 9,448,635 B2 | 9/2016 | MacDougall |
| 9,465,479 B2 | 10/2016 | Cho |
| 9,526,127 B1 | 12/2016 | Taubman |
| 9,563,331 B2 | 2/2017 | Poulos |
| 9,575,559 B2 | 2/2017 | Andrysco |
| 9,681,112 B2 | 6/2017 | Son |
| 9,684,372 B2 | 6/2017 | Xun |
| 9,734,402 B2 | 8/2017 | Jang |
| 9,778,814 B2 | 10/2017 | Ambrus |
| 9,851,866 B2 | 12/2017 | Goossens |
| 9,886,087 B1 | 2/2018 | Wald |
| 9,933,833 B2 | 4/2018 | Tu |
| 9,934,614 B2 | 4/2018 | Ramsby |
| 10,049,460 B2 | 8/2018 | Romano |
| 10,203,764 B2 | 2/2019 | Katz |
| 10,307,671 B2 | 6/2019 | Barney |
| 10,353,532 B1 | 7/2019 | Holz |
| 10,394,320 B2 | 8/2019 | George-Svahn |
| 10,534,439 B2 | 1/2020 | Raffa |
| 10,664,048 B2 | 5/2020 | Cieplinski |
| 10,664,050 B2 | 5/2020 | Alcaide |
| 10,699,488 B1 | 6/2020 | Terrano |
| 10,732,721 B1 | 8/2020 | Clements |
| 10,754,434 B2 | 8/2020 | Hall |
| 10,768,693 B2 | 9/2020 | Powderly |
| 10,861,242 B2 | 12/2020 | Lacey |
| 10,890,967 B2 | 1/2021 | Stellmach |
| 10,956,724 B1 | 3/2021 | Terrano |
| 10,983,663 B2 | 4/2021 | Iglesias |
| 11,055,920 B1 | 7/2021 | Bramwell |
| 11,112,875 B1 | 9/2021 | Zhou |
| 11,199,898 B2 | 12/2021 | Blume |
| 11,200,742 B1 | 12/2021 | Post |
| 11,262,840 B2 | 3/2022 | Bychkov et al. |
| 11,294,472 B2 | 4/2022 | Tang |
| 11,294,475 B1 | 4/2022 | Pinchon |
| 11,340,756 B2 | 5/2022 | Faulkner |
| 11,348,300 B2 | 5/2022 | Zimmermann |
| 11,461,973 B2 | 10/2022 | Pinchon |
| 11,573,363 B2 | 2/2023 | Zou |
| 11,573,631 B2 | 2/2023 | Cederlund et al. |
| 11,574,452 B2 | 2/2023 | Berliner |
| 11,720,171 B2 | 8/2023 | Pastrana Vicente |
| 11,726,577 B2 | 8/2023 | Katz |
| 11,733,824 B2 | 8/2023 | Iskandar |
| 2001/0047250 A1 | 11/2001 | Schuller |
| 2002/0044152 A1 | 4/2002 | Abbott |
| 2003/0151611 A1 | 8/2003 | Turpin |
| 2003/0222924 A1 | 12/2003 | Baron |
| 2004/0059784 A1 | 3/2004 | Caughey |
| 2004/0243926 A1 | 12/2004 | Trenbeath |
| 2005/0100210 A1 | 5/2005 | Rice |
| 2005/0138572 A1 | 6/2005 | Good |
| 2005/0144570 A1 | 6/2005 | Loverin |
| 2005/0144571 A1 | 6/2005 | Loverin |
| 2005/0198143 A1 | 9/2005 | Moody |
| 2006/0080702 A1 | 4/2006 | Diez |
| 2006/0283214 A1 | 12/2006 | Donadon |
| 2008/0211771 A1 | 9/2008 | Richardson |
| 2009/0064035 A1 | 3/2009 | Shibata |
| 2009/0231356 A1 | 9/2009 | Barnes |
| 2010/0097375 A1 | 4/2010 | Tadaishi |
| 2010/0188503 A1 | 7/2010 | Tsai |
| 2011/0018895 A1 | 1/2011 | Buzyn |
| 2011/0018896 A1 | 1/2011 | Buzyn |
| 2011/0216060 A1 | 9/2011 | Weising |
| 2011/0254865 A1 | 10/2011 | Yee |
| 2011/0310001 A1 | 12/2011 | Madau |
| 2012/0113223 A1 | 5/2012 | Hilliges |
| 2012/0170840 A1 | 7/2012 | Caruso |
| 2012/0218395 A1 | 8/2012 | Andersen |
| 2012/0257035 A1 | 10/2012 | Larsen |
| 2013/0127850 A1 | 5/2013 | Bindon |
| 2013/0154913 A1 | 6/2013 | Genc et al. |
| 2013/0211843 A1 | 8/2013 | Clarkson |
| 2013/0229345 A1 | 9/2013 | Day |
| 2013/0271397 A1 | 10/2013 | MacDougall |
| 2013/0278501 A1 | 10/2013 | Bulzacki |
| 2013/0283213 A1 | 10/2013 | Guendelman et al. |
| 2013/0286004 A1 | 10/2013 | McCulloch |
| 2013/0307775 A1 | 11/2013 | Raynor |
| 2013/0326364 A1 | 12/2013 | Latta |
| 2013/0342564 A1 | 12/2013 | Kinnebrew |
| 2013/0342570 A1 | 12/2013 | Kinnebrew |
| 2014/0002338 A1 | 1/2014 | Raffa |
| 2014/0028548 A1 | 1/2014 | Bychkov |
| 2014/0075361 A1 | 3/2014 | Reynolds |
| 2014/0108942 A1 | 4/2014 | Freeman |
| 2014/0125584 A1 | 5/2014 | Xun |
| 2014/0184644 A1 | 7/2014 | Sharma |
| 2014/0198017 A1 | 7/2014 | Lamb |
| 2014/0258942 A1 | 9/2014 | Kutliroff |
| 2014/0282272 A1 | 9/2014 | Kies |
| 2014/0320404 A1 | 10/2014 | Kasahara |
| 2014/0347391 A1 | 11/2014 | Keane |
| 2015/0035822 A1 | 2/2015 | Arsan |
| 2015/0035832 A1 | 2/2015 | Sugden |
| 2015/0067580 A1 | 3/2015 | Um |
| 2015/0123890 A1 | 5/2015 | Kapur |
| 2015/0153833 A1 | 6/2015 | Pinault et al. |
| 2015/0177937 A1 | 6/2015 | Poletto |
| 2015/0187093 A1 | 7/2015 | Chu |
| 2015/0205106 A1 | 7/2015 | Norden |
| 2015/0220152 A1 | 8/2015 | Tait |
| 2015/0242095 A1 | 8/2015 | Sonnenberg |
| 2015/0317832 A1 | 11/2015 | Ebstyne |
| 2015/0331576 A1 | 11/2015 | Piya |
| 2015/0332091 A1 | 11/2015 | Kim |
| 2015/0370323 A1 | 12/2015 | Cieplinski |
| 2016/0015470 A1 | 1/2016 | Border |
| 2016/0018898 A1 | 1/2016 | Tu |
| 2016/0018900 A1 | 1/2016 | Tu |
| 2016/0026242 A1 | 1/2016 | Burns |
| 2016/0026253 A1 | 1/2016 | Bradski |
| 2016/0062636 A1 | 3/2016 | Jung |
| 2016/0093108 A1 | 3/2016 | Mao |
| 2016/0098094 A1 | 4/2016 | Minkkinen |
| 2016/0171304 A1 | 6/2016 | Golding |
| 2016/0196692 A1 | 7/2016 | Kjallstrom |
| 2016/0239080 A1 | 8/2016 | Marcolina et al. |
| 2016/0253063 A1 | 9/2016 | Critchlow |
| 2016/0253821 A1 | 9/2016 | Romano |
| 2016/0275702 A1 | 9/2016 | Reynolds |

(56) References Cited

U.S. PATENT DOCUMENTS

| | | |
|---|---|---|
| 2016/0306434 A1 | 10/2016 | Ferrin |
| 2016/0313890 A1 | 10/2016 | Walline |
| 2016/0379409 A1 | 12/2016 | Gavriliuc |
| 2017/0038829 A1 | 2/2017 | Lanier |
| 2017/0038837 A1 | 2/2017 | Faaborg |
| 2017/0038849 A1 | 2/2017 | Hwang |
| 2017/0039770 A1 | 2/2017 | Lanier |
| 2017/0060230 A1 | 3/2017 | Faaborg |
| 2017/0123487 A1 | 5/2017 | Hazra |
| 2017/0131964 A1 | 5/2017 | Baek |
| 2017/0132694 A1 | 5/2017 | Damy |
| 2017/0132822 A1 | 5/2017 | Marschke |
| 2017/0153866 A1 | 6/2017 | Grinberg |
| 2017/0206691 A1 | 7/2017 | Harrises et al. |
| 2017/0228130 A1 | 8/2017 | Palmaro |
| 2017/0285737 A1 | 10/2017 | Khalid |
| 2017/0315715 A1 | 11/2017 | Fujita |
| 2017/0344223 A1 | 11/2017 | Holzer |
| 2017/0358141 A1 | 12/2017 | Stafford |
| 2018/0045963 A1 | 2/2018 | Hoover et al. |
| 2018/0059928 A1 | 3/2018 | Westerman et al. |
| 2018/0075658 A1 | 3/2018 | Lanier |
| 2018/0081519 A1 | 3/2018 | Kim |
| 2018/0095634 A1 | 4/2018 | Alexander |
| 2018/0095635 A1 | 4/2018 | Valdivia |
| 2018/0101223 A1 | 4/2018 | Ishihara |
| 2018/0114364 A1 | 4/2018 | McPhee |
| 2018/0150997 A1 | 5/2018 | Austin |
| 2018/0158222 A1 | 6/2018 | Hayashi |
| 2018/0181199 A1 | 6/2018 | Harvey |
| 2018/0188802 A1 | 7/2018 | Okumura |
| 2018/0210628 A1 | 7/2018 | McPhee |
| 2018/0239144 A1 | 8/2018 | Woods |
| 2018/0300023 A1 | 10/2018 | Hein |
| 2018/0315248 A1 | 11/2018 | Bastov |
| 2018/0322701 A1 | 11/2018 | Pahud |
| 2018/0348861 A1 | 12/2018 | Uscinski |
| 2019/0034076 A1 | 1/2019 | Vinayak |
| 2019/0050062 A1 | 2/2019 | Chen |
| 2019/0080572 A1 | 3/2019 | Kim |
| 2019/0088149 A1 | 3/2019 | Fink |
| 2019/0094979 A1 | 3/2019 | Hall |
| 2019/0101991 A1 | 4/2019 | Brennan |
| 2019/0130633 A1 | 5/2019 | Haddad |
| 2019/0146128 A1 | 5/2019 | Cao |
| 2019/0204906 A1 | 7/2019 | Ross |
| 2019/0227763 A1 | 7/2019 | Kaufthal |
| 2019/0258365 A1 | 8/2019 | Zurmoehle |
| 2019/0310757 A1 | 10/2019 | Lee |
| 2019/0324529 A1 | 10/2019 | Stellmach |
| 2019/0339770 A1 | 11/2019 | Kurlethimar |
| 2019/0362557 A1 | 11/2019 | Lacey |
| 2019/0371072 A1 | 12/2019 | Lindberg |
| 2019/0377487 A1 | 12/2019 | Bailey |
| 2019/0379765 A1 | 12/2019 | Fajt |
| 2019/0384406 A1 | 12/2019 | Smith |
| 2020/0004401 A1 | 1/2020 | Hwang |
| 2020/0043243 A1 | 2/2020 | Bhushan |
| 2020/0082602 A1 | 3/2020 | Jones |
| 2020/0089314 A1 | 3/2020 | Poupyrev |
| 2020/0098140 A1 | 3/2020 | Jagnow |
| 2020/0098173 A1 | 3/2020 | McCall |
| 2020/0117213 A1 | 4/2020 | Tian |
| 2020/0159017 A1 | 5/2020 | Lin |
| 2020/0225747 A1 | 7/2020 | Bar-Zeev |
| 2020/0225830 A1 | 7/2020 | Tang |
| 2020/0226814 A1 | 7/2020 | Tang |
| 2020/0356221 A1 | 11/2020 | Behzadi |
| 2020/0357374 A1 | 11/2020 | Verweij |
| 2020/0387228 A1 | 12/2020 | Ravasz |
| 2021/0064142 A1 | 3/2021 | Stern et al. |
| 2021/0074062 A1 | 3/2021 | Madonna |
| 2021/0090337 A1 | 3/2021 | Ravasz |
| 2021/0096726 A1 | 4/2021 | Faulkner |
| 2021/0141525 A1 | 5/2021 | Piemonte et al. |
| 2021/0191600 A1 | 6/2021 | Lemay |
| 2021/0295602 A1 | 9/2021 | Scapel |
| 2021/0303074 A1 | 9/2021 | Vanblon |
| 2021/0319617 A1 | 10/2021 | Ahn |
| 2021/0327140 A1 | 10/2021 | Rothkopf |
| 2021/0339134 A1 | 11/2021 | Knoppert |
| 2021/0350564 A1 | 11/2021 | Peuhkurinen |
| 2021/0357073 A1 | 11/2021 | Kandadai et al. |
| 2021/0374443 A1* | 12/2021 | Edwards ............... G06V 40/19 |
| 2021/0375022 A1 | 12/2021 | Lee |
| 2022/0011855 A1 | 1/2022 | Hazra |
| 2022/0030197 A1 | 1/2022 | Ishimoto |
| 2022/0083197 A1 | 3/2022 | Rockel |
| 2022/0092862 A1 | 3/2022 | Faulkner |
| 2022/0101593 A1 | 3/2022 | Rockel |
| 2022/0101612 A1 | 3/2022 | Palangie |
| 2022/0104910 A1 | 4/2022 | Shelton, IV |
| 2022/0121344 A1 | 4/2022 | Pastrana Vicente |
| 2022/0137705 A1 | 5/2022 | Hashimoto |
| 2022/0157083 A1 | 5/2022 | Jandhyala |
| 2022/0187907 A1 | 6/2022 | Lee |
| 2022/0191570 A1 | 6/2022 | Reid |
| 2022/0229524 A1 | 7/2022 | McKenzie |
| 2022/0229534 A1 | 7/2022 | Terre |
| 2022/0236795 A1 | 7/2022 | Jonker |
| 2022/0245888 A1 | 8/2022 | Singh |
| 2022/0253149 A1 | 8/2022 | Berliner |
| 2022/0276720 A1 | 9/2022 | Yasui |
| 2022/0326837 A1 | 10/2022 | Dessero |
| 2022/0413691 A1 | 12/2022 | Becker |
| 2023/0004216 A1 | 1/2023 | Rodgers |
| 2023/0008537 A1 | 1/2023 | Henderson |
| 2023/0068660 A1 | 3/2023 | Brent |
| 2023/0069764 A1 | 3/2023 | Renee |
| 2023/0074080 A1 | 3/2023 | Miller |
| 2023/0093979 A1 | 3/2023 | Stauber |
| 2023/0133579 A1 | 5/2023 | Yuhu |
| 2023/0152935 A1 | 5/2023 | McKenzie |
| 2023/0154122 A1 | 5/2023 | Dascola |
| 2023/0163987 A1 | 5/2023 | Young |
| 2023/0168788 A1 | 6/2023 | Faulkner |
| 2023/0185426 A1 | 6/2023 | Philipp |
| 2023/0186577 A1 | 6/2023 | Philipp |
| 2023/0244316 A1 | 8/2023 | Schwarz |
| 2023/0244857 A1 | 8/2023 | Weiss |
| 2023/0273706 A1 | 8/2023 | Smith |
| 2023/0274504 A1 | 8/2023 | Ren |
| 2023/0315385 A1 | 10/2023 | Akmal |
| 2023/0316634 A1 | 10/2023 | Shih-Sang |
| 2023/0325004 A1 | 10/2023 | Burns |
| 2023/0350539 A1 | 11/2023 | Owen |
| 2023/0384907 A1 | 11/2023 | Boesel |
| 2024/0086031 A1 | 3/2024 | Palangie |
| 2024/0086032 A1 | 3/2024 | Palangie |
| 2024/0087256 A1 | 3/2024 | Hylak |
| 2024/0094863 A1 | 3/2024 | Smith |
| 2024/0095984 A1 | 3/2024 | Ren |
| 2024/0103613 A1 | 3/2024 | Chawda |
| 2024/0103684 A1 | 3/2024 | Yu |
| 2024/0103707 A1 | 3/2024 | Henderson |
| 2024/0104836 A1 | 3/2024 | Dessero |
| 2024/0104877 A1 | 3/2024 | Henderson |
| 2024/0111479 A1 | 4/2024 | Paul |

FOREIGN PATENT DOCUMENTS

| | | |
|---|---|---|
| CN | 105264461 A | 1/2016 |
| CN | 105264478 A | 1/2016 |
| CN | 108633307 A | 10/2018 |
| CN | 110476142 A | 11/2019 |
| CN | 110673718 A | 1/2020 |
| EP | 2741175 A2 | 6/2014 |
| EP | 2947545 A1 | 11/2015 |
| EP | 3503101 A1 | 6/2019 |
| EP | 3588255 A1 | 1/2020 |
| EP | 3654147 A1 | 5/2020 |
| JP | H1051711 A | 2/1998 |
| JP | 2005215144 A | 8/2005 |
| JP | 2012234550 A | 11/2012 |

(56) References Cited

FOREIGN PATENT DOCUMENTS

| | | | |
|---|---|---|---|
| JP | 2013196158 A | 9/2013 |
| JP | 2013257716 A | 12/2013 |
| JP | 2014514652 A | 6/2014 |
| JP | 2015515040 A | 5/2015 |
| JP | 2015118332 A | 6/2015 |
| JP | 2016194744 A | 11/2016 |
| JP | 2017027206 A | 2/2017 |
| JP | 2018005516 A | 1/2018 |
| JP | 2019169154 A | 10/2019 |
| JP | 2022053334 A | 4/2022 |
| KR | 20160012139 A | 2/2016 |
| KR | 20190100957 A | 8/2019 |
| WO | 2019142560 A1 | 7/2019 |
| WO | 2020066682 A1 | 4/2020 |
| WO | 2021202783 A1 | 10/2021 |
| WO | 2022046340 A1 | 3/2022 |
| WO | 2022055822 A1 | 3/2022 |
| WO | 2022066399 A1 | 3/2022 |
| WO | 2022164881 A1 | 8/2022 |
| WO | 2023141535 A1 | 7/2023 |

OTHER PUBLICATIONS

European Patent Office, Written Opinion issued Dec. 21, 2021, which pertains to PCT Application No. PCT/US2021/049131, filed Sep. 3, 2021. 9 pgs.
"AquaSnap Window Manager: dock, snap, tile, organize," Nurgo Software, Available online at: https://www.nurgo-software.com/products/aquasnap, 5 pages, retrieved on Jun. 27, 2023.
United States Patent and Trademark Office, Corrected Notice of Allowance, U.S. Appl. No. 17/478,593, 2 pages, Dec. 21, 2022.
European Patent Office, Extended European Search Report, European Patent Application No. 23158818.7, 12 pages, Jul. 3, 2023.
European Patent Office, Extended European Search Report, European Patent Application No. 23158929.2, 12 pages, Jun. 27, 2023.
U.S. Patent and Trademark Office, Final Office Action, U.S. Appl. No. 17/448,875, 24 pages, Mar. 16, 2023.
Home | Virtual Desktop, Virtual Desktop, https://www.vrdesktop.net, 4 pages, retrieved Jun. 27, 2023.
European Patent Office (ISA/EP), International Search Report, International Application No. PCT/US2022/076603, 4 pages, Jan. 9, 2023.
European Patent Office (ISA/EP), International Search Report, International Application No. PCT/US2023/017335, 6 pages, Aug. 22, 2023.
European Patent Office (ISA/EP), International Search Report, International Application No. Application No. PCT/US2023/018213, 6 pages, Jul. 26, 2023.
European Patent Office (ISA/EP), International Search Report, International Application No. PCT/US2023/019458, 7 pages, Aug. 8, 2023.
European Patent Office (ISA/EP), International Search Report, International Application No. PCT/US2023/060943, 7 pages, Jun. 6, 2023.
European Patent Office (ISA/EP), International Search Report, International Application No. PCT/US2021/050948, 6 pages, Mar. 4, 2022.
European Patent Office. International Search Report, International Application No. PCT/US2021/065240, 6 pages, Mar. 23, 2022.
European Patent Office, International Search Report, International Application No. PCT/US2021/071595, 7 pages, Mar. 17, 2022.
European Patent Office, International Search Report, International Application No. PCT/US2022/013208, 7 pages, Apr. 26, 2022.
European Patent Office, International Search Report, International Application No. PCT/US2021/065242, 3 pages, Apr. 4, 2022.
U.S. Patent and Trademark Office, Non-Final Office Action, U.S. Appl. No. 17/448,875, 25 pages, Oct. 6, 2022.
U.S. Patent and Trademark Office, Non-Final Office Action, U.S. Appl. No. 17/448,875, 30 pages, Sep. 29, 2023.
U.S. Patent and Trademark Office, Non-Final Office Action, U.S. Appl. No. 17/580,495, 27 pages, Dec. 11, 2023.
U.S. Patent and Trademark Office, Notice of Allowance, U.S. Appl. No. 17/478,593, 10 pages, Aug. 31, 2022.
U.S. Patent and Trademark Office, Notice of Allowance, U.S. Appl. No. 17/580,495, 6 pages, Jun. 6, 2023.
U.S. Patent and Trademark Office, Notice of Allowance, U.S. Appl. No. 17/580,495, 12 pages, Nov. 30, 2022.
U.S. Patent and Trademark Office, Notice of Allowance, U.S. Appl. No. 18/154,757, 10 pages, Jan. 23, 2024.
U.S. Patent and Trademark Office, Restriction Requirement, U.S. Appl. No. 17/932,999, 6 pages, Oct. 3, 2023.
Bhowmick, S, "Explorations on Body-Gesture Based Object Selection on HMD Based VR Interfaces for Dense and Occluded Dense Virtual Environments," Report: State of the Art Seminar, Department of Design Indian Institute of Technology, Guwahati, 25 pp. 2018-11.
Bolt, R.A. et al.,, "Two-Handed Gesture in Multi-Modal Natural Dialog," Uist '92, 5th Annual Symposium on User Interface Software And Technology. Proceedings Of the ACM Symposium on User Interface Software And Technology, Monterey, pp. 7-14, 1992-11.
Brennan, D., "4 Virtual Reality Desktops for Vive, Rift, and Windows VR Compared," Road to VR, Available online at: https://www.roadtovr.com/virtual-reality-desktop-compared-oculus-rift-htc-vive/, retrieved on Jun. 29, 2023.
Camalich, S., "CSS Buttons with Pseudo-elements," available online at: https://tympanus.net/codrops/2012/01/11/css-buttons-with-pseudo-elements/, 8 pages, retrieved on Jul. 12, 2017.
Chatterjee, I. et al., "Gaze+Gesture: Expressive, Precise and Targeted Free-Space Interactions," ICMI '15, 8 p. 2015.
Lin, J. et al., "Towards Naturally Grabbing and Moving Objects in Vr," Is&T International Symposium on Electronic Imaging and The Engineering Reality of Virtual Reality, 6 pages, 2016.
McGill, M. et al., "Expanding The Bounds Of Seated Virtual Workspaces," University of Glasgow, Available online at: https://core.ac.uk/download/pdf/323988271.pdf, 44 pages, retrieved on Jun. 27, 2023.
Pfeuffer, K. et al., "Gaze + Pinch Interaction in Virtual Reality," In Proceedings of SUI '17, Brighton, United Kingdom, pp. 99-108, 2017.
European Patent Office, International Search Report issued Dec. 21, 2021, which pertains to PCT Application No. PCT/US2021/049131, filed Sep. 3, 2021. 4 p. 2021.
European Patent Office, Written Opinion issued Dec. 21, 2021, which pertains to PCT Application No. PCT/US2021/049131, filed Sep. 3, 2021. 9 p. 2021.
Home | Virtual Desktop, Virtual Desktop, Available online at https://www.vrdesktop.net, 4 pages, retrieved Jun. 29, 2023.
U.S. Patent and Trademark Office, Notice of Allowance received for U.S. Appl. No. 18/465,098, 8 pages, Nov. 17, 2023.
U.S. Patent and Trademark Office, Notice of Allowance received for U.S. Appl. No. 18/465,098, 6 pages, Mar. 4, 2024.
U.S. Patent and Trademark Office, Notice of Allowance received for U.S. Appl. No. 18/463,739, 11 pages, Oct. 30, 2023.
U.S. Patent and Trademark Office, Notice of Allowance received for U.S. Appl. No. 18/463,739, 10 pages, Feb. 1, 2024.
U.S. Patent and Trademark Office, Notice of Allowance received for U.S. Appl. No. 18/421,675, 9 pages, Apr. 11, 2024.
U.S. Patent and Trademark Office, Notice of Allowance received for U.S. Appl. No. 18/154,757, 12 pages, May 10, 2024.
U.S. Patent and Trademark Office, Notice of Allowance received for U.S. Appl. No. 17/932,655, 7 pages, Sep. 29, 2023.
U.S. Patent and Trademark Office, Notice of Allowance received for U.S. Appl. No. 17/932,655, 7 pages, Jan. 24, 2024.
U.S. Patent and Trademark Office, Notice of Allowance received for U.S. Appl. No. 17/659,147, 13 pages, Jan. 26, 2024.
U.S. Patent and Trademark Office, Notice of Allowance received for U.S. Appl. No. 17/448,876, 8 pages, Jul. 20, 2022.
U.S. Patent and Trademark Office, Notice of Allowance received for U.S. Appl. No. 17/448,876, 9 pages, Apr. 7, 2022.
U.S. Patent and Trademark Office, Notice of Allowance received for U.S. Appl. No. 17/448,875, 8 pages, Apr. 17, 2024.

(56) References Cited

OTHER PUBLICATIONS

U.S. Patent and Trademark Office, Non-Final Office Action received for U.S. Appl. No. 18/157,040, 25 pages, May 2, 2024.
U.S. Patent and Trademark Office, Non-Final Office Action received for U.S. Appl. No. 17/932,999, 22 pages, Feb. 23, 2024.
U.S. Patent and Trademark Office, Non-Final Office Action received for U.S. Appl. No. 17/932,655, 10 pages, Apr. 20, 2023.
U.S. Patent and Trademark Office, Non-Final Office Action received for U.S. Appl. No. 17/659,147, 19 pages, Mar. 16, 2023.
European Patent Office (ISA/EP), International Search Report received for International Patent Application No. PCT/US2023/074979, 6 pages, Feb. 26, 2024.
European Patent Office (ISA/EP), International Search Report received for International Patent Application No. PCT/US2023/074950, 9 pages, Jan. 3, 2024.
U.S. Patent and Trademark Office, Non-Final Office Action, U.S. Appl. No. 18/244,570, 33 pages, May 29, 2024.
U.S. Patent and Trademark Office, Corrected Notice of Allowability received for U.S. Appl. No. 17/448,875, 4 pages, Apr. 24, 2024.
U.S. Patent and Trademark Office, Corrected Notice of Allowability received for U.S. Appl. No. 17/659,147, 6 pages, Feb. 14, 2024.
U.S. Patent and Trademark Office, Corrected Notice of Allowability received for U.S. Appl. No. 17/932,655, 2 pages, Oct. 12, 2023.
U.S. Patent and Trademark Office, Corrected Notice of Allowability received for U.S. Appl. No. 18/465,098, 3 pages, Mar. 13, 2024.
European Patent Office, European Search Report received for European Patent Application No. 21791153.6, 5 pages, Mar. 22, 2024.
European Patent Office, Extended European Search Report received for European Patent Application No. 23197572.3, 7 pages, Feb. 19, 2024.
U.S. Patent and Trademark Office, Final Office Action received for U.S. Appl. No. 17/580,495, 29 pages, May 13, 2024.
U.S. Patent and Trademark Office, Final Office Action received for U.S. Appl. No. 17/659,147, 17 pages, Ocect. 14, 2023.
European Patent Office (ISA/EP), International Search Report received for International Patent Application No. PCT/US2021/071596, 7 pages, Apr. 8, 2022.
European Patent Office (ISA/EP), International Search Report received for International Patent Application No. PCT/US2022/071704, 6 pages, Aug. 26, 2022.
European Patent Office (ISA/EP), International Search Report received for PCT Patent Application No. PCT/US2023/074257, 5 pages, Nov. 21, 2023.
National Intellectual Property Administration of the People's Republic of China, Search Report (with English translation) received for Chinese Patent Application No. 202310873465.7, 5 pages, Feb. 1, 2024.

\* cited by examiner

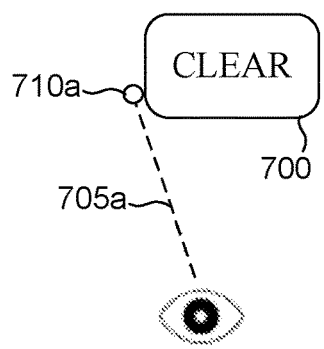
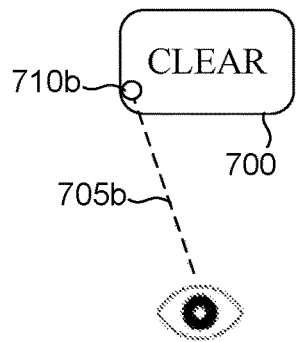
FIG. 7A     FIG. 7B
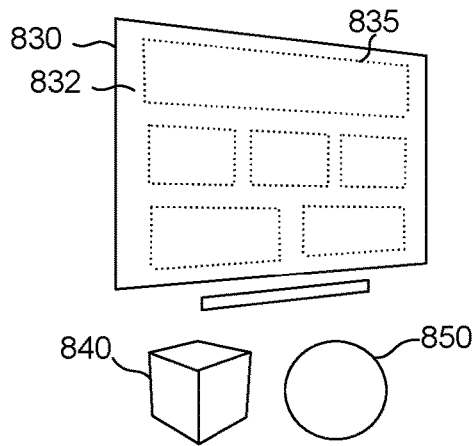
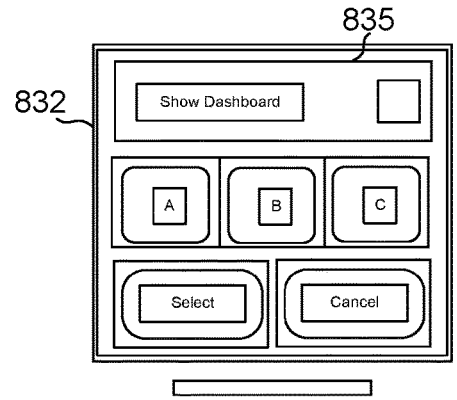
FIG. 8A     FIG. 8B
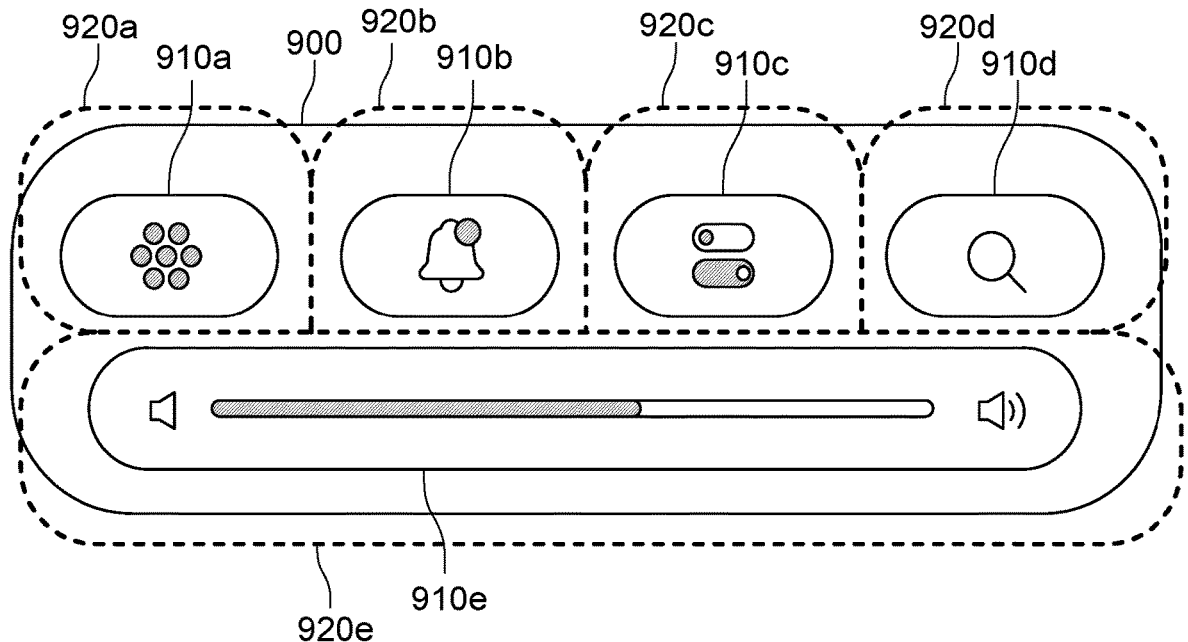
FIG. 9

FUZZY HIT TESTING

CROSS-REFERENCE TO RELATED APPLICATIONS

This application claims the benefit of U.S. Provisional Application Ser. No. 63/470,608 filed Jun. 2, 2023, which is incorporated herein in its entirety.

TECHNICAL FIELD

The present disclosure generally relates to assessing user interactions with electronic devices that involve hand and body gestures, gaze, voice, hand-held controller input, human interface device (HID) input, and/or other user activity.

BACKGROUND

Existing user interaction systems may be improved with respect to facilitating interactions based on user activities.

SUMMARY

Various implementations disclosed herein include devices, systems, and methods that associate user activities with elements within a 3D environment. Some implementations do so in ways that account for inaccuracies (i.e., fuzziness) in sensor-based detection of the user activities, e.g., inaccuracy in sensor data-based gaze tracking or sensor data-based hand/joint position. Some implementations use a sampling technique to associate user activity in a 3D environment with an appropriate element, such as a portion of a user interface (UI) positioned within a 3D environment. For example, a sampling technique may be used to identify sample locations within the 3D environment (e.g., sample locations around a gaze direction) to evaluate and ultimately select from to associate with a user activity, e.g., associating a particular UI button with a gaze direction. In one example, the user activity is a gaze direction, and a pattern of rays around the gaze direction is generated to identify candidate UI targets from which a UI element is selected to associate with the gaze direction.

In some implementations, a processor performs a method by executing instructions stored on a computer readable medium of an electronic device. The method receives data corresponding to user activity in a 3D coordinate system. The data may provide a directional representation (e.g., a ray in the 3D coordinate system) of user activity. For example, the method may identify a gaze direction associated with a user's gaze at one or more points in time (e.g., a gaze direction associated with an indirect user interaction). The method may determine a user's dominant eye in identifying the gaze direction. In another example, the method may identify a user hand position or motion and determine a ray from a viewpoint (e.g., eye position) to the hand or a ray from a viewpoint to a position at which the hand is determined to intersect a virtual UI (e.g., an eye-to-touchpoint ray synthesized on the first frame of a direct user interaction). In another example, the method may use head tracking to identify a head direction, e.g., casting a ray (e.g., as an alternative to a gaze direction ray) in a direction based on which direction the user's head is facing.

The method generates a plurality of sample locations in the 3D coordinate system based on the data corresponding to the user activity. In some implementations, given a gaze direction, ray, or point in the 3D coordinate system identified based on the user activity, the method may identify a plurality of nearby rays or points in the 3D coordinate system. In one example, the method generates a pattern of 10-30 rays in a pattern. The pattern may include rays or points that may be spaced relative to one another to satisfy predetermined criteria, e.g., spaced within a pattern to ensure UI elements of particular size and/or shape that are within the boundary of the pattern will be intersected by at least one of the rays or points. The pattern may change over time, e.g., frame to frame. For example, the pattern for each frame may include randomly positioned rays/points generated based on a user activity (e.g., gaze ray or gaze ray intersection point).

The method identifies UI targets within the 3D coordinate system based on the plurality of sample locations. In some implementations, the UI targets include colliders corresponding to 2D or 3D elements, e.g., corresponding to the 3D positions/boundaries of 3D virtual objects and/or 2D UI elements of apps defined by layer trees, etc. In some implementations, a collider corresponding to a UI hierarchy is identified and then the UI hierarchy is examined to identify which UI element of the UI hierarchy is on top (e.g., the closest, opaque, non-occluded element) at the sample location.

The method selects a UI target of the identified UI targets to associate with the user activity based on a selection criterion. In some implementations, for each of the identified UI target, the method computes the closest opaque point and the distance (e.g., angular distance) to the user activity location (e.g., to the gaze direction location, etc.) and then sorts and prioritizes the UI targets according to a policy. This may involve, when multiple UI targets are within a threshold distance (e.g., within a 1° angular distance) of the user activity location, the method prioritizes according to a policy by ranking UI targets according to type (e.g., type of effects enabled for different element types), UI element layering, nesting, and/or geometry of the UI targets, proximity to the user activity location (e.g., gaze direction location), and/or based on applying hysteresis logic that prioritizes previous targets and/or avoids flickering.

Various implementations disclosed herein include devices, systems, and methods that associate user activities with elements within a 3D environment. Some implementations provide output (e.g., based on user activity to element associations) to applications in a way that facilitates the application's recognition of the user activity, e.g., providing output based on 3D user activity such that an application can use the output to recognize the user activity as being associated with an appropriate/intended element using existing touchscreen/2D input. In some implementations, doing so may enable an application configured for a 2D environment (e.g., a mobile device app) to be executed within a 3D environment without requiring that the application change its own 2D input recognition process or otherwise to account for the fuzziness of the underlying 3D user activity, e.g., inaccuracy in sensor data tracking gaze (indirect) or hand/joint position (direct).

In some implementations, a processor performs a method by executing instructions stored on a computer readable medium of an electronic device. The method receives data corresponding to user activity in a 3D coordinate system. The data may provide a directional representation (e.g., a ray in the 3D coordinate system) of user activity. For example, the method may identify a gaze direction associated with a user's gaze at one or more points in time (e.g., a gaze direction associated with an indirect user interaction). In another example, the method may identify a user hand position or motion and determine a ray from a viewpoint (e.g., eye position) to the hand or a ray from a viewpoint to a position at which the hand is determined to intersect a virtual UI (e.g., an eye to touch point ray synthesized on the first frame of a direct user interaction).

The method receives data corresponding to positioning of UI elements of an application within the 3D coordinate system (e.g., a geometry collision world). The data corresponding to the positioning of the UI element may be based at least in part on data (e.g., positions/shapes of 2D elements intended for a 2D window area) provided by the application. In some implementations, the application may provide a layered tree that is used to position the UI elements, e.g., on a 2D region of the 3D coordinate system. Such information may be provided to a simulation process that positions the application element in the 3D space, e.g., by defining the 3D position of one or more colliders (e.g., each having a rectangular window area) in the 3D space for the app elements.

The method identifies one or more UI targets within the 3D coordinate system based on the data corresponding to the user activity and the data corresponding to positioning of the UI elements of the application within the 3D coordinate system. The method selects a UI target of the identified UI targets to associate with the user activity based on a selection criterion. The method, based on selecting the UI target to associate with the user activity, identifies a point within a 2D region to the application such that the application can associate an action (e.g., selection/hit/hover/etc.) with the UI target.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 7A-7B illustrate an exemplary hit detection correction in accordance with some implementations.

FIGS. 8A-8B illustrate 2D and 3D elements which may be positioned within a 3D environment in accordance with some implementations.

FIG. 9 illustrates exemplary control regions and fuzzy hit test regions around elements of a user interface in accordance with some implementations.

Figure 1A:
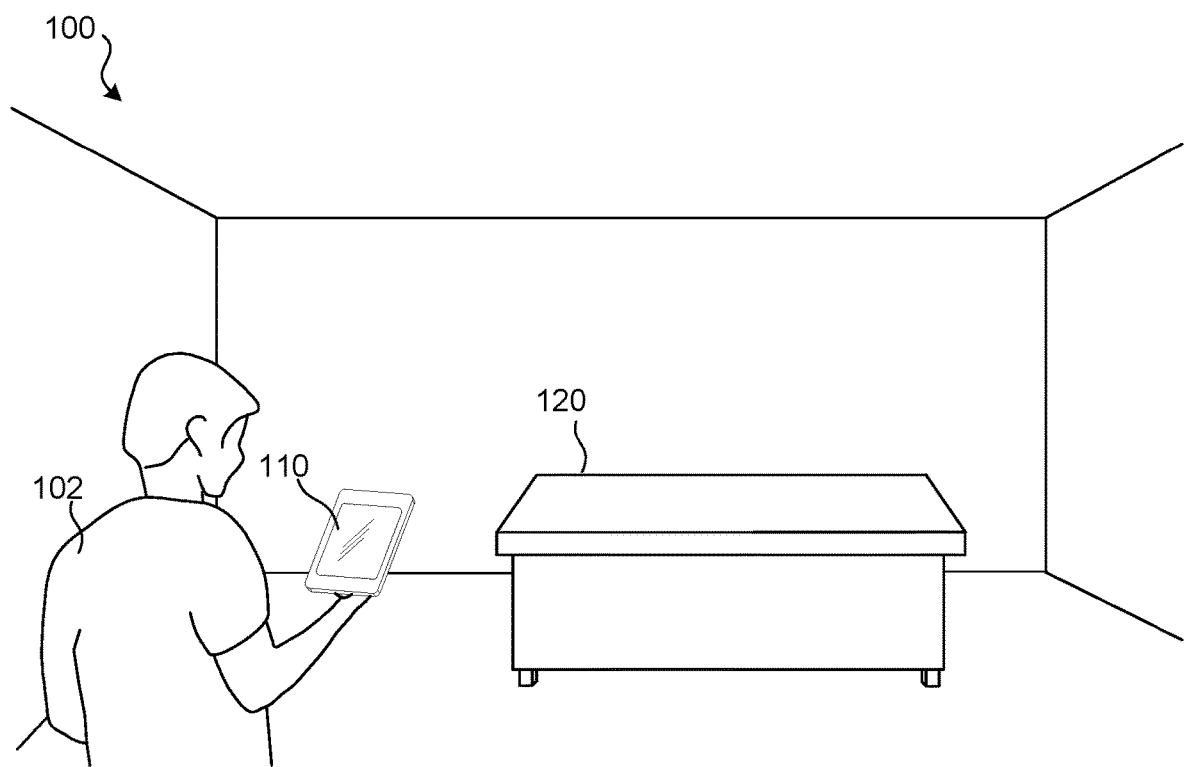
FIGS. 1A-1B illustrate exemplary electronic devices operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1B:
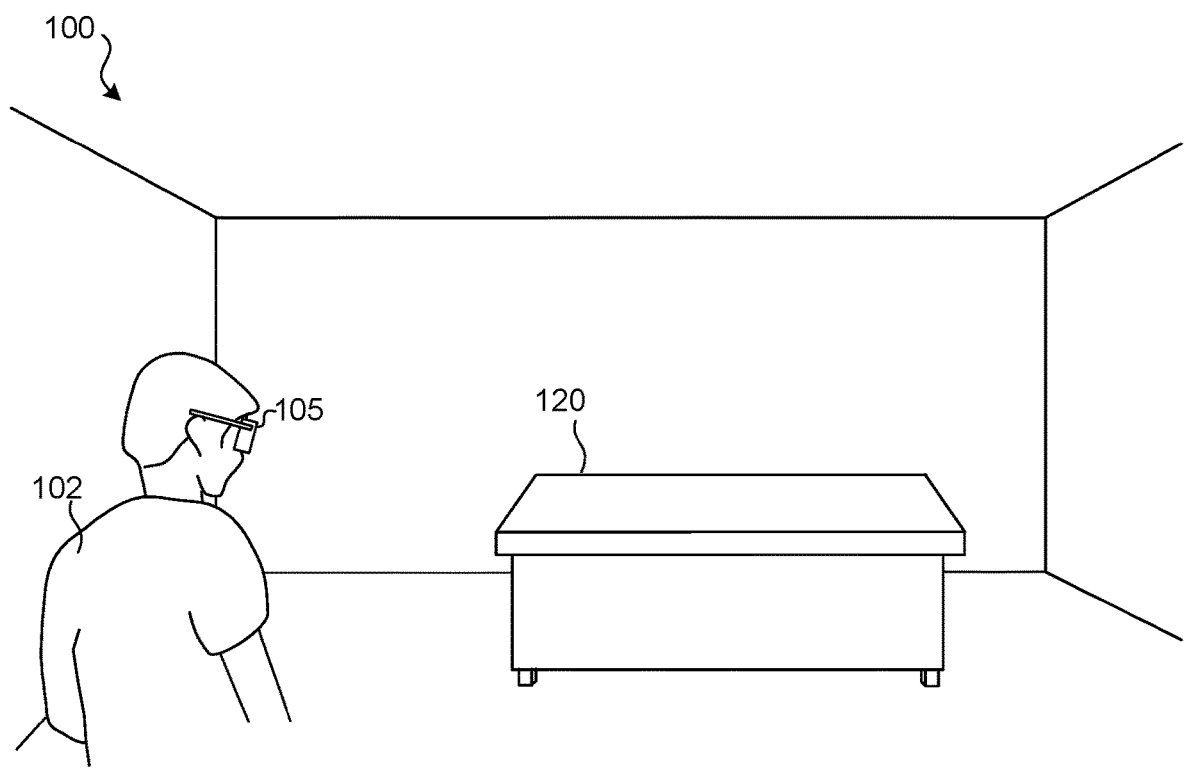

FIGS. 1A-1B illustrate exemplary electronic devices 105 and 110 operating in a physical environment 100. In the example of FIGS. 1A-1B, the physical environment 100 is a room that includes a desk 120. The electronic devices 105 and 110 may include one or more cameras, microphones, depth sensors, or other sensors that can be used to capture information about and evaluate the physical environment 100 and the objects within it, as well as information about the user 102 of electronic devices 105 and 110. The information about the physical environment 100 and/or user 102 may be used to provide visual and audio content and/or to identify the current location of the physical environment 100 and/or the location of the user within the physical environment 100.

In some implementations, views of an extended reality (XR) environment may be provided to one or more participants (e.g., user 102 and/or other participants not shown) via electronic devices 105 (e.g., a wearable device such as an HMD) and/or 110 (e.g., a handheld device such as a mobile device, a tablet computing device, a laptop computer, etc.). Such an XR environment may include views of a 3D environment that are generated based on camera images and/or depth camera images of the physical environment 100, as well as a representation of user 102 based on camera images and/or depth camera images of the user 102. Such an XR environment may include virtual content that is positioned at 3D locations relative to a 3D coordinate system (i.e., a 3D space) associated with the XR environment, which may correspond to a 3D coordinate system of the physical environment 100.

In some implementations, video (e.g., pass-through video depicting a physical environment) is received from an image sensor of a device (e.g., device 105 or device 110). In some implementations, a 3D representation of a virtual environment is aligned with a 3D coordinate system of the physical environment. A sizing of the 3D representation of the virtual environment may be generated based on, inter alia, a scale of the physical environment or a positioning of an open space, floor, wall, etc. such that the 3D representation is configured to align with corresponding features of the physical environment. In some implementations, a viewpoint within the 3D coordinate system may be determined based on a position of the electronic device within the physical environment. The viewpoint may be determined based on, inter alia, image data, depth sensor data, motion sensor data, etc., which may be retrieved via a virtual inertial odometry system (VIO), a simultaneous localization and mapping (SLAM) system, etc.

Figure 2:
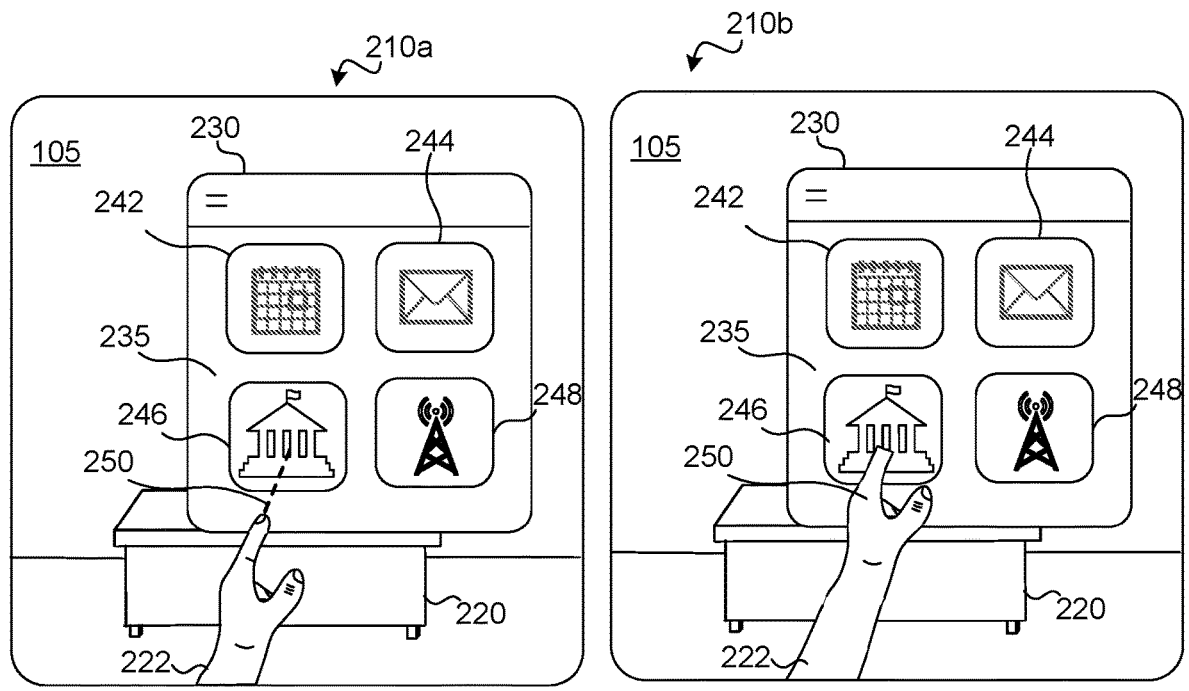
FIG. 2 illustrates views, provided via a device, of virtual elements within the 3D physical environment of FIGS. 1A-1B in which the user performs a direct interaction in accordance with some implementations.

FIG. 2 illustrates views, provided via a device, of virtual elements within the 3D physical environment of FIGS. 1A-1B, in which the user performs a direct interaction. In this example, the user 102 makes a hand gesture relative to content presented in views 210*a-b* of an XR environment provided by a device (e.g., device 105 or device 110). The views 210*a-b* of the XR environment include an exemplary user interface 230 of an application (i.e., an example of virtual content) and a depiction 220 of the desk 120 (i.e., an example of real content). Providing such a view may involve determining 3D attributes of the physical environment 100 and positioning the virtual content, e.g., user interface 230, in a 3D coordinate system corresponding to that physical environment 100.

In the example of FIG. 2, the user interface 230 includes various content user interface elements, including a background portion 235 and icons 242, 244, 246, 248. The icons 242, 244, 246, 248 may be displayed on the flat user interface 230. The user interface 230 may be a user interface of an application, as illustrated in this example. The user interface 230 is simplified for purposes of illustration and user interfaces in practice may include any degree of complexity, any number of content items, and/or combinations of 2D and/or 3D content. The user interface 230 may be provided by operating systems and/or applications of various types including, but not limited to, messaging applications, web browser applications, content viewing applications, content creation and editing applications, or any other applications that can display, present, or otherwise use visual and/or audio content.

In this example, the background portion 235 of the user interface 230 is flat. In this example, the background portion 235 includes aspects of the user interface 230 being displayed except for the icons 242, 244, 246, 248. Displaying a background portion of a user interface of an operating system or application as a flat surface may provide various advantages. Doing so may provide an easy to understand or otherwise use portion of an XR environment for accessing the user interface of the application. In some implementations, multiple user interfaces (e.g., corresponding to multiple, different applications) are presented sequentially and/or simultaneously within an XR environment, e.g., within one or more colliders or other such components.

In some implementations, the positions and/or orientations of such one or more user interfaces may be determined to facilitate visibility and/or use. The one or more user interfaces may be at fixed positions and orientations within the 3D environment. In such cases, user movements would not affect the position or orientation of the user interfaces within the 3D environment.

The position of the user interface within the 3D environment may be based on determining a distance of the user interface from the user (e.g., from an initial or current user position). The position and/or distance from the user may be determined based on various criteria including, but not limited to, criteria that accounts for application type, application functionality, content type, content/text size, environment type, environment size, environment complexity, environment lighting, presence of others in the environment, use of the application or content by multiple users, user preferences, user input, and numerous other factors.

In some implementations, the one or more UIs may be body-locked content, e.g., having a distance and orientation offset relative to a portion of the user's body (e.g., their torso). For example, the body-locked content of a UI could be 0.5 meters away and 45 degrees to the left of the user's torso's forward-facing vector. If the user's head turns while the torso remains static, a body-locked UI would appear to remain stationary in the 3D environment at 2 m away and 45 degrees to the left of the torso's front facing vector. However, if the user does rotate their torso (e.g., by spinning around in their chair), the body-locked UI would follow the torso rotation and be repositioned within the 3D environment such that it is still 0.5 meters away and 45 degrees to the left of their torso's new forward-facing vector.

In other implementations, UI content is defined at a specific distance from the user with the orientation relative to the user remaining static (e.g., if initially displayed in a cardinal direction, it will remain in that cardinal direction regardless of any head or body movement). In this example, the orientation of the content would not be referenced to any part of the user's body. In this different implementation, the UI would not reposition itself in accordance with the torso rotation. For example, a UI may be defined to be 2 m away and, based on the direction the user is currently facing, may be initially displayed north of the user. If the user rotates their torso 180 degrees to face south, the UI would remain 2 m away to the north of the user, which is now directly behind the user.

A UI could also be configured to always remain gravity or horizon aligned, such that head and/or body changes in the roll orientation would not cause the UI to move within the 3D environment. Translational movement would cause the content to be repositioned within the 3D environment in order to maintain the distance offset.

In the example of FIG. 2, the user 102 moves their hand from an initial position as illustrated by the position of the depiction 222 in view 210a. The hand moves along path 250 to a later position as illustrated by the position of the depiction 222 in the view 210b. As the user 102 moves their hand along this path 250, the finger intersects the user interface 230. Specifically, as the finger moves along the path 250, it virtually pierces the icon 246 and thus a tip portion of the finger (not shown) is occluded in view 210b by the user interface 230.

Implementations disclosed herein interpret user movements such as the user 102 moving their hand/finger along path 250 relative to a user interface element such as icon 246 to recognize user input/interactions. The interpretation of user movements and other user activity may be based on recognizing user intention using one or more recognition processes.

Recognizing input in the example of FIG. 2 may involve determining that a gesture is a direct interaction and then using a direct input recognition process to recognize the gesture. For example, such a gesture may be interpreted as a tap input to the icon 246. In making such a gesture, the user's actual motion relative to the icon 246 may deviate from an ideal motion (e.g., a straight path through the center of the user interface element in a direction that is perfectly orthogonal to the plane of the user interface element). The actual path may be curved, jagged, or otherwise non-linear and may be at an angle rather than being orthogonal to the plane of the user interface element. The path may have attributes that make it similar to other types of input gestures (e.g., swipes, drags, flicks, etc.) For example, the non-orthogonal motion may make the gesture similar to a swipe motion in which a user provides input by piercing a user interface element and then moving in a direction along the plane of the user interface. Moreover, in some implementations, such recognition involves fuzzy hit testing, e.g., determining, when a finger pierces a UI interface, an appropriate UI element to associate with the piercing based on various processes and/or criteria that account for inaccuracy in the determination of the position of the finger relative to the user interface in the 3D coordinate space, e.g., accounting for inaccuracy in finger/hand tracking, user perception, etc.

Some implementations disclosed herein determine that a direct interaction mode is applicable and, based on the direct interaction mode, utilize a direct interaction recognition process to distinguish or otherwise interpret user activity that corresponds to direct input, e.g., identifying intended user interactions, for example, based on if, and how, a gesture path intercepts one or more 3D regions of space. Such recognition processes may account for actual human tendencies associated with direct interactions (e.g., natural arcing that occurs during actions intended to be straight, tendency to make movements based on a shoulder or other pivot position, etc.), human perception issues (e.g., user's not seeing or knowing precisely where virtual content is relative to their hand), and/or other direct interaction-specific issues.

Note that the user's movement in the real world (e.g., physical environment 100) correspond to movements within a 3D space, e.g., an XR environment that is based on the real-world and that includes virtual content such as user interface positioned relative to real-world objects including the user. Thus, the user is moving their hand in the physical environment 100, e.g., through empty space, but that hand (i.e., a depiction or representation of the hand) intersects with and/or pierces through the user interface 300 of the XR environment that is based on that physical environment. In this way, the user virtually interacts directly with the virtual content.

Figure 3:
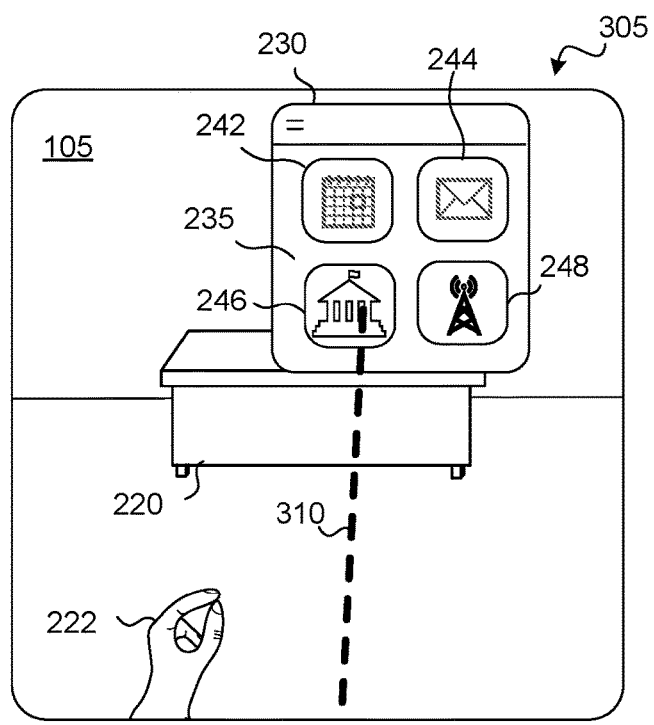
FIG. 3 illustrates a view, provided via a device, of virtual elements within the 3D physical environment of FIGS. 1A-1B in which the user performs an indirect interaction in accordance with some implementations.

FIG. 3 illustrates an exemplary view, provided via a device, of virtual elements within the 3D physical environment of FIGS. 1A-1B in which the user performs an indirect interaction. In this example, the user 102 makes a hand gesture while looking at content presented in the view 305 of an XR environment provided by a device (e.g., device 105 or device 110). The view 305 of the XR environment includes the exemplary user interface 230 FIG. 2. In the example of FIG. 3, the user 102 makes a pinching gesture with their hand as illustrated by the depiction 222 while gazing along gaze direction 310 at user interface icon 246. In this example, this user activity (e.g., a pinching hand gesture along with a gaze at a UI element) corresponds to a user intention to interact with user interface icon 246, i.e., the pinch signifies the intention to interact and the gaze (at the point in time of the pinch) identifies the target of the interaction.

Implementations disclosed herein interpret user activity, such as the user 102 forming pinching hand gesture along with a gaze at a UI element, to recognize user/interactions. For example, such user activity may be interpreted as a tap input to the icon 246, e.g., selecting icon 246. However, in performing such actions, the user's gaze direction and/or the timing between a gesture and gaze with which the user intends the gesture to be associated may be less than perfectly executed and/or timed. Moreover there may be error or fuzziness in the gaze tracking accuracy.

Some implementations disclosed herein determine that an indirect interaction mode is applicable and, based on the direct interaction mode, utilize an indirect interaction recognition process to identify intended user interactions based on user activity, for example, based on if, and how, a gesture path intercepts one or more 3D regions of space. Such recognition processes may account for actual human tendencies associated with indirect interactions (e.g., eye saccades, eye fixations, and other natural human gaze behavior, arching hand motion, retractions not corresponding to insertion directions as intended, etc.), human perception issues (e.g., user's not seeing or knowing precisely where virtual content is relative to their hand), and/or other indirect interaction-specific issues. In some implementations such recognition involves fuzzy hit testing, e.g., determining a user interface element to associate with a gaze direction based on various processes and/or criteria that account for inaccuracy in the determination of the gaze direction or other aspects of user activity.

Some implementations determine an interaction mode, e.g., a direct interaction mode or indirect interaction mode, so that user behavior can be interpreted by a specialized (or otherwise separate) recognition process for the appropriate interaction type, e.g., using a direct interaction recognition process for direct interactions and an indirect interaction recognition process or indirect interactions. Such specialized (or otherwise separate) process utilization may be more efficient, more accurate, or provide other benefits relative to using a single recognition process configured to recognize multiple types (e.g., both direct and indirect) interactions.

FIGS. 2 and 3 illustrate example interaction modes that are based on user activity within a 3D environment. Other types or modes of interaction may additionally or alternatively be used including but not limited to user activity via input devices such as keyboards, trackpads, mice, hand-held controllers, and the like. In one example, a user provides an interaction intention via activity (e.g., performing an action such as tapping a button or a trackpad surface) using an input device such as a keyboard, trackpad, mouse, or hand-held controller and a UI target is identified based on the user's gaze direction (e.g., potentially using a fuzzy hit testing approach) at the time of the input on the input device. Similarly, user activity may involve voice commands. In one example, a user provides, a user provides an interaction intention via activity (e.g., performing an action such as tapping a button or a trackpad surface) using an input device such as a keyboard, trackpad, mouse, or hand-held controller and a UI target is identified based on the user's gaze direction (e.g., potentially using a fuzzy hit testing approach) at the time of the voice command. In another example, user activity identifies an intention to interact (e.g., via a pinch, hand gesture, voice command, input-device input, etc.) and a UI element is determined based on a non-gaze-based direction, e.g., based on where the user is pointing (e.g., potentially using a fuzzy hit testing approach) within the 3D environment. For example, a user may pinch with one hand to provide input indicating an intention to interact while pointing at a UI button with a finger of the other hand. In another example, a user may manipulate the orientation of a hand-held device in the 3D environment to control a controller direction (i.e., a virtual line extending from controller within the 3D environment) and a UI element with respect to which the user is interacting may be identified (e.g., potentially using a fuzzy hit testing approach) based on the controller direction, i.e., based on identifying what UI element the controller direction intersects with when input indicating an intention to interact is received.

Various implementations disclosed herein provide an input support process, e.g., as an OS process separate from an executing application, that processes user activity data (e.g., regarding gaze, hand gestures, other 3D activities, HID inputs, etc.) to produce data for an application that the application can interpret as user input. The application may not need to have 3D input recognition capabilities, as the data provided to the application may be in a format that the application can recognize using 2D input recognition capabilities, e.g., those used within application developed for use on 2D touch-screen and/or 2D cursor-based platforms. Moreover, the input support process may perform fuzzy hit testing user activity analysis and provide information such that the app will recognize input/user activity corresponding to an intended user interface element, e.g., correcting for 3D world errors in providing 2D information that an application will accurately recognize.

At least some aspects of interpreting user activity (e.g., potentially including 3D fuzzy hit testing/correction) for an application may be performed by processes outside of the application. Doing so may simplify or reduce the complexity, requirements, etc. of the application's own input recognition processes, ensure uniform, consistent input recognition across multiple, different applications, protect private use data from application access, and provide numerous other benefits as described herein.

Figure 4:
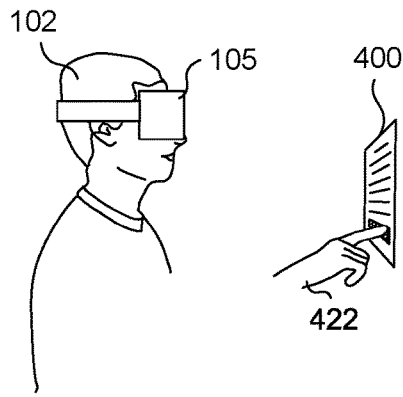
FIG. 4 illustrates an exemplary direct interaction, in accordance with some implementations.

FIG. 4 illustrates an exemplary direct interaction involving a user's hand 422 virtually touching a UI element of a user interface 400. In this example, the user 102 is using device 105 to view and interact with an XR environment that includes the user interface 400. A direct interaction recognition process may use sensor data and/or UI information to determine, for example, which UI element the user's hand is virtually touching and/or where on that UI element the interaction occurs. It may perform fuzzy hit testing/activity-to-element association. Identifying the direct interaction may additionally (or alternatively) involve assessing user activity to determine the user's intent, e.g., did the user intend to tap this button or this scroll bar, did the user intend a straight tap gesture through the UI element or a sliding/scrolling motion along the UI element, etc. Such recognition may utilize information about the UI elements, e.g., regarding the positions, sizing, type of element, types of interactions that are capable on the element, types of interactions that are enabled on the element, which of a set of potential target elements for a user activity accepts which types of interactions, etc.

Recognition of such an interaction may be based on functions performed both via a system process and via an application process. For example, an OS's input support process may interpret hands data from the device's sensors to identify an interaction event and provide limited or interpreted information about the interaction event to the application that provided the user interface 400. For example, rather than providing detailed hand information (e.g., identifying the 3D positions of multiple joints of a hand model representing the configuration of the hand 422), the OS input support process may simply identify a 2D point within the 2D user interface 400 on the UI element 515 at which the interaction occurred, e.g., an interaction pose. The application process can then interpret this 2D point information (e.g., interpreting it as a selection, mouse-click, touch-screen tap, or other input received at that point) and provide a response, e.g., modifying its UI accordingly.

Figure 5:
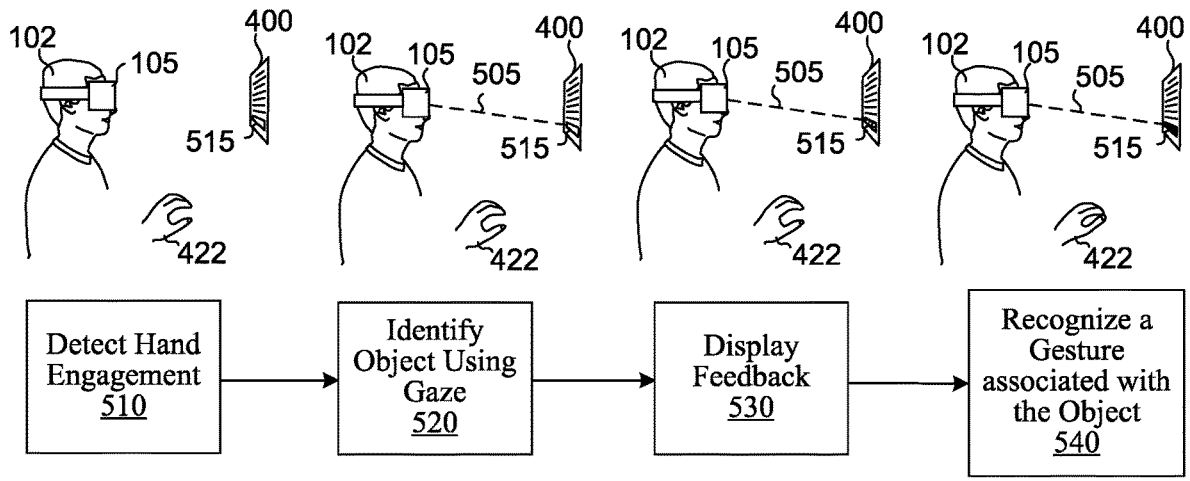
FIG. 5 illustrates indirect interaction recognition in accordance with some implementations.

FIG. 5 illustrates indirect interaction recognition. In this example, sensor data on device 105 and/or UI information are used to recognize a user interaction made by user 102, e.g., based on outward-facing image sensor data, depth sensor data, eye sensor data, motion sensor data, etc. and/or information made available by an application providing the user interface. Sensor data may be monitored to detect user activity corresponding to an engagement condition corresponding to the start of a user interaction.

In this example, at block 510, the process detects that the user 102 has positioned their hand 422 within view of outward facing image sensors. It may detect a particular hand configuration, e.g., a claw shape, a flat hand, a steady hand in any configuration, etc., as an indication of hand engagement or may simply detect the presence of the hand within sensor view.

At block 520, the process identifies an object using user gaze data. In this example, the process identifies that the gaze direction 505 of user 102 is on user interface element 515. This may involve a fuzzy hit testing/user activity-to-element association process as described herein.

At block 530, the process displays feedback based on the object identified by the gaze. In this example, the feedback distinguishes user interface element 515 graphically to indicate that the user interface element 515 now has a different state (e.g., a "hover" state that is analogous to the state of a traditional UI icon when a cursor is on the item without clicking/tapping). In this example, the application that provided the UI information need not be notified of the hover state and associated feedback. Instead, the hand engagement, object identification via gaze, and display of feedback can be handled out of process (i.e., outside of the application process), e.g., by the operating system processes. For example, such processes may be provided via an operating system's input support process. Doing so may reduce or minimize potentially sensitive user information (e.g., such as constant gaze direction vectors) that might otherwise be provided to application to enable the application to handle these functions within the application process. Whether and how to display feedback may be specified by the application even though it is carried out of process. For example, the application may define that an element should display hover or highlight feedback and define how the hover or highlight will appear such that the out of process aspect (e.g., operating system) may provide the hover or highlight according to the defined appearance. Alternatively, feedback can be defined out-of-process (e.g., solely by the OS) or defined to use a default appearance/animation if the application does not specify an appearance.

At block 540, the process recognizes a gesture to be associated with the identified object. In this example, the user is gazing in gaze direction 505 at user interface object 515 while (or at least near in time) to a pinch gesture by hand 422. This pinch gesture, in this example, is interpreted to initiate an action upon the user interface object 515, e.g., causing a selection action that is analogous to a cursor "click" event of a traditional UI icon during which a cursor is positioned on an icon and a trigger such as a mouse-click or track pad tap is received or similarly analogous to a touch screen "tap" event.

Recognition of such an interaction may be based on functions performed both via a system process and via an application process. For example, an OS's input process may interpret hands and gaze data from the device's sensors to identify an interaction event and provide limited or interpreted/abstracted information about the interaction event to the application that provided the user interface 400. For example, rather than providing gaze direction information identifying gaze direction 505, the OS input support process may identify a 2D point within the 2D user interface 400 on the UI element 515, e.g., an interaction pose, having selected the UI element/2D point based on a fuzzy hit testing/association process that accounts for 3D or other inaccuracies, e.g., gaze direction inaccuracy, hand configuration inaccuracy, etc. The application process can then interpret this 2D point information (e.g., interpreting it as a selection, mouse-click, touch-screen tap, or other input received at that point) and provide a response, e.g., modifying its UI accordingly.

FIG. 5 illustrates examples of recognizing indirect user interactions. Numerous other types of indirect interactions can be recognized, e.g., based on one or more user actions identifying a user interface element and/or one or more user actions providing input (e.g., no-action/hover type input, selection type input, input having a direction, path, speed, acceleration, etc.). Input in 3D space that is analogous to input on 2D interfaces may be recognized, e.g., input analogous to mouse movements, mouse button clicks, touch screen touch events, trackpad events, joystick events, game controller events, etc.

Some implementations utilize an out of process (i.e., outside of an application process) input support framework to facilitate accurate, consistent, and efficient input recognition in a way that preserves private user information. For example, aspects of the input recognition process may be performed out of process such that applications have little or no access to information about where a user is looking, e.g., gaze directions. In some implementations, application access to some user activity information (e.g., gaze direction-based data) is limited to only a particular type of user activity, e.g., activity satisfying particular criteria. For example, applications may be limited to receive only information associated with deliberate or intentional user activity, e.g., deliberate or intentional actions indicative of an intention to interact with (e.g., select, activate, move, etc.) a user interface element.

Some implementations recognize input using functional elements performed both via an application process and a system process that is outside of the application process. Thus, in contrast to a framework in which all (or most) input recognition functions are managed within an application process, some algorithms involved in the input recognition may be moved out of process, i.e., outside of the application process. For example, this may involve moving algorithms that detect gaze input and intent (which may include at least some aspects of fuzzy hit testing/association) out of an application's process such that the application does not have access to user activity data corresponding to where a user is looking or only has access to such information in certain circumstances, e.g., only for specific instances during which the user exhibits an intent to interact with a user interface element.

Some implementations recognize input using a model in which an application declares or otherwise provides information about its UI elements so that a system process that is outside of the application process can better facilitate input recognition. For example, an application may declare the locations and/or UI behaviors/capabilities of its buttons, scroll bars, menus, objects, and other UI elements. Such declarations may identify how a user interface should behave given different types of user activity, e.g., this button should (or should not) exhibit hover feedback when the user looks at it.

The system process (e.g., outside of the application process) may use such information to provide the desired UI behavior (e.g., providing hover feedback in appropriate user activity circumstances). For example, the system process may trigger hover feedback for a UI element based on a declaration from the application that the app's UI includes the element and that it should display hover feedback, e.g., when gazed upon. The system process may provide such hover feedback based on recognizing the triggering user activity (e.g., gaze at the UI object) and may do so without revealing to the application the user activity details associated with the user activity that triggered the hover, the occurrence of the user activity that triggered the hover feedback, and/or that the hover feedback was provided. The application may be unaware of the user's gaze direction and/or that hover feedback was provided for the UI element.

In another example, an application declares a menu as part of its user interface and declares that the menu is expandable using a set of identified expanded menu options. The system process may handle the expansion of the UI menu. The system process may provide menu expansion (e.g., via a system process outside of the application process) based on recognizing a triggering user activity (e.g., gaze at the menu's label) and may do so without revealing to the application the user activity details associated with the user activity that triggered the menu expansion, the occurrence of the user activity that triggered the menu expansion, and/or that the fact that the menu was expanded. The application may be unaware of the user's gaze direction and/or that the menu was expanded.

Some aspects of input recognition may be handled by the application itself, i.e., in process. However, the system process may filter, abstract, or otherwise manage the information that is made available to the application to recognize input to the application. The system process may do so in ways (e.g., performing fuzzy hit testing/activity-to-element association) that facilitate input recognition that is efficient, accurate, consistent (within the application and across multiple applications), and that allow the application to potentially use easier-to-implement input recognition and/or legacy input recognition processes, such as input recognition processes developed for different systems or input environment, e.g., using touch screen input processes used in legacy mobile apps.

Some implementations use a system process to provide interaction event data to applications to enable the applications to recognize input. The interaction event data may be limited so that all user activity data is not available to the applications. Providing only limited user activity information may help protect user privacy. The interaction event data may be configured to correspond to events that can be recognized by the application using a general or legacy recognition process. For example, a system process may interpret 3D user activity data to provide interaction event data to an application that the application can recognize in the same way that the application would recognize a touch event on a touch screen. In some implementations, an application receives interaction event data corresponding to only certain types of user activity, e.g., intentional or deliberate actions on user interface objects, and may not receive information about other types of user activity, e.g., gaze only activities, a user moving their hands in ways not associated with UI-interactions, a user moving closer to or further away from the user interface, etc. In one example, during a period of time (e.g., a minute, 10 minutes, etc.) a user gazes around a 3D XR environment including gazes at certain user interface text, buttons, and other user interface elements and eventually performs an intentional UI interaction, e.g., by making an intentional pinch gesture while gazing at button X. A system process may handle all of the user interface feedback during the gazing around at the various UI elements without providing the application information about these gazes. On the other hand, the system process may provide interaction event data to the application based on the intentional pinch gesture while gazing at button X. However, even this interaction event data may provide limited information to the application, e.g., providing an interaction position or pose identifying an interaction point on button X without providing information about the actual gaze direction. The application can then interpret this interaction point as an interaction with the button X and respond accordingly. Thus, user behavior that is not associated with intentional user interactions with UI elements (e.g., gaze only hover, menu expansion, reading, etc.) are handled out of process without the application having access to user data and the information about the intentional user interface element interactions is limited such that it does not include all of the user activity details.

Figure 6:
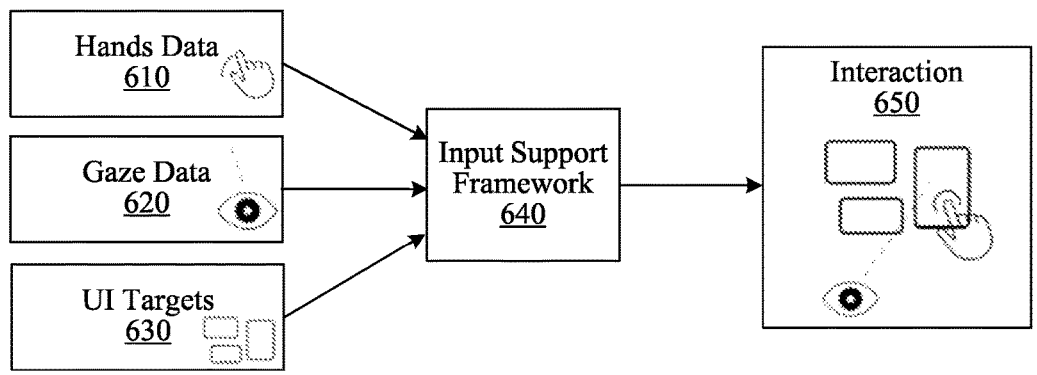
FIG. 6 illustrates use of an exemplary input support framework to generate interaction data based on hands and gaze data and UI target data, in accordance with some implementations.

FIG. 6 illustrates use of an exemplary input support framework 640 to generate interaction data based on hands data 610, gaze data 620, and UI target data 630 to produce interaction data 650 that can be provided to one or more applications and/or used by system processes to provide a desirable user experience. In some implementations, the input support process 640 is configured to understand a user's intent to interact, generate input signals and events to create reliable and consistent user experiences across multiple applications, detect input out-of-process and route it through the system responsibly. The input support process 640 may arbitrate which application, process, and/or UI element should receive user input, for example, based on identifying which application or UI element is the intended target of a user activity. The input support process 640 may keep sensitive user data, e.g., gaze, hand/body enrollment data, etc., private; only sharing abstracted or high-level information with applications.

The input support framework 640 may take hands data 610, gaze data 620, and UI target data 630 and determine user interaction states. In some implementations, it does so within a user environment in which multiple input modalities are available to the user, e.g., an environment in which a user can interact directly as illustrated in FIG. 2 or indirectly as illustrated in FIG. 3 to achieve the same interactions with UI elements. For example, the input support process may determine that the user's right hand is performing an intentional pinch and gaze interaction with a user interface element, that the left hand is directly tapping a user interface element, or that the left hand is fidgeting and therefor idle/doing nothing relevant to the user interface.

Based on determining a user intent to interact, the input support framework 640 may generate interaction data 650 (e.g., including an interaction pose, manipulator pose, and/or interaction state). The input support framework 640 may generate input signals and events that applications may consume without needed custom or 3D input recognition algorithms in process. In some implementations, the input support framework 640 provides interaction data 650 in a format that an application can consume as a touch event on a touch screen or as track pad tap with a 2D cursor at a particular position. Doing so may enable the same application (with little or no additional input recognition processes) to interpret interactions across different environments including new environments for which an application was not originally created and/or using new and different input modalities. Moreover, application responses to input may be more reliable and consistent across applications in a given environment and across different environments, e.g., enabling consistent UI responses for 2D interactions with the application on tablets, mobile devices, laptops, etc. as well as for 3D interactions with the application on an HMD and/or other 3D/XR devices.

The input support framework may also manage user activity data such that different apps are not aware of user activity relevant to other apps, e.g., one application will not receive user activity information while a user types a password into another app. Doing so may involve the input support framework 640 accurately recognizing to which application a user's activity corresponds and then routing the interaction data 650 to only the right application. The input support framework 640 may use details about the UIs of multiple, potential target apps to disambiguate input.

Fuzzy Hit Testing Process Examples

Some implementations associate user activities with elements within 3D environments. Some implementations do so in ways that account for inaccuracies (i.e., fuzziness) in sensor-based detection of the user activities, e.g., inaccuracy in sensor data-based gaze tracking or sensor data-based hand/joint positions. Associating user activities with elements can involve "hit testing," which generally refers to identifying user activity corresponding to a potential input and determining where and how to route information about the user activity to a respective UI or other element or otherwise in the system. Some implementations perform hit testing using a sampling technique to associate user activity in a 3D environment with an appropriate element (e.g., portion of a UI) positioned within the 3D environment. For example, a sampling technique may be used to identify sample locations within the 3D environment (e.g., sample locations around a gaze direction/gaze intersect point) to evaluate and ultimately select to associate with the user activity, e.g., associating a particular UI button with a gaze direction. In one example, the user activity is a gaze direction, and a pattern of rays around the gaze direction is generated to identify candidate UI targets from which a UI element is selected to associate with the gaze direction.

In the 2D user interface context (e.g., on mobile and laptop devices), hit testing can start with a touch point (e.g., on a touch screen) and the hit testing may determine to which application or process the touch/hit should be provided/associated. In such a context, an application may perform some or all of such hit testing itself (e.g., using an in-app process specified by the app's code or functions (e.g., from an app development library) embedded within the app's executable code or otherwise used by the app and/or using custom logic developed by the application developer. In such processes, the application may effectively perform in-depth hit testing itself, e.g., determining which element within the application's user interface should receive/respond to a give touch screen tap or other such user activity.

In the 2D context, hit testing may involve evaluating a hierarchical UI structure (e.g., a tree structure) that defines UI element positions and characteristics using a hierarchy. Hit testing may involve starting at a high-level element of the UI structure (e.g., starting at the main window) and recursively moving down the hierarchy/tree (e.g., the window will ask its children given a touch position if the children pass the hit test, the children will ask their children, and so on recursively down the hierarchy/tree). The hit test passing logic may ask is this point inside each hierarchical element's bounds/boundaries. The hit testing logic may provide a visible element area and a hittable area associated with the element where the hittable area has a different size or shape than the visible element. In one example, hit testing logic is utilized so a small dot-shaped element will having a hittable area corresponding to a large square around the dot-shaped element, e.g., passing the elements hit test involves identifying that a hit point is within that bigger zone.

One area of problems overcome by aspects of the present disclosure is enabling hit testing logic utilized by 2D applications for 2D interactions on touch screens via mice, etc. intended for mobile device, laptops, etc. to work in the context of gaze-based and/or other 3D user activities. Gaze and/or other 3D activity tracking may not have the same accuracy and/or characteristics as touch screen and/or other 2D user activities. In addition, aspects of the present disclosure may provide hit testing (e.g., associating user activity with application and other content) in ways that protect user information, e.g., without providing applications unfettered access to user gaze direction information, hand size/shape/activity information, etc.

A touch screen may identify user activity (e.g., identifying a user touching a screen at a particular x,y position) with relative accuracy (e.g., within 100 microns). In contrast, tracking user gaze, hand position/configuration/motion, and/or other 3D user activities may be significantly less accurate. Some implementations disclosed herein provide hit testing and/or other processes that account for the possibility of this greater "fuzziness" in tracking 3D user activity. For example, a device may track a user's gaze with plus or minus 1 degree of accuracy. Thus, if a user is looking at a button (e.g., the edge of a button), the detected gaze ray may appear to be a whole degree outside of the button. Some implementations, evaluate such user activity to determine to associate the gaze direction with the button in spite the gaze being outside of the button to account for the inaccuracy of the system.

Some implementations perform such determinations outside of the application processes, for example, using a system level process to determine which apps, which UI elements within apps, and/or non-app elements to which a user activity is to be associated. Performing some or all aspects of fuzzy hit testing or other such processes outside of an application's process, e.g., via a system process, may provide various advantages. It may expand the capabilities of an app (e.g., an already existing app or an app otherwise configured for another/non-3D platform) not configured for 3D user activity and/or particular user activities (e.g., gaze and/or gesture-based input). It may protect user privacy for example by abstracting user activity data provided to the apps after performing fuzzy hit testing so that information about the user activity is limited (e.g., avoiding the provision of unlimited gaze/hand data). It may account for user activity that (due to fuzziness) could be associated with one of multiple different applications. It may ensure that fuzzy-hit testing and related processes are performed consistently across multiple different applications. It may additionally make it easier to upgrade or change fuzzy hit testing and related processes, e.g., without requiring individual applications to be reconfigured with sensing hardware, hit testing features, or other aspects of the system change over time. It may provide a single stage for fuzzy hit testing (e.g., at the operating system level) that may be more efficient, effective, and/or accurate that performing it at multiple times and/or using multiple stages.

Making an early, accurate decision at the operating system level and using application-specific information may unify fuzzy hit testing for optimal system performance. For example, using a central layer having detailed sensor data (e.g., low-level gaze/pupil data and hands data) as well as detailed application user interface data (e.g., information from an application's UI hierarchy specifying element positions, sizes, characteristics, transparencies, external effects, etc.) may enable a robust, accurate, and efficient system. In some implementations, the system-level fuzzy hit testing information has enough information about application UI elements that it can determine (e.g., without burdening a rendering/display component of the system) which element of the UI is "on top" (e.g., that the user sees) for a given sample position/sample ray direction. Figuring out what UI element is on top can be complex and error prone without such information, e.g., accuracy may be thwarted by rounded transparent corners of a UI element, a transparent hole within a given object, an action figure defined as a cube with transparent regions around the figure's actual shape, etc. Similarly, UI elements may be clipped and/or prioritized in ways that thwart accurate association of UI elements with user activity without sufficient information. Some implementations provide a system process with sufficiently detailed information to perform accurate unified fuzzy hit testing using detailed sensor data, while account for transparencies, clipping, prioritization, and/or while preserving user privacy.

Unifying fuzzy hit testing out-of-process may be particularly useful in the context of determining whether to associate user activity amongst elements in different apps (or different processes hosting UI within the same app, e.g., apps that use an out-of-process photo picker widget). For instance, if a gaze is in between two windows, but only one of the windows has an external effect within a vicinity of the gaze ray, knowing that UI context becomes significant to the lower-level decision of where to route the event for the event to ultimately find that external effect. This may be advantageous in contrast to relying on heuristics such as "pick the window closest the gaze", which may not necessarily identify the window which had the closest external effect.

Moreover, such a system process may provide the information about a user activity (e.g., based on its own fuzzy hit testing) in a way that the user activity will be associated with an appropriate UI element (e.g., based on the app's separate association/fuzzy hit testing process). For example, an app may provide a 2D user interface element that is positioned within a 3D world and a system level process may correct for 3D user activity sensing inaccuracy by determining that a user activity should be associated with a particular element of the app's UI and provide input data such that the app will recognize an input to that element, e.g., providing a 2D interaction point within the bounds of that element.

Some implementations address issues arising from gaze tracking or other 3D user activity tracking processing have relatively low accuracy, e.g., a gaze tracking algorithm having one degree of error such that gaze hit locations may not always be exactly where the user is looking and potentially causing gaze targeting failures in which a gaze point is slightly off/outside of a target. Some implementations provide a system or operating system level process for system-wide hit testing "forgiveness" or "fuzziness" for targeting UI elements with gaze or other 3D user activity.

FIGS. 7A-7B illustrate an exemplary hit detection correction in the context of a user interface element 700 provided by/specified by an application. In this example a user gaze direction 705*a* is determined based on sensor data. The detected gaze direction 705*a* intersects the user interface at a point 710*a* that is outside of user interface element 700. A system-level fuzzy hit detection process is executed and determines that the gaze should be associated with the user interface element 700, e.g., as if the user had gaze in gaze direction 705*b* at point 710*b* within the user interface element 700. The system-level detection process may provide output to the application such that the application will recognize input to UI element 700, e.g., by identifying point 710*b* as an interaction point to the application.

In some implementations, as illustrated in FIGS. 7A-7B, a fuzzy hit testing process is configured to "snap" (i.e., relocate) a point associated with a 3D user activity into the bounds of a nearby UI or other element so that an application correctly interprets the 3D user activity without having to be configured to address the potential lack of accuracy in the sensor data or processes used to detect the 3D user activity. Moreover, a system level process may perform such fuzzy hit testing to pick an appropriate element from elements provided by potentially multiple applications.

FIGS. 8A-8B illustrate 2D and 3D elements which may be positioned within a 3D environment. In this example, such elements are tracking by a simulation process/engine that positions colliders within a 3D coordinate system. Such collider may be used to describe or specify the 2D and 3D geometry of an XR environment. In some implementations, the 3D geometry may include colliders that contain UI features that are specified via multiple layers of complex data structures, e.g., using a hierarchical or tree structure. In some implementations, content within a collider may be specified an application, e.g., using a UI hierarchical structure that encodes UI appearance and characteristics, e.g., an Apple® Core Animations® (CA) structure specifying the rendering pixel images, vector graphics, and/or textures and/or providing animations to provide desirable user experiences. A hierarchical layer structure may be used to specify, for example, the appearance of a window, where buttons are within the window, where text is in the window, etc. 3D elements, e.g., a 3D model or a cube, may be specified without a hierarchical or other UI-specifying structure.

In the examples of FIGS. 8A and 8B, 3D cube 840 and 3D sphere 840 are positioned within respective colliders within a 3D coordinate system. A user interface window 832 having elements (e.g., element 835) that are specified by a hierarchical UI definition/animation structure is also provided. The user interface window (and its elements) is positioned within collider 830 within the 3D coordinate system. The hierarchical UI definition, for example, may specify that the window 832 has a base layer, which has a layer for a platter, which has a layer for a button, and the button may have layers for text and button characteristics. The hierarchical structure of a UI can be simple or complex, small or large, dense or sparse. The hierarchical structure may include layers that specify external effects for UI elements. An external effect may be implemented as a special layer that has behavior/action associated with certain user activity, e.g., hover when gazed upon, etc. An external effect may be used by an application to communicate to an input recognition process the effects that are intended for a particular UI element (e.g., glow when gazed upon, expand when gazed upon, etc.) or that an element should be targetable by the input system (e.g., using either hands or gaze).

In some implementations, a hierarchical layer provides a 2D arrangement of layers that is displayed flat (e.g., in a 2D region) of a 3D coordinate system. In some implementations, one or more of such 2D layers are implemented in a distinguishing way (e.g., protruding slightly from the rest of the layers). Such protruding may be accounted for in displaying the content, determining interactions with the content, and/or prioritizing interactions with portions of the content.

In some implementations, an applications framework controls element sizing. Control sizing may involve accounting for a region around a UI element that acts as visual padding, e.g., providing a region of minimum size for interactions with every element. This may involve ensuring that elements include space around visual features to achieve a minimum element size, e.g., fuzzy hit testing may require a minimum threshold (e.g., 15 pts, 18 pts, 21 pts, etc.). It may involve controlling visual space to be consistent among elements in layouts to ensure fair hit testing amongst elements, e.g., not providing some elements with significantly more space/padding than other elements. It may involve making control sizes static per element, for example, not adapting hit areas for tighter layouts, gaze entry/exit, viewing angle, etc. In some implementations, fuzzy hit testing does not strictly require such parameters. In some implementations, fuzzy hit testing requires such parameters, but enables alternatives to be used, e.g., by application developers wishing to have more customization. Some implementations utilize such parameters but allow for exceptions, e.g., the system may enable use of alternatives. However, since using such alternatives may be complicated, e.g., for developers, some implementations provide fuzzy hit testing, e.g., default mode parameters, that enable a developer to utilize the functionality without having to spend time or other resources accounting for dynamic adjustments and the like.

Some implementations provide an input support process that provides system-wide fuzzy hit testing. This may involve providing fuzzy hit testing in a way that complements hit box sizing by applying additional visual angle forgiveness and prioritization logic. It may involve using a process or algorithm that evaluates which visual targets are near a user activity location (e.g., near a gaze) and snapping the location to a desired target. It may enable dynamic hit areas (i.e., based on layout, viewing angle, gaze entry/exit, etc.) and prioritization of UI elements across contexts.

FIG. 9 illustrates exemplary control regions 910a-e and fuzzy hit test regions 920a-e around elements of a user interface. FIG. 9 illustrates fair visual spacing between the elements 910a-e. The top row of buttons (i.e., UI elements 910a-d) has some spacing built into the buttons, e.g., space around the button label/icon and the displayed button edges. Thus, the control regions 910a-e correspond to the edges of the buttons. On the other hand, the slider (i.e., UI element 910a) has no spacing built in, e.g., no space around the slider bar. Thus, the control region 910e adds spacing to achieve minimum size requirements. Amongst multiple elements within a single UI or across different UIs, a roughly equal amount of spacing may be provided in sizing elements. The control region sizes are also static for the UI elements, i.e., the control regions 910a-e are not adapted or changed unless the respective element itself changes size.

A system may apply fuzzy hit testing to user interactions near one or more of the UI elements of FIG. 9. This may involve defining (e.g., algorithmically) the control regions, detecting (e.g., algorithmically) the UI elements that are nearest a user interaction location (e.g., a gaze point), and snapping (e.g., algorithmically) the interaction point to the nearest edge of a UI element. A dis-ambiguation process or logic may be applied to determine which UI element to snap to of the user interaction location is between controls. Such a process may determine a closest UI element to a user interaction location and/or account for other criteria. This is illustrated in FIG. 9 by the fuzzy hit test regions 920a-e, i.e., user interaction locations within fuzzy hit test region 920a are associated with control region 910a, user interaction locations within fuzzy hit test region 920b are associated with control region 910b, user interaction locations within fuzzy hit test region 920c are associated with control region 910c, user interaction locations within fuzzy hit test region 920d are associated with control region 910d, and user interaction locations within fuzzy hit test region 920e are associated with control region 910e. The fuzzy hit test regions 920a-e are smaller between the controls 910a-e to avoid overlap, e.g., by splitting the distance between adjacent controls. Note that fuzzy hit testing in 3D may be applied based on angular size requirements (e.g., based on 1 degree of gaze angle imprecision). Thus, the fuzzy hit test regions 920a-e may grow and shrink in size (while avoiding overlap), for example, as a user moves closer to or farther away from the user interface or views the user interface straight on or from a significant angle.

Figure 10A:
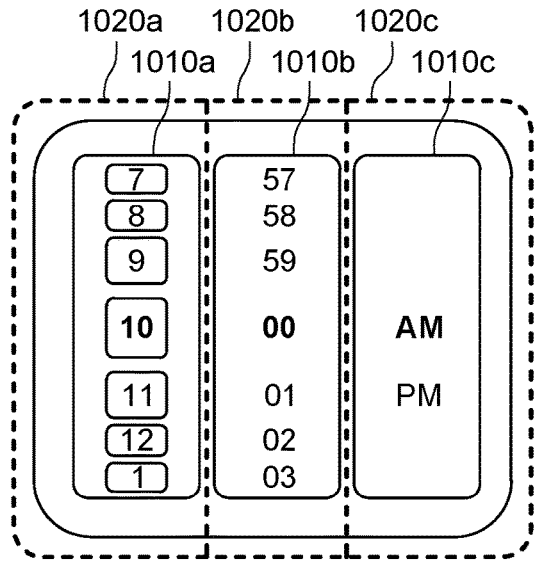
FIGS. 10A-C illustrate exemplary control regions and fuzzy hit test regions around elements of a user interface in accordance with some implementations.
Figure 10C:
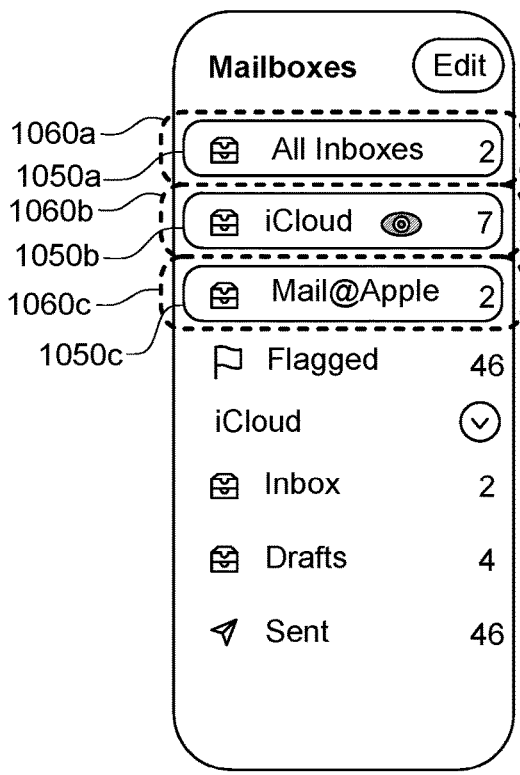
Figure 10B:
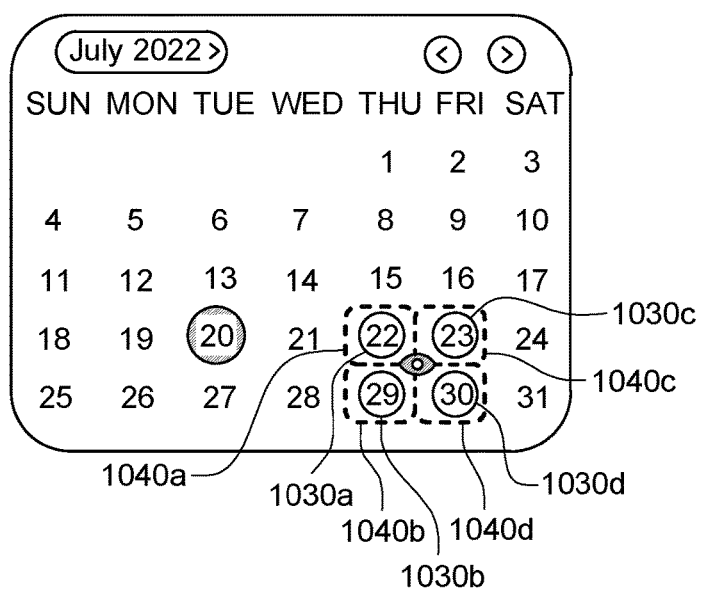

FIGS. 10A-C illustrate exemplary control regions and fuzzy hit test regions around elements of a user interfaces. FIG. 10A illustrates exemplary control regions 1010a-c and fuzzy hit test regions 1020a-c around elements of a user interface. FIG. 10B illustrates exemplary control regions 1030a-d and fuzzy hit test regions 1040a-d around elements of a user interface. FIG. 10C illustrates exemplary control regions 1050a-c and fuzzy hit test regions 1040a-d around elements of a user interface.

Figure 11:
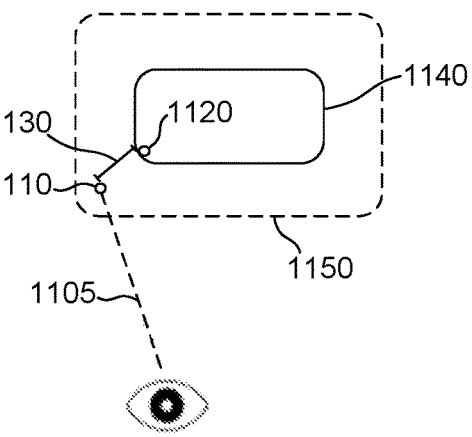
FIG. 11 illustrates a determining of whether to associate a user activity with a user interface element in accordance with some implementations.

FIG. 11 illustrates determining to associate a user activity with a UI element, e.g., of an exemplary fuzzy hit testing process. In this example, a gaze direction 1105 is detected and used to identify UI location 1110, e.g., based on determining that the gaze direction 1105 intersects the UI at UI location 1110 within a 3D coordinate system. In this example, the UI element has a control region 1140 and a fuzzy hit test region 1150 (e.g., which may be based on a minimum angular distance from a closest edge of the control region 1140 or other criteria or policies). Based on the UI location being within the fuzzy hit test region 1150 (e.g., distance 1130 being less than an angular distance threshold), the process determines to associate the user activity with the user interface element. This may involve treating the gaze as if it intersected the UI at position 1120. The position on the UI associated with the user activity may be the closest position on the UI element. It may be the closest position on the UI element that is opaque. It may be the closest position on the UI element that is opaque and not occluded, e.g., by another UI element or virtual object. The position 1120 may be provided to an owner (e.g., application that provided the UI element) so that the application can respond to the user activity appropriately.

Determining whether to associate a user activity with a UI element and/or with which UI element to associate a user activity, e.g., fuzzy hit testing, can involve various processes. In some implementations, it involves (1) discovering UI targets (2) finding a closest point and distance from a user activity location and (3) sorting and/or prioritizing targets according to a policy.

The first step, discovering UI targets, may involve finding all UI targets within a region around a user activity location. For example, a detected gaze direction may be used to determine a user interface location (e.g., a location at which the gaze direction interests a UI). Additional/sample UI locations around the user interface location (e.g., around gaze-direction or otherwise identified user activity location) may be determined (e.g., by generating a scattershot ray pattern configured to detect all UI targets around the UI location that have at least a minimum size (e.g., at least 1° tall). The additional/sample UI locations around the UI location may then be used to identify visible UI targets, e.g., by accounting for transparency, focus level, render order, etc.

The second step, finding the closest point and distance from a user activity location, may involve identifying the closest point within each identified visible UI targets. For example, for each discovered UI target, this may involve computing the closest opaque (e.g., non-transparent) point. It may involve identifying the distance (e.g., angular distance) between the closest opaque point and the user interface location associated with the user activity (e.g., computing angular distance based on the viewpoint location).

The third step, sorting and/or prioritizing targets according to a policy, may involve determining whether multiple UI targets were identified. The process may, when multiple targets are discovered (e.g., within 1° of gaze), select which of the UI targets to associate with the user activity based on a policy. The process/policy may rank targets according to type (e.g., prioritizing external effects such as hover over other layer/geometry type elements). For targets of the same type, the process/policy may prioritize nested targets and then prioritize UI targets having the closest/smallest distance (e.g., angular) to the user activity location (e.g., gaze location). The process/policy may apply hysteresis logic to prioritize previously-identified/associated UI targets, which may avoid flicker, as explained in more detail with respect to FIGS. 13A-B.

Figure 12A:
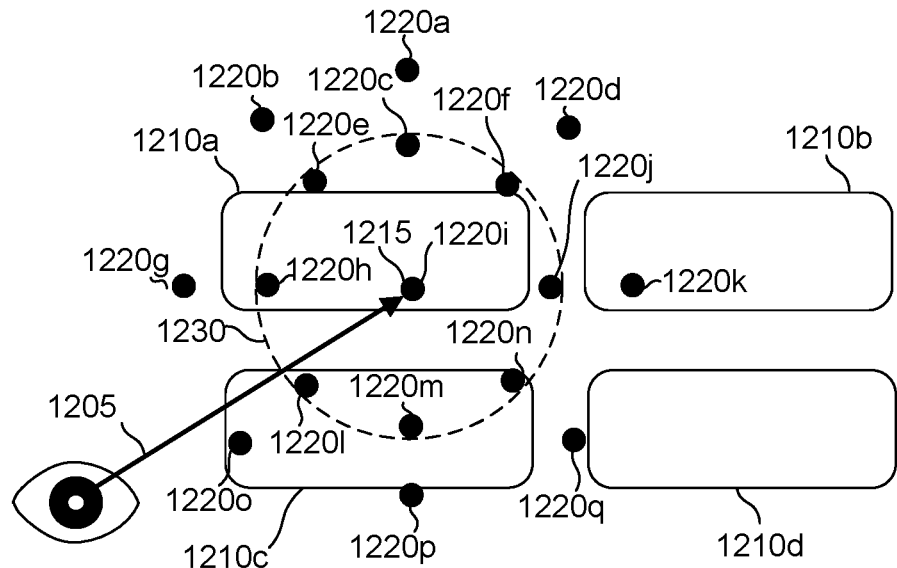
FIGS. 12A-B illustrate using sampling in determining to associate a user activity with an element in accordance with some implementations.

FIG. 12A illustrates using sampling in determining to associate a user activity with a user interface element. In this example, a UI, including UI elements 1210a-d is positioned within a 3D coordinate system in which user activity is assessed. In this example, the user activity is a gaze. The system detects the gaze direction 1205, which may have an expected amount or range or error, e.g., the user's actual gaze direction may be expected to be within 1° of the detected gaze direction with a level of confidence. The detected gaze direction 1205 is used to identify a user activity location 1215. In this example, the user activity location 1215 is a point at which the gaze direction 1205 is determined to intersect the UI.

The user activity location 1215 is used to discover potential UI targets. This may involve finding all UI targets within a region around a user activity location 1215. In this example, additional/sample UI locations 1220*a-q* are identified around the user interface location 1215. The additional/sample UI locations are determined by generating a pattern configured to detect all UI targets around the UI location that have at least a minimum size (e.g., at least 1° in one or more directions, at least a minimum dimension (e.g., height, width, etc.) on a plane of the UI, etc.). The pattern may be generated to correspond to angular requirements by using rays to generate the pattern. For example, a scattershot ray pattern may be generated and the intersections of each of the rays in the scattershot ray pattern used to identify a pattern of sampling locations.

The additional/sample UI locations 1220*a-q* around the UI location 1215 may then be used to identify visible UI targets, e.g., by accounting for transparency, focus level, render order, etc. A given ray (e.g., of the scattershot ray pattern) may intersect with multiple (e.g., 2, 3, 4, 5, 10, etc.) elements (e.g., colliders, external effects, hierarchical UI tree layers, etc.). The process may determine (e.g., via logic) which of the intersected element is on top, opaque, not occluded, etc., e.g., which element that a ray interests is visible based on ordering, transparency, not-clipped by the render system, etc.

The process, in the example of FIG. 12A, determines which element (if any) of the UI is on top for each of the additional/sample locations 1220*a-q*, e.g., for each of the 17 points of the pattern of additional, sample locations. Note that, in this example, one of the sample/additional locations (i.e., sample/additional location 1220*i*) corresponds to the user activity location 1215. The elements determined to be on top for each of the additional/sample locations 1220*a-q* provides a list of (zero or more) candidate UI targets. In the example of FIG. 12, the candidate UI targets include UI elements 1210*a*, 1210*b*, and 1210*c* based on each intersecting at least one of the additional/sample locations 1220*a-q*. UI element 1210*d* is not identified as a candidate UI target since none of the additional/sample locations 1220*a-q* intersect it.

Figure 12B:
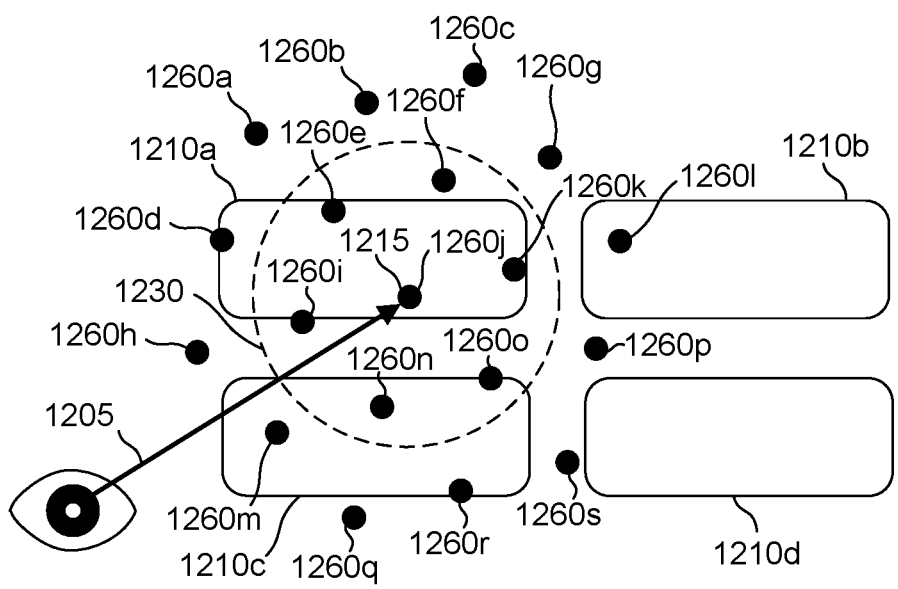

FIG. 12B illustrates an alternative pattern of additional/sample locations 1260*a-s*. Some implementations use an optimized pattern of additional/sample locations (or rays used to generate such a pattern). For example, using a configuration of equally spaced locations (e.g., forming a shape as illustrated in FIG. 12B) may enable the use of a relatively small or minimal number of sampling locations. The configuration may utilize one or more hexagon patterns centered around a gaze location in which the sample locations are equally spaced apart from one another. The pattern may be selected to achieve various objects. For example, the pattern may be configured to ensure that objects having at least a specified minimum size (e.g., minimum height, minimum width, etc.) will be discovered. The pattern may be configured to ensure that at least a region of a particular size will be covered by the pattern as a whole, e.g., ensuring that a region covering a region associated with expected error threshold of the user activity detection (e.g., corresponding to a 1° of error expected in gaze tracking) is covered. In one example, the pattern is configured to ensure that it will capture/detect rectangular UI elements having at least minimum height and/or width dimensions and/or that it will cover a region of the UI corresponding to the gaze detection accuracy using a minimum number of sampling locations. Using a relatively small or minimal number of sampling locations can reduce power consumption, reduce processing requirements, and/or increase processing speed, e.g., making fuzzy hit testing faster and more efficient. Using a tilted pattern can help ensure that long, thin elements displayed horizontally or vertically, e.g., text, is discovered. Tilting may be achieved, for example, by rotating a pattern around a center point at gaze location 1215. Such a rotation may provide rows of elements that are not precisely horizontal and thus may be well suited for certain purposes. A tilted pattern may be well suited to discover (e.g., insure at least one sample intersecting with) long, thin horizontal elements. Sample locations that are not in a horizontal line, e.g., in a slightly diagonal configuration, may provide one or more rows of sample locations that each span multiple horizontal regions, e.g., having variation in both x and y directions.

Determining which element is on top based on a ray within a 3D coordinate system may involve using a physics solver process. For example, each ray may be passed into the physics solver which utilizes a 3D simulation/collision world to determine which collider(s) are intersected by the rays. It may iterate along each ray determining whether each collider corresponds to a 3D virtual object (e.g., a virtual cube, etc.) or hosts UI content (e.g., by hosting UI hierarchical tree elements). In some implementations, a physics solver identifies intersections with colliders and then a separate process is used to determine within a collider which UI element is on top. For example, if the UI within a collider is provided by an Apple® Core Animations® (CA) structure, a CA hit test (e.g., a 2D hit test process) may be performed to identify which UI element is on top at a given location. Determining which element is on top may involve determining whether (and where) given UI elements are opaque or transparent. Such testing may require detailed information about an application's user interface. Performing such testing via a system-level process (i.e., as opposed to within an application's own process) may require the application exposing UI information for system use. In some implementations, one or more applications provide UI information (e.g., a hierarchical structure identifying UI element positions, layering, external effects, etc.) for use by a system-level process (e.g., an input support process) in performing system-level fuzzy hit testing.

The process illustrated in FIG. 12 may involve extracting from the candidate UI targets geometry information, e.g., rectangular shape, dimensions, rounding of corners, which corners are rounded, where there are transparencies, etc. Such geometry information may be used to identify the closest opaque, un-occluded point on a candidate UI target, e.g., the point on the candidate UI target having the smallest distance (e.g., angular) to the gaze 1205/user activity location 1215.

The process illustrated in FIG. 12 may involve using information about the candidate UI targets to prioritize those targets, for example, using a policy to determine which candidate UI target to associate with the gaze. Using a consistent policy across multiple applications or otherwise across the system may provide a consistent user experience, e.g., ensuring that applications have similar behavior with respect to disambiguating user activity. This may help application developers who can design application UI layouts in light of known or otherwise expected user activity interpretation. If a given UI element includes elements that are hard to hit, they will be consistently hard to hit/interact with and a developer can change the UI layout to make the elements easier to hit/interact with.

Some implementations utilize a policy that ranks candidate UI targets based on target types. In some implementations, external effect candidate targets are prioritized over other types of candidate targets. Thus, if a gaze direction is 0.9 degrees from an external effect and 0.2 degrees from a plain UI layer or 3D object, the external effect will be selected in spite of its greater distance. Such a policy may ensure that a gaze within a threshold distance (e.g., within 1° angular distance) of an external effect will always reliably hit the external effect. Such a policy may encourage developers to utilize external effects to specify behavior for important content.

For targets of the same type, a policy may prioritize nested candidate targets. For example, if a button is inside a backing plane (both button and backing plane being of the same type), the policy my prioritize the inner button. Such a policy ensures that inner/smaller UI elements have a minimum fuzziness.

In some implementations, a developer may specify UI elements having higher priority by specifying minor (potentially unnoticeable) 3D positions of the UI elements. For example, a developer may position most UI elements on a 2D plane and certain prioritized UI elements at elevated/popped out positions slightly above the 2D plane. The policy used to prioritize candidate targets may prioritize closer/popped out UI elements, e.g., always picking a UI target when it is popped out.

Some implementations utilize the following policy:
Policy Step 1—Sorting targets of different types:
  External effects win over all other targets
    Example: hyperlinks with external effects "steal" gaze from plain text
  Policy Step 2—Targets of same type
    Nested external effects prioritized
      Example: toggle button has priority over list cell
    Closest angular distance wins
    Angular hysteresis on previous target to prevent target flicker Some UI content, such as text, can be relatively dense, e.g., much denser than 1° angular distance between letters/words from typical viewing positions. A policy can account for such density, for example, in prioritizing certain types of dense content over other types of dense content, e.g., prioritizing hyperlinks over plain text. Some implementations, enable specific/different gestures to allow a user to select low priority content (e.g., text) so that plain text adjacent to a higher-priority hyperlink can still be selected.

FIGS. 13A-13D illustrate hysteresis in determining to associate user activity with user interface elements. This may involve prioritizing a candidate target if the target was previously identified, e.g., prioritizing a button while the user's gaze remains on or near the button. Such prioritization may be accomplished by expanding the target's fuzzy hit test area. Such prioritization may reduce the appearance of flicker which may occur effects are displayed when user activity between two UI elements is alternately associated with a first UI element than the second UI element than back to the first UI element, etc.

Figure 13A:
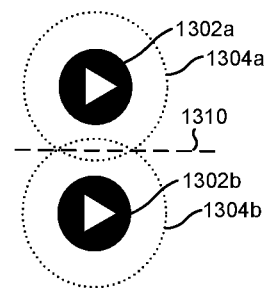
FIGS. 13A-13D illustrate hysteresis in determining how to associate user activity with elements in accordance with some implementations.

In FIG. 13A, during an initial user activity association, each of two UI elements 1302a-b has an equally size fuzzy hit testing region 1304a-b, e.g., each such region determined based on a 1° angular distance. Based on these regions and a disambiguation policy, user activity locations above decision boundary 1310 will be associated with UI element 1302a and user activity locations below decision boundary 1310 will be associated with UI element 1302b. The decision boundary 1310 is equidistant between the UI elements 1302a-b.

Figure 13B:
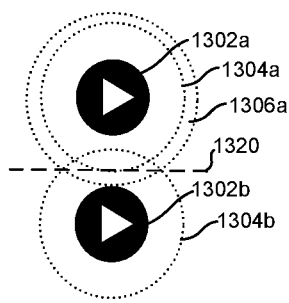

Once UI element 1302a is associated with the user activity (e.g., a gaze at an initial point in time), the regions change. As illustrated in FIG. 13B, subsequent to the initial association, the two UI elements 1302a-b have differently-sized fuzzy hit testing regions. The fuzzy hit test region 1306a is determined based on a 1.2° angular distance and thus is larger than the original fuzzy hit test region 1302a (including for comparison in FIG. 13B). The fuzzy hit test region 1302b remains determined based on a 1° angular distance. Based on these regions and a disambiguation policy, user activity locations above decision boundary 1320 will be associated with UI element 1302a and user activity locations below decision boundary 1320 will be associated with UI element 1302b. This decision boundary 1320 is closer to UI element 1302b than to UI element 1302a, it is no longer equidistant between the two.

Figure 13C:
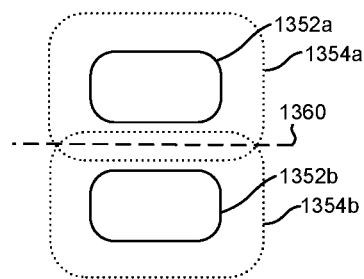

In FIG. 13C, during an initial user activity association, each of two UI elements 1352a-b has an equally size fuzzy hit testing region 1354a-b, e.g., each such region determined based on a 1° angular distance. Based on these regions and a disambiguation policy, user activity locations above decision boundary 1360 will be associated with UI element 1352a and user activity locations below decision boundary 1360 will be associated with UI element 1352b. The decision boundary 1360 is equidistant between the UI elements 1352a-b.

Figure 13D:
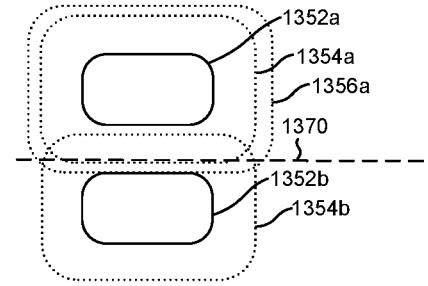

Once UI element 1352a is associated with the user activity (e.g., a gaze at an initial point in time), the regions change. As illustrated in FIG. 13D, subsequent to the initial association, the two UI elements 1352a-b have differently-sized fuzzy hit testing regions. The fuzzy hit test region 1356a is determined based on a 1.2° angular distance and thus is larger than the original fuzzy hit test region 1352a (including for comparison in FIG. 13D). The fuzzy hit test region 1352b remains determined based on a 1° angular distance. Based on these regions and a disambiguation policy, user activity locations above decision boundary 1370 will be associated with UI element 1352a and user activity locations below decision boundary 130 will be associated with UI element 1352b. This decision boundary 1370 is closer to UI element 1352b than to UI element 1352a, it is no longer equidistant between the two.

Direct Touch Examples of Fuzzy Hit Testing

Fuzzy hit testing may be used to improve targeting accuracy with respect to direct touch user interactions. For example, it may be used to improve targeting accuracy with respect to the initial touch point for a direct touch interaction. Inaccuracy in detecting initial touch point location may be the result of sensor inaccuracy (e.g., detecting hand joint locations accurately), depth perception issues (e.g., user's intending to pierce at a location but actually piercing at another location), matting and inclusion errors, parallax errors, and potentially other issues. Fuzzy hit testing may be used to adjust a detected touch down location towards or within a nearby UI element, e.g., the target to which it is closest.

In some implementations, a direction-based fuzzy hit process that is utilized for example for gaze fuzzy hit corrections is additionally or alternatively used to adjust direct touch interaction locations. In some implementations, a direction-based fuzzy hit process used to adjust direct touch interaction locations may use a finger interaction location. For example, a finger interaction location may be determined and a distance determined accordingly for use in positioning sample locations, e.g., based on a 1 degree angular distance away from that location. For instance, if the fingertip is 2 ft away from a user head location/device location, the distance of the samples around the fingertip location may be closer than if the fingertip is 3 ft away.

In some implementations, a direction-based fuzzy hit process used to adjust direct touch interaction locations may use a ray that is unrelated to gaze/viewpoint. As one example, a direct touch targeting ray could be related to the finger's approach trajectory. As another example, such a ray could be a ray from a fixed-point offset from behind the finger. As another example, such a ray could be a ray from to the fingertip to the plane-normal of a nearby collider.

Using a direction-based fuzzy hit process to adjust direct touch interaction locations may involve synthesizing a mock gaze direction based on a detected direct touch location, e.g., determining a ray from a current viewpoint position (real or synthesized) through the detected direct touch location.

For example, at the beginning of a direct touch (e.g., on the first frame at which a direct touch is detected), a fuzzy hit test process is performed using a ray synthetically-generated based on a detected location of the direct touch. For direct touch, the user interface or other elements with which a user is interacting are within arm's reach of the user. Thus, in some implementations, the synthesis of a gaze ray may be based on a viewpoint at a selected distance away from the content, e.g., 0.57 meters away. With such a distance, the forgiveness of the ray-based/angular distance based fuzzy hit testing process may correspond to a desired amount of distance on the plane of the UI, e.g., a 1° angular distance may correspond to 1 cm of radial spacing on the surface of a flat UI 0.57 meters away.

In some implementations, the amount of forgiveness (e.g., 1° angular distance/1 cm Euclidean distance) may be static. In other implementations, the amount of forgiveness (e.g., 1° angular distance/1 cm Euclidean distance) is dynamic. For example, it may scale in size based the approach movement of the hand during a direct touch and/or the piercing speed. Hand approach motion and speed may be indicative of or correlated with user care (e.g., being precise or being loose/sloppy). More precise user activity may be given less forgiveness in fuzzy hit testing (e.g., smaller radius) or a different skew based on the piercing angle, etc. Using a fixed amount of forgiveness may simplify debugging and ensure greater consistency.

A fuzzy hit testing process may then be applied, e.g., as depicted in FIG. 12, to associate the user activity (e.g., the direct touch initial location) with a UI element, e.g., snapping the detected location to a new location within a nearby UI element.

The system may continue to track the user activity, e.g., as the user hand continues to move to swipe, retract, etc., with subsequent positions on the UI being adjusted based on the initial adjustment/starting UI touch point location, e.g., correcting the trajectory of the hand based on the initial correction.

Direct touch fuzzy hit testing may omit accounting for hysteresis. For example, it may not make sense to account for prior user activity in some or all direct touch contexts, e.g., hysteresis may not make sense if a user touches and retracts and then touches and retracts again, etc.

In some implementations, fuzzy hit testing is run only at the beginning of a direct touch user activity (e.g., only on a single frame at or near the beginning of the user activity). Doing so may conserve power, conserve processing resources, and make the process quicker and more efficient than it otherwise might be. Doing so may be appropriate for some types of direct touch but not other types of direct touch. For example, it may be appropriate to run fuzzy hit testing only on the first frame of a direct touch initial touch but appropriate to run fuzzy hit testing to detect hover type direct touch events, e.g., where the finger hovers just above one or another UI element.

Direct touch user activity may involve different types of hover feedback. For example, a system may provide both a glow that tracks a user's finger continuously (e.g., directly below the user's finger anywhere on a UI platter) and UI-element specific hover feedback (e.g., making a button pop out slightly when the user's finger hovers over it). Fuzzy hit testing may be used for one or both of these different types of feedback but may be particularly useful for the second, which requires associating the user activity with a particular (and usually relatively small) UI element rather than a particular spot on a window, platter or other relatively larger UI region.

Fuzzy hit testing may snap a touch location to a point on a nearby UI element and may change the target ID associated with a user activity. For example, a user may hover over a button and the system may pop out the button, identifying the button as the new target of the user activity. If the user misses and hits the backing plane slightly, e.g., misses the bounds of that button, then the system may change the target as well so that if the user pokes the backing plane, they also poke the button that is popped out. This may help address the question of when the touch of a popped-out button occurs, e.g., when the top of the button is touched or when the button is depressed.

Fuzzy hit testing for indirect user activity (e.g., gaze) may be run frequently, e.g., on every frame in some implementations, or less frequently, depending upon the requirements for detecting interactions based on a given user activity.

In some implementations, fuzzy hit testing of direct touch user activity that corresponds to hand touches is guided based on user gaze direction. For example, direct touch fuzzy hit testing may bias UI element association towards a UI element at which a user is gazing during (or just before) a direct touch. Even though a gaze is not overtly part of the user interaction, it can still be useful to disambiguate user intent. In some implementations, on the first frame of a direct touch, a detect touch location, if a gaze direction's fuzzy hit test point (snapped hit test point) is within 1 cm of the detected touch point, then we just accept the detected touch point, e.g., based on the gaze direction being approximately at the same location. This is based on the insight that users tend to look at UI elements as they touch them. Similarly, if a touch fails, a user tends to immediately look at the target that was intended. In the context of relatively dense UIs (e.g., a virtual keyboard), simply using a gaze point as a touch point could lead to incorrect/inaccurate targeting. However, for relatively isolated targets this may provide accuracy and efficiency. Gaze may be used effectively to disambiguate between two direct touch targets, e.g., when the detected touch point is in the region between the two targets.

In addition, the insight that people tend to look before they touch, especially for small buttons, may be used to perform calibration on gaze and/or hand tracking during use of a device. For example, the system may determine that a gaze direction was detected to be off an amount (e.g., 0.5) to the upper left consistently over a number of user interface interactions and adjust the gaze tracking accordingly.

Exemplary Input Support Processes

Figure 14A:
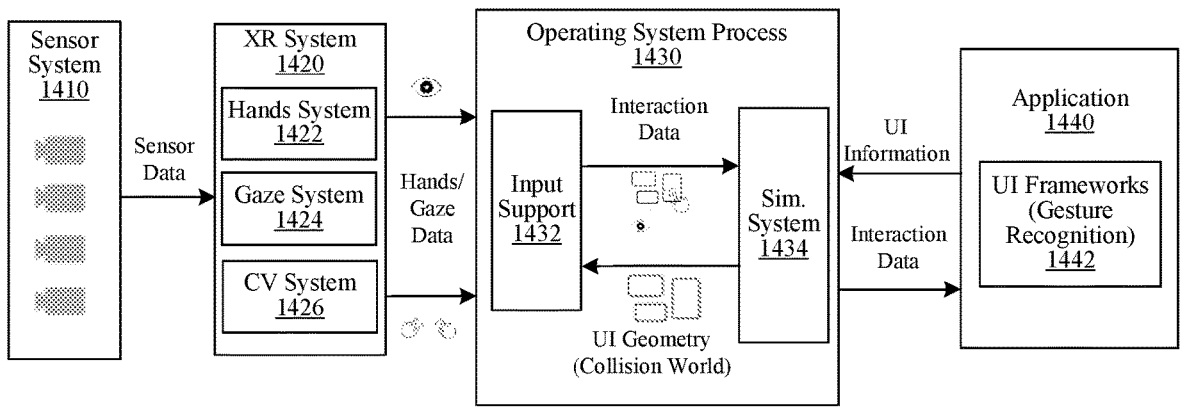
FIGS. 14A-B are flowcharts illustrating methods for supporting application input recognition, in accordance with some implementations.

FIG. 14A illustrates an exemplary architecture that receives user activity data and application UI information at a system process that outputs interaction events data for one or more applications to use to recognize input.

In this example, the sensor system 1410 and AR system 1420 can be considered a sensing layer, e.g., determining where the user's hands are in the 3D world, where the user is gazing in the 3D world, etc., and the OS process 1430 and application 1440 can be considered an interaction layer, e.g., determining what the user is interacting with, how the user is interacting, etc.

The sensor system 1410 may include various sensors, including, but not limited to, color/RGB image sensors, greyscale image sensors, depth sensors, dynamic vision sensors, motion sensors, etc. The sensor systems may include Image Signal Processor (ISP) components and/or other components that process sensor data.

The sensor system 1410 may provide the sensor data to the XR system 420 in various forms. In some implementations, sensor data is sent over time, periodically, and/or at a fixed rate, e.g., at X frames of sensor data per second (fps). In one example, hands data based on images captured by one or more outward facing image sensors (e.g., on a device such as an HMD) is sent to the XR system 1420 at a fixed rate (e.g., 10 fps, 20 fps, 30 fps, 60 fps, 120 fps, etc.). In another example, such hands data is sent at a non-fixed rate or otherwise irregularly. In one example, gaze data based on images captured by one or more inward facing image sensors (e.g., on the inside of a device such as an HMD) is sent to the XR system 1420 at a fixed rate (e.g., 10 fps, 20 fps, 30 fps, 60 fps, 120 fps, etc.). In another example, such gaze data is sent at a non-fixed rate or otherwise irregularly. Hands data and gaze data may be sent to the XR system 1420 at the same or different rates and/or the same or different times. The sensor data may include additional types of information and/or may provide information about other parts of the user or the physical environment in which the user is within. Such other sensor data may be provided at the same or different rates and/or at the same or different times as the hands data and/or gaze data.

The XR system 1420 utilizes the received sensor data to perform user activity monitoring and/or tracking. In one example, the XR system 1420 is configured to provide relatively low-level tracking algorithms. For example, the hands system 1422 of the XR system 1420 may use the sensor data to perform a hand tracking algorithm to track the positions, pose (e.g., position and orientation), configuration (e.g., shape), or other aspects of the hand over time. The hands system 1422 may generate, update, and/or track a 3D model of a hand, e.g., a model of the hand that represents the hand's shape using defined "joints" or nodes that may or may not correspond to the user's physiological hand joints. In one example, a hand model of 20+ joints is maintained over time based on the sensor data such that the hands data generated by hands system 1422 represents the current position/pose/configuration of the hand at different points in time, which may enable determining 3D movements or other changes made by a hand over time. The hands system may alternatively (or additionally) track a subset of points on a surface of the user's hand, e.g., tracking the positions of one or more fingertips/thumb-tips of the user's hand. Such tracking may, but need not, include determining when such portions (e.g., fingertips/thumb-tips) are touching one another and/or other portions of the user or the physical environment. The hands system 1422 may output hand position, pose, and/or configuration information as well as confidence values corresponding to such hand data.

The gaze system 1424 of the XR system 1420 may use the sensor data to perform a gaze tracking algorithm to track eye characteristics such as, but not limited to gaze direction, over time. The gaze system 1424 may use the sensor data to directly (e.g., without modeling the shape of the eye and/or head) determine a gaze direction of one or both eyes. The gaze system 1424 may use the sensor data to generate, update, and/or track a 3D model of an eye, e.g., a model of the eye that represents the eye's shape based on identifying the positions of points (e.g., eyeball center, cornea center, pupil center, etc.), dimensions (e.g., eye-ball diameter, pupil diameter, etc.), and/or surface portions of the eye. In one example, the gaze system 1424 outputs a stream of gaze directions (e.g., vector in 3D space or relative to the user's current position) of each eye over time. In one example, the gaze system 1424 outputs gaze directions and confidence values corresponding to such gaze directions.

The XR system 1420 may include a computer vision (CV) system 1426 that underpins or otherwise supports the hands system 1422, gaze system 1424, and/or other XR system sub-systems (not shown). For example, the CV system 1426 may perform one or more environment and/or user assessment algorithms, e.g., performing simultaneous localization and mapping (SLAM) to model the 3D physical environment and keep track of the user's position relative to that model. In another example, the CV system 1426 may identify objects such as walls, doors, tables, appliances, etc., within the physical environment and/or the positions of such objects. In another example, the CV system 1426 may perform a semantic understanding algorithm to semantically label objects within the physical environment. In another example, the CV system 1426 may use sensor data associated to assess user characteristics (e.g., type of activity currently being performed (e.g., exercise, work, meditation, etc.), posture/motion (e.g., sitting, standing, walking, running, driving, etc.), and/or other user characteristics). Such user characteristic data may be used by hands system 1422 and/or gaze system 1424 to improve their efficiency and/or accuracy.

In FIG. 14A, the XR system 1420 provides hands/gaze data to the operating system process 1430. The hands/gaze data may be provided periodically (e.g., at a fixed frame rate corresponding to the sensor capture rate or otherwise) or irregularly. In one example, the hands data is provided at the same frame rate per second as the gaze data. In another example, the hands data is provided at a different frame rate than the gaze data.

The hands/gaze data received by the operating system process 1430 may be used by the input support process 1432 to (1) itself provide/initiate some responses on to user activity on behalf of the application 1440 and/or (2) provide some information (e.g., interaction data) to the application 1440 to enable the application 1440 to respond to user activity. The input support process 1440/operating system process 1430 may provide an application with information about a first type of user activity (e.g., activity determined to correspond to intentional user interactions with UI elements). Thus, as illustrated in FIG. 14A, the input support process 1432 generates interaction data that is provided to the application 1440. This interaction data provided to the application 1440 may exclude or convert/abstract the hands/gaze data (and other user-based information). The application 1440 may receive only interaction data and thus may not receive data about other types of user activities, e.g., user activity deemed to be something other than an intentional interaction with a UI element such as user activity in which the user is simply gazing over the UI or other portions of an XR environment or during which the user is reading text displayed within the application's UI. Note that, in this example of FIG. 14A, the interaction data provided by the input support process 1432 is provided to the application 1440 via a simulation system 1434. However, in other examples, the input support process 1432 may provide such interaction data to the application 1440 directly or via a different intermediary.

In some implementations, the input support process 1432 uses information about the user interface of one or more applications such as application 1440 to provide input support to those applications. In some implementations, the application 1440 sends user interface information to input support process 1432 that the input support process 1432 utilizes to interpret user interactions associated with the application 1440. For example, the application 1440 may provide information that defines the appearance of a rectangular region containing a set of user interface elements at specified positions and having certain desired interaction capabilities (e.g., selectable, non-selectable, hoverable, non-hoverable, expandable, non-expandable, etc.). The application 1440 may define the type, position, visual appearance, functional characteristics, or other aspects of such elements for use by the input support process 1432. The application 1440 may provide information to the input support process 1432 about its UI elements that defines what information the application 1440 will receive. For example, based on defining a button component, the application 1440 may receive input events associated with the button when the input support system recognizes user activity (e.g., a pinch and gaze, etc.) as an intentional interaction with the button element.

In some implementations, the input support process 1432 may use information about the positioning of an application user interface and/or the user interface elements within such user interfaces to better understand the user's activity and/or intentions and ultimately to provide a more accurate, more enjoyable, or otherwise better experience for the user. For example, the input support process 1432 may use information about the positioning of application user interface and/or the user interface elements within such user interfaces to (a) distinguish user activity associated with a first type of user activity (e.g., intentional interaction events) from other types of user activity, (b) determine to which user activities to respond to directly and to which user activities the application will respond, and thus selectively provide the application 1440 with information limited to the user activities to which the application 1440 will itself respond, (c) respond to some user activity associated with the application 1440 (e.g., providing hover feedback without needing to notify the application 1440), and/or (d) target user activity towards one of multiple applications to which user activity could potentially be intended.

In the example of FIG. 14A, the simulation system 1434 provides the input support process 1432 with UI geometry (e.g., collision world) data to enable the input support process 1432 to better support input to applications and/or other XR environment elements. The simulation system 1434 may generate, update, and/or maintain information about items within a 3D XR environment, e.g., maintaining a current understanding/snapshot view of everything within the environment. This may involve determining where virtual content will be positioned within a XR environment that is based on a user's physical environment. For example, the simulation system 1434 may determine that a first application's UI is to be positioned above the surface of a user's physical desk in an XR environment and a second applications' UI is to be positioned in front of the window to the side of the user's desk.

The simulation system 1434 may determine where to position and how to configure (e.g., by determining container sizes and dimensions) spaces for application UI content to be rendered within a 3D XR environment based on information provided by the applications. In the example of FIG. 14A, the application 1440 provides UI information (e.g., that may include UI element declarations) that the simulation system 1434 uses to determine where to position and how to configure the spaces for the application's user interface. In one example, configuring the application's UI involves determining a position for one or more containers/colliders (e.g., one or more flat rectangular or other 2D shaped windows or one or more square or other 3D shaped bounding areas) in which the applications' UI will be positioned in 3D space. The simulation system 1434 may position containers for each of one or more applications based on the UI information (e.g., UI declarations) provided by those applications. It may account for surroundings (e.g., the size of the room or other characteristics the XR environment), the user's position, activity, and preferences, and numerous other considerations in determining where and how to organize and manage the 3D positioning of objects within an XR environment. Applications need not know (or be informed about) the positions of their user interfaces within a 3D XR environment.

The simulation system 1434 may determine not only the positions of user interface container/collider features such as windows containing all application content but also other user interface elements with respect to which user interactions and user activity may relate. Such user interface elements include, but are not limited to, text elements, buttons, sliders, scroll bars, pickers (e.g., color pickers), menu controls, timelines, images, vector graphics, rulers, icons, and tabs.

Tracking user interface element positions within the 3D XR environment and providing such information to input support process 1432 may enable input support process 1432 to more efficiently, accurately, and effectively support input processes including, but not limited to, supporting input to applications such as application 1440. Moreover, using such information may additionally enable input support process 1432 to do so in a way that protects the privacy of the user by limiting the information about user activity that is exposed to application 1440.

For example, the input support process 1432 may use hands data from hands system 1422 to determine that a user is not currently making a gesture indicative of interaction intent (e.g., hand is not pinching) and use a gaze direction from the gaze system 1424 to determine that the user is gazing at a particular button within the user interface of application 1440 within the 3D environment maintained by the simulation system 1434. The input support process 1432 can use this to initiate an out of process (e.g., outside of the application process) response, e.g., the simulation system 1434 may provide hover feedback highlighting the button to the user. The application 1440 need not receive any information about the user's current user activity (e.g., the user's hand state and/or gaze state) and need not even be aware that the hover feedback was provided by the system. In this example, the input support process 1432 uses the UI geometry information provided by the simulation system 1434 and based on UI information provided by the application

1440 to provide a response on to user activity on behalf of the application 1440 without the application needed to itself be involved. Avoiding providing user activity data about some types of user activity (e.g., unintentional activity) can help protect user private data from application 1440.

In another example, the input support process 1432 may use hands data from hands system 1422 to determine that a user is not currently making a gesture indicative of interaction intent (e.g., hand is not pinching) and use a gaze direction from the gaze system 1424 to determine that the user is gazing at a menu heading within the user interface of application 1440 within the 3D environment maintained by the simulation system 1434. The input support process 1432 can use this to initiate an out of process (e.g., outside of the application process) response, e.g., the simulation system 1434 may provide an expansion of the menu showing previously hidden menu options to the user. The application 1440 need not receive any information about the user's current user activity (e.g., the user's hand state and/or gaze state) and need not even be aware that the menu was expanded. In this example, the input support process 1432 uses the UI geometry information (e.g., identifying the menu and its menu options and their positions within 3D space) provided by the simulation system 1434 and based on UI information provided by the application 1440 to provide a response on to user activity on behalf of the application 1440 without the application needed to itself be involved. Avoiding providing user activity data about some types of user activity (e.g., unintentional activity) can help protect user private data from application 1440.

The input support process 1432 may additionally (or alternatively) use the UI geometry information (provided by the simulation system 1434 and based on UI information provided by the application 1440) to provide information to the application 1440 to respond itself to user activity. In some implementations, such information is limited to only user activity associated with a first type of user activity, e.g., user activity associated with an intentional interaction with a user interface element. The input support process 1432 may provide information (e.g., interaction data) to enable the application 1440 to respond to user activity itself. Such information may process or limit the user activity data (e.g., the hands/gaze data received from the XR system 1420) such that the application 1440 does not obtain detailed user data, e.g., data about specific user gaze directions, user hand size/shape, etc.

For example, the input support process 1432 may use hands data from hands system 1422 to determine that a user is currently making a gesture indicative of interaction intent (e.g., hand is pinching) and use a gaze direction from the gaze system 1424 to determine that the user is gazing at a particular button within the user interface of application 1440 within the 3D environment maintained by the simulation system 1434. Based on determining that this user activity (e.g., pinch and gaze) satisfies criteria to qualify as a first type of user activity (e.g., an intentional interaction with a UI element), the input support process 1432 can generate data (e.g., interaction data) that is different than the raw hands and raw gaze data to send to the application 1440 to enable the application 1440 to respond to the user activity itself. The application 1440 need not receive the raw hands data and/or the raw gaze data associated with the user's current activity and need not even be aware that the user activity was gaze/hands-based. Rather, the data provided to the application 1440 may simply be sufficient for the application 1440 to recognize an input event (e.g., a hit event) to the button of the user interface of the application 1440. Such data may have been abstracted to use input modality agnostic format or a single input modality format that may differ from the input modalities available on the device (e.g., using a touch-screen input modality format). Avoiding providing detailed user activity (e.g., detailed hands or gaze data) can help protect user private data from application 1440.

The data provided to application 1440 that enables the application 1440 to respond to input to its UI elements can have various forms. In some implementations, such data is limited to only certain types of user activity and thus the data format reflects this, e.g., the application 1440 may be provided with data defining an interaction event in circumstances in which the application is to be provided data to respond to intentional UI interaction events. In one example, an application 1440 is only provided information identifying a UI element that was interacted with and the type of event, e.g., button X received a hit type interaction.

In some implementations, an interaction pose is provided to an application 1440. The interaction pose may be 3D or 2D. In some implementations, the interaction pose is 3D but transformed into the application's coordinate system so the applications gesture recognizers (e.g., 2D gesture recognizers) can ignore the "z" value if it is not needed or used. However, in this example, the Z value is there and can be used for gesture recognition. For instance, to recognize long presses in 3D space, gesture recognition may involve determining when the fingertip settles in Z to distinguish that from taps that deeply penetrate the UI and may accidentally exceed the long press timeout (in their aggregate time spent touching the UI).

In other implementations, an application 1440 has an input recognition framework for a particular input environment (e.g., a 2D input environment) and the data provided to the application 1440 mimics the format of that input environment. For example, an application 1440 may be configured with a 2D input recognition framework in which the application 1440 is configured to recognize 2D touch input on a touch screen device, e.g., receiving interaction pose data identifying touch points and directions for user touches to a touch screen interface. Note that the term "pose" here refers to such information identifying a 2D position on a touch screen and/or a direction associated with the touch—it may involve receiving only 2D position or it may involve receiving 2D position and directional data. In this example, such an application 1440 with a 2D input recognition framework may be provided with data that mimics a touch event. For example, the input support process 1432 may use hands data from hands system 1422 to determine that a user is currently making a gesture indicative of interaction intent (e.g., hand is pinching) and use a gaze direction from the gaze system 1424 to determine that the user is gazing at a particular button within the user interface of application 1440 within the 3D environment maintained by the simulation system 1434. The input support process 1432 may generate interaction data that identifies the 2D position of the gaze direction relative to the application's user interface element and provides this as an interaction pose to the application 1440 so that the application 1440 can interpret this as a touch event (e.g., a tap) at that position (on the button) and initiate an appropriate response. The application 1440 need only receive the interaction pose without needing to receive the raw hands or gaze data. In this example, the application 1440 knows the point of interaction (in its 2D space) but does not know (and does not need to know for input recognition purposes) the gaze direction in the 3D space of the XR environment.

In some implementations, the use of input support process 1432 enables execution of application 1440 in an environment different than its original or intended environment. For example, the application 1440 may be originally compiled or intended for execution on a mobile device having a 2D touch screen input environment or a laptop having a 2D mouse/trackpad driven environment. The application 1440 may be executed within a device that offers 3D input modalities and receive data from the input support process 1432 (corresponding to those 3D input modalities that the application 1440 cannot directly recognize) in a format that the application 1440 can recognize, e.g., as a 2D input corresponding to touch screen or mouse/trackpad-driven input. An application intended for a mobile device, laptop, or other device may be executed within an HMD environment that enables 3D interactions without needing to make significant (or any) modifications to the input recognition processes of the application. In one example, an HMD is configured with binary compatibility to mobile and/or laptop devices, e.g., made capable of executing the binary or object code executable of mobile and/or laptop devices) and provides enhanced input capabilities to mobile and/or laptop applications executing on the HMD by utilizing an input support process 1432 that provides data based on user activity in a 3D environment that the applications can recognize as 2D modality-based input.

In the above example, the application 1440 may be provided with additional information. For example, the application 1440 may receive information about the location of the pinching hand, e.g., a manipulator pose. Such hand information may be higher level than the raw hands data. For example, the application 1440 may receive a manipulator pose that identifies the position and/or orientation of the hand within 3D space without receiving information about the hand's configuration and/or information about a 3D model (e.g., of joints) used to represent the hand's positions, pose, and/or configuration in 3D space. In another example, the application 1440 may receive information about an interaction state, e.g., identifying a type of interaction as determined by the input support process 1432.

In the above example, the criteria for identifying a first type of user activity (e.g., activity associated with intentional user element interaction) involves assessing whether the user's hand exhibited a particular configuration (e.g., a pinch gesture) and, based on identifying the hand exhibiting such a configuration, identifying other concurrent user activity, e.g., identifying where the user is gazing at (or near) that time. Such a pinch may be determined based on criteria that assesses the proximity of portions of a user hand model to one another (e.g., how close is the fingertip to the thumb tip, etc.), using a classifier or other algorithm to label or classify a user hand configuration, or otherwise by processing the hands data. Other types of user activity and/or criteria may be used to identify a first type of user activity (e.g., activity associated with intentional user element interaction). For example, a voice command may be recognized as an indicator of intentional activity, e.g., recognizing a key word or phrase such as "select" or "hit" or "tap" or "click this" and then associating a gaze direction and/or other user activity occurring during or near the time of the utterance of the key word or phrase with the intention to interact, e.g., using the other activity to identify the UI element target upon which the action will be taken.

The input support process 1432 may additionally account for sensor-based or other inaccuracies in the hands and/or gaze data. Tracking user application interface element positions within the 3D XR environment and providing such information to input support process 1432 may enable it to account for such inaccuracies. Moreover, it may be desirable to a use a system (shared) process so that such inaccuracies can be accounted for consistently and effectively across multiple applications, e.g., providing a system-level fuzzy hit testing process. In other words, it may be desirable to have a single shared process performing such corrections rather than having individual applications doing so. In one example, a user gazes at a button but the gaze system 1424 generates a user's gaze direction that is slightly outside of the button (e.g., 0.5 degrees outside). The input support process 1432 may correct for this error. For example, it may determine that the gaze was likely actually directed at the button since it is within a threshold (e.g., 1 degree) of the button and there is nothing else nearby. The input support process 1432 may correct for this in providing the data to the application 1440 that enables the application to respond to the user activity. For example, rather than providing an interaction pose slightly outside of the button, it may provide an interaction pose that is within the button, e.g., at the button's edge. The application 1440 thus need not account for the gaze inaccuracy in its own input recognition processes, e.g., it need not itself determine whether an interaction pose just outside of the button should be considered a within the button. This may be particularly useful if the application 1440 uses a framework from another input paradigm, e.g., a touch screen paradigm that utilizes different (potentially much smaller) inaccuracy/error thresholds. Such an application would not have to implement different thresholds for different inaccuracy levels expected in different input modalities. Having the input support process (e.g., an OS process) correct for such inaccuracies may provide more consistent and accurate results without requiring that application developers devote extensive resources to addressing such inaccuracies and/or differences amongst different input modalities.

The application 1440 may provide UI information to the operating system process 1430 in various formats. In some implementations, the application 1440 declares its UI elements, e.g., declaring a hierarchy of UI elements within its user interface. Such declarations may include information/instructions that enable the operating system process 1430 to respond to some user activity on the application's behalf. In some implementations, the application 1440 declares external effects for certain UI elements, e.g., declaring that button X should show hover feedback but that button Y should not show hover feedback. An application 1440 may use external effect declarations to specify the behavior that the application 1440 intends for some or all of its UI elements. The application may provide a hierarchical declaration structure (e.g., an Apple® Core Animations® (CA) structure) that declares UI element positions, sizes, types, hierarchical relationships, transparent portions, layering effects, special effects, and/or any other information that facilitates the functions provided by the simulation system 1434 and/or the input support process 1432. The application 1440 may provide such information over an inter-process communication (or otherwise) to the operating system process 1430.

The input support process 1432 may use such information (e.g., application declarations of UI elements and/or external effects) to better interpret user activity. For example, a given gaze may be between two UI elements, one having external effects and the other not having external effects, and the input support process 1432 may move/snap the gaze to the UI element that has the external effects since it is more likely to be the appropriate/intended UI element to which a UI response should be associated. External effects may be performed out of process without application 1440 being involved.

In some implementations, an application 1440 is enabled to request user permission for specified user data (e.g., detailed hands and/or detailed gaze data) and, if explicitly approved by the user, enabled to receive such information.

In various implementations, hands system 1422 may produce different types of data including, but not limited to, timestamp data, joint position data, POV corrections (e.g., to joint positions), world transform data, joint confidence data, palm center data, palm normal direction data, hand action data, hand radius data, pinch data, object detection data (e.g., regarding an object held or touching the hand), and occlusion data, e.g., occlusion probability data regarding one joint being occluded and thus its data potentially less accurate. Similarly, in various implementations, the gaze system 1426 may produce different types of data including, but not limited to, timestamp data, world transform data, binocular gaze data, gaze confidence data, gaze tracking state data, gaze direction data, gaze origin data, pupil center data, and pupil diameter data. In some implementations, the XR system includes a frame support module that enables better frame drop support via input frame queuing.

Input support process 1432 may have access to rich and detailed hands data and gaze data and use that rich and detailed information to support accurate, efficient, and consistent input responses both within app processes and outside of app processes. However, it may be desirable to keep the details of such rich and detailed user data outside of applications, such as application 1440, for example, to prevent such applications from knowing information about the user that the user considers private, e.g., what the user reads, which content they look at and for how long, how quickly the user reads, how big the user's hands/fingers are, how the user interacts with other applications or aspects of the XR environment, etc.

Figure 14B:
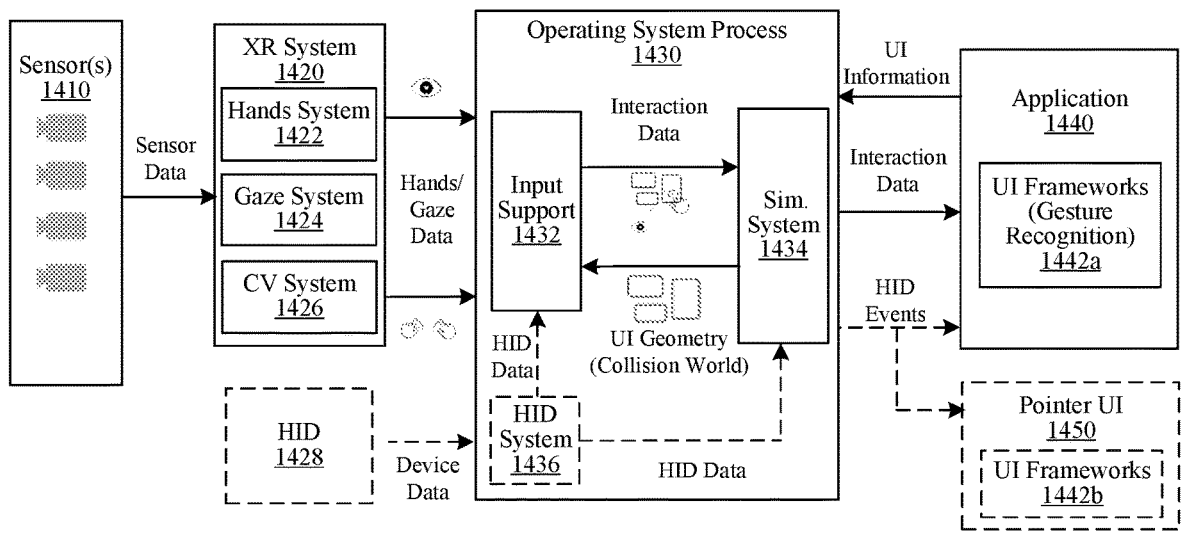

FIG. 14B illustrates another exemplary architecture that receives user activity data and application UI information at a system process that outputs interaction events data for one or more applications to use to recognize input. In this example, the sensor system 1410 and AR system 1420 can be considered a sensing layer, e.g., determining where the user's hands are in the 3D world, where the user is gazing in the 3D world, how the user is using an input device such as a trackpad or controller, etc., and the OS process 1430 and application 1440 can be considered an interaction layer, e.g., determining what the user is interacting with, how the user is interacting, etc.

Sensors(s) 1410 and XR system components (e.g., hands system 1422, gaze system 1424, and CV system 1426) are similar to those discussed with respect to FIG. 14A. In addition, a human interface device (HID) 1428 (e.g., a trackpad, 3D mouse, hand-held controller, etc.) provides device HID data to a HID system 1436. Such device data may correspond to 3D motion or position data controlling a point, an object, a ray or another form of input affordance that is positioned within an XR environment. For example, a user may manipulate the position and orientation of a hand-held controller to direct a ray/vector within the XR environment towards UI elements. The HID1428 may include multiple input mechanisms, e.g., one to position a ray and one to indicate an intention to interact with what the ray is directed towards. In this example, the user may manipulate the HID 1428 and see a visualization of a ray extending from the device in a direction. The user may manipulate the device to point the ray at a button on a user interface of an application and depress a physical button on the HID 1428 (while the ray is pointed at the button) to indicate an intention to interact with the button, e.g., initiating a click, tap, hit, etc. on the button.

In the example of FIG. 14B, the HID system uses the motion data to provide HID data to both the simulation system 1434 (which can position the affordance (e.g., ray, point, etc.) within the 3D XR environment) and the input support process 1432 (which can use the HID data to identify intentional interaction, respond to some interactions on behalf of one or more applications, and/or provide data to the one or more applications to enable the one or more applications to respond to HID events without providing detailed or otherwise private user data to the application.

In one example, the input support process 1432 recognizes that a ray direction from an HID device intersects an application's UI element and initiates an out of process UI response (e.g., hover feedback on the element) without providing information about the user activity to the application.

In another example, the input support process 1432 recognizes a first type of user activity (e.g., an intentional UI element interaction type of activity) based on the HID data satisfying certain criteria (e.g., including an intentional physical button depression, occurring while a keyword/keyphrase is uttered, occurring while the other hand pinches, etc.). The input support process 1432 sends interaction data to the application based on this user activity. Note that the same interaction data may be triggered by different types of user activity, e.g., user activity utilizing different interaction modalities such as direct touch, indirect touch, HID-based, etc. The input support process, as described above, may package the data provided to the application 1440 in a form that the application 1440 can recognize as input without the application needing to have built-in input recognition processes that are specific to some or all of the input modalities. For example, the application 1440 may not include controller-ray direction+button click-based 3D input recognition and the input support process can package interaction data associated with such input in a format that the application can understand, e.g., as 2D touch-based input to a touch screen/2D mouse cursor-based input.

In an alternative implementation, HID data is provided directly to the simulation system 1434 and/or application 1440 without input support process 1432 support.

In some implementations, the HID 1428 is a trackpad and the input support process 1432 fuses gaze direction and trackpad touch data, e.g., with trackpad touch providing an indication of intentional interaction with a UI element and the gaze direction used to identify the target, e.g., UI element, to be associated with that intentional interaction.

In some implementations, the HID events are provided to a pointer UI process (that is potentially separate from the OS process 1430 and/or the application 1440). The pointer UI process may control the positioning of an affordance (e.g., point representation, shape representation, ray representation, etc.) that is displayed to the user via a UI framework 1442*b*. In some implementations, the pointer UI process 1450 and UI frameworks 1442 are within application 1440, i.e., are executed in process by application 1440.

Figure 15:
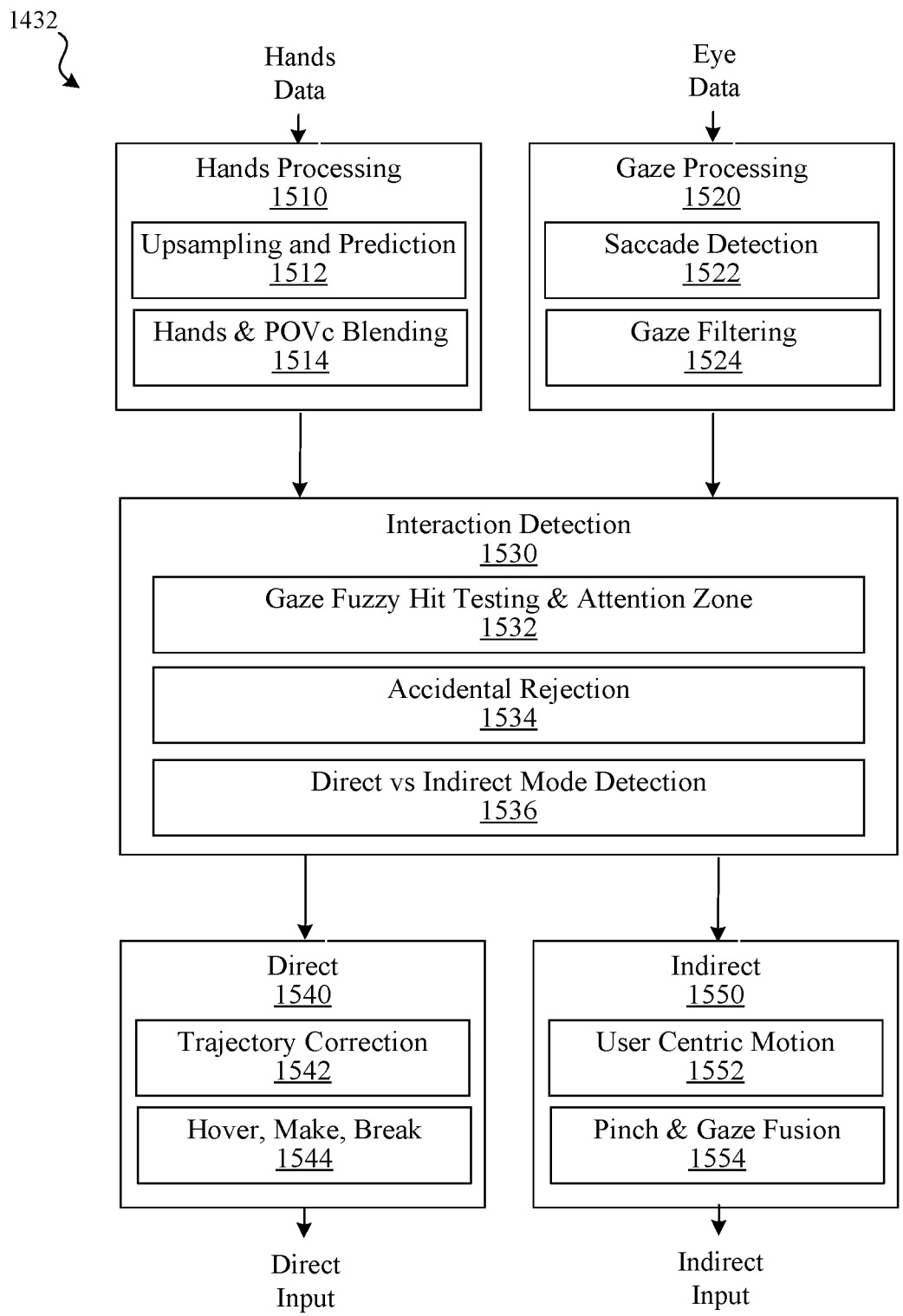
FIG. 15 is a flowchart illustrating another method for supporting application input recognition, in accordance with some implementations.

FIG. 15 is a process flow chart illustrating an exemplary process using hands and eye data to provide direct and indirect input.

In this example, hands data is input to hands processing block 1510. An up-sampling and prediction block 1512 up-samples the hands data (e.g., adding more frames) and makes predictions about future hand locations, paths, trajectories, speeds, accelerations, etc. In some implementations, at a hands input process, the internal states of an upsampler are updated with new observation data from a hands computer-vision-based tracking system. At an interaction detection process, data is received about when the next frame will be rendered, it computes an interpolation/prediction timestamp and queries the upsampler for joints data corresponding to that timestamp. These steps may occur asynchronously and/or at different frame rates. The process may often query upsamples for several predictions at different timestamps in between updates from the computer vision tracking system, e.g., hand tracking may runs at 30 Hz while the display may renders at 90 Hz.

The hands and POVc blending block 1514 may use corrected and uncorrected hand joint data to mitigate POVc-coupled hand jumps, e.g., that may occur due to background depth and camera switching. The Hands and POVc blending block may compute new hand pose information to address discrepancies between the location of the user's hands in the real world (e.g., tracked by computer vision system), and where the hands appear to be located from the perspective of the user looking at the display. The algorithm may smoothly blend the real & POV-corrected versions of the hand skeleton to create hand pose information that is optimized for input recognition in usage contexts where hand registration to UI is important (e.g. during direct input, where a finger must line up with a button). When a user's hands are outside of a user's field of view (FOV) and/or the view of the sensors, it may not make sense to expend resources or may not otherwise be possible to provide corrections, resulting in jumps in hand position. The process may smoothly blend hands data over time, for example, based on whether the user is in a direct or indirect mode, whether the hand is near a UI element or not, or other factors.

The eye data is input to a gaze processing block 1520. The saccade detection block 1522 removes saccades, blinks, and/or other gaze-loss events (e.g., leaving only segments of gaze corresponding to fixations). An example saccade detection process may use gaze confidence, tracking state, pupil center, pupil diameter, inter-pupillary distance (IPD), gaze ray data, and velocity data to detect saccades and blinks for removal and/or identify fixations for gaze interactions. It may distinguish between gaze events that are fixations and gaze events that are saccades to facilitate more accurate gaze-based input. The gaze filtering block 1524 filters and/or smooths the gaze data signal. This may involve smoothing the gaze data during the fixations. Filtering may be tightly coupled to the gaze motion classification. The gaze processing block 1520 may lock/remember the last smoothed gaze location for those interim periods or may leverage additional algorithms/policies to "fill in" the data in between the fixations.

The processed hands and eye data are provided to the interaction detection block 1530. Note that the interaction detection block 1530 may additionally use UI geometry data including data about an application's user interface. The UI geometry data may be provided at a different rate than the hands and/or eye data. In one example, UI data is received at first rate (e.g., 90 fps) while hands and gaze data a received asynchronously at slower average rates (e.g., at 60 fps). The interaction detection block 1130 may additionally use frame target time, e.g., the system's prediction of when this frame will be rendered. The interaction detection block 1530 may run asynchronously, e.g., as UI updates and/or gaze/hands data are received.

The gaze fuzzy hit testing and attention zone 1532 block identify virtual elements (e.g., UI elements) that the user gaze is considered to be associated with and an attention zone, e.g., based on head or device orientation/direction. An example gaze fuzzy hit testing process may use gaze ray data, confidence data, gesture data (e.g., hand motion classification), fixation cluster spread data, etc. to loosen/tighten a gaze area/cone-case based on precision of gaze tracking and/or user behavior. Another example gaze fuzzy hit testing process may use the process described with respect to FIG. 12. These processes may utilize UI geometry from the simulation system 1434 that is based on UI information provided by applications such as application 1440, e.g., identifying interaction targets (e.g., which UI elements to associate with a given user activity) based on declared external effects or the UI elements. Use of such UI information may facilitate more accurate hit testing. In addition to UI geometry, fuzzy hit testing can query more detailed data, e.g., about remote effects, gestures, or other context.

The accidental rejection block 1534 may identify user hand and gaze behaviors that are not intended to interact with the system, e.g., when a user moves his hands to rest, fidgets, or interacts with real world objects, for example, while eating. The accidental rejection block 1534 may identify hand and gaze behavioral instances that were rejected (i.e., associated with subconscious user behaviors that are not intentional interactions) but that are nonetheless still to be associated with virtual elements in appropriate conditions. It attempts to understand the intent behind user motion to better interpret that motion, e.g., as an intentional UI element interaction or something else. An example accidental rejection process may use hand joint data, interaction state history, gaze attention zone data, occlusion data, etc. to reject (or cancel) unintentional user interactions. This process may utilize UI geometry from the simulation system 1434 that is based on UI information provided by applications such as application 1440, e.g., distinguishing user intentional activity from accidental activity based on the UI elements or their declared external effects that are nearby. Use of such UI information may facilitate more accurate accidental rejection. For example, user motion in a Z direction may be identified as accidental based on determining (from application declared data) that the application's UI is 2D/planar and thus that the motion in the Z direction is unlikely to be intended input to the UI, i.e., it is likely accidental motion not intended to trigger UI interaction, and thus the input support process 1432 may be more confident in rejecting the user activity as accidental.

Some implementations support two interaction modes (e.g., a direct interaction mode and an indirect interaction mode). Some implementations support other combinations of interaction modes (e.g., a direct interaction mode, an indirect interaction mode, a gaze-only interaction mode, and/or peripheral device interactions). Processes may be used to determine which, if any, of several interaction models the user is performing. This may involve recognizing and ignoring accidental behavior and also disambiguating which interaction model is intended when the user wants to interact intentionally. In this example, the direct versus indirect mode detection block 1536 uses the processed hands and eye data to determine an interaction mode for interpreting user activity, e.g., selecting a direct interaction mode or an indirect interaction mode.

Based on the detected interaction mode, we then run a pipeline specialized for that mode to generate signals & events to drive that interaction. For example, for the direct interaction mode, the hands and eye data (processed and/or unprocessed) is provided to direct interaction recognition block 1540, which provides direct input to the user interface.

The trajectory correction block 1542 may adjust the trajectory of a user motion, e.g., adjusting a user hand motion to account for user behavior in 3D environments, e.g., to make the motion data better correspond to the user's intended motion/intended interactions. The hover, make, break block 1544 may perform various recognition processes using a hand gesture, motion path, velocity, acceleration, etc. to identify certain types of direct interactions with a user interface element, e.g., a "hover" interaction based on detecting that a hand/finger is proximate but not touching a user interface element, a "make" interaction based on detecting a point (in 3D space/time) that a hand/finger has made contact with a user interface element, a "break" interaction based on detecting a point (in 3D space/time) that a hand/finger has stopped contacting a user interface element, etc.

Numerous types of direct interactions may be recognized and provided as user input. In another example, a direct interaction is recognized by recognizing that the user makes contact with a slider bar user interface element, moves the hand left a distance X while making contact with the slider bar, and then retracts their hand to break contact with the slider bar. The slider bar may be moved left based on this input, e.g., by a distance X. In another example, the user makes a similar motion to provide input imparting a velocity on a user interface element, e.g., providing 3D swipe gesture through on a user interface to cause the user interface to begin moving and continue moving after the hand breaks contact where the continued motion is based on a velocity having been imparted on the UI object, e.g., analogous to when a user swipes up on a multi-touch interface of a mobile phone.

If an indirect interaction mode is selected, the hands and eye data (processed and/or unprocessed) is provided to indirect interaction recognition block 1550, which provides indirect input to the user interface. User centric motion block 1552 accounts for user centric motion in the hands data (e.g., accounting for the fact that the user may be making motions that pivot around a rotation point, e.g., a shoulder, elbow, wrist, etc.). User centric motion block 1552 may be used to map user hand motion into an object or affordance separate from the hand, e.g., an affordance displayed on application content.

The pinch and gaze fusion block 1554 determines which gaze data to associate with a user activity indicative of an intention to interact with a UI element, such as a pinch gesture. Numerous types of indirect interactions may be recognized and provided as user input. In one example, a user pinches fingers together and moves the pinched hand while gazing at a UI element to provide movement input to that UI element. In another example, a user pinches and releases quickly while gazing at a UI element to provide selection events (e.g., analogous to touch screen tap or mouse click input events).

An input support process as illustrated in the example of FIG. 15 may perform one or more core functions. In some implementations these functions include, but are not limited to, obtaining gaze data and associating a user's gaze with UI elements associated with one or more applications. Doing so may involve performing a fuzzy hit testing process. Doing so may involve creating an attention zone. An attention zone can be thought of as a spatial zone/area. It is possible for larger objects to be partially inside/partially outside an attention zone, such that the system needs to test where on the object the user was interacting to understand if an interaction point was inside the user's attention zone. An attention zone may include some or all portions of a set of zero or more UI elements that the user is likely giving attention to at a given time. An attention zone may be used to disambiguate between interaction types (e.g., direct v. indirect input modalities), disambiguate which application a user in interacting with, and/or disambiguate which UI elements are the targets of the user's intentions to interact with UI elements.

In some implementations, an input support process 1432 relies heavily upon a simulation system 1434 to provide a geometric representation of a user interface for hit testing against hands and gaze data. An input support process 1432 may use a collision world (e.g., 3D geometry abstractions) provided by a simulation system 1434. An input support process 1432 may use user interface priority information (e.g., hierarchical display ordering, transparency information, etc.). An input support process 1432 may utilize a separate hit-testing process that produces 3D world hit test results (RE). An input support process 1432 may utilize a hit testing process uses an application-provided hierarchical tree (e.g., declaring UI elements, relationships, and/or rendering information for example regarding what regions are transparent, rendered on top, etc.).

In some implementations, performs the functions illustrated in FIG. 15 to provide an input support process 1432 that produces data for an application. The input support process 1432 may produce an interaction state for one or more UI elements, e.g., identifying whether an interaction is direct or indirect, whether an interaction is a hover/close proximity interaction (e.g., associated with user activity not linked to UI interaction behavior) or gesture/pinch/touch interaction (e.g., associated with user activity indicating UI intentional behavior).

In some implementations, an input support process 1432 provides an interaction pose, e.g., a trajectory corrected point on a UI element configured to drive a touch-screen tap type of input.

In some implementations, an input support process 1432 provides manipulator pose, e.g., corresponding to a position and/or orientation of the hand itself. A manipulator pose may provide a 3D location of a stable hand center or pinch centroid. A manipulator pose may provide position and/or orientation of a manipulator driving the interaction, e.g., for direct touch interactions, providing the index fingertip information (e.g., location) and, for indirect pinch interactions, providing pinch information (e.g., pinch centroid).

In some implementations, an input support process 1432 provides an active target (e.g., UI element).

In one example, a user initiates an interaction by pinching while gazing at a UI element. The application receives an interaction pose on the UI element and recognizes the user's intent to interact with the UI element. The user continues pinching and moves their hand to the left. The application receives more interaction poses, e.g., a set of positions on the user interface based on the moving 3D positions of the hand as it moves left, and responds by moving the associated UI element to the left. In this example, by pinching while gazing at a UI object and then moving the pinched hand to the left, the user provides input that the application can recognize to move the object to the left. The application is able to respond accordingly without needing to receive (and without actually receiving) information about the user's gaze directions and/or specific hand characteristics. In this example, the application receives only interaction pose data and thus may be an application capable of only receiving interaction pose data as a proxy for touch input data. The application may additionally or alternatively be provided with manipulator pose data, e.g., of the 3D positions of the hand as it moves left and may determine the motion of the associated object based on the changing manipulator pose position. The application may be provided with user change-based information, e.g., accelerated user-centric deltas providing delta-updates similar to a trackpad communicating the amount the user has moved from frame-to-frame, rather than an absolute position. Communicating changes, e.g., via a separate API, may helps us optimize one set of signals to accurately represent motion (e.g., for scrolling) separate from signals that also need to be absolute-position-accurate (e.g., for drawing).

In some implementations, an input support process 1432 receives a gaze direction that could potentially be associated with different UI elements, e.g., because it is between the UI elements or because the UI elements overlap one another. Fuzzy hit testing and other such processes may help disambiguate user intention to identify an appropriate UI element in such cases.

In some implementations, an input support process 1432 recognizes two-handed 3D gestures, e.g., a two-handed zoom gesture, and provides information to an application that corresponds to multi-touch touch screen input gestures. Doing so, for example, may involve generating an interaction pose for each hand that can be interpreted by an application's 2D touch-based gesture recognition processes as two touch points moving closer to or farther from one another, which may be interpreted as a pinch-to-zoom touch-screen gesture.

In some implementations, some applications may be enabled to render using custom rendering engines, e.g., straight to display hardware without utilizing OS rendering, and thus provide limited UI element information for input support process 1432 to use to support input recognition processes. Such applications may be authorized to use an API that enables the applications to use filtered hands data (e.g., with upsampling, POVc, etc.) and at the movement of an intentional interaction, e.g., during a pinch, a single gaze ray is provided to the applications. Doing so may enable some custom application input recognition while still protecting most of the user's gaze direction data. The applications do not receive continuous gaze direction data in this example. Such a framework may be appropriate, for example, for applications being migrated from another 3D XR framework that already include 3D recognition capabilities built into the apps, e.g., enabling use of such apps with little or no modification while still protecting user privacy.

In some implementations, an application is developed for use on a mobile platform that uses single and/or multi-touch input gestures. The application may be developed by the application developer including calls to a gesture API and then specifying what to do on certain types of touch events, e.g., do X on a tap event, Y on a swipe event, etc. It may be desirable to use such applications on a new or different platform that offers input modalities different than (or in addition to) single and/or multi-touch input gestures. Rather than implementing all new 3D gestures and gesture recognition processes within the application, some implementations disclosed herein interpret 3D user activity (e.g., hand positions, gaze directions, etc.) and send proxy data to the application corresponding to where a touch would be if the 3D user activity had been performed as a 2D touch input gesture. Input support process 1432 may provide such proxy data to such applications and, in doing so, enable a large universe of existing 2D/touch-based applications to be easily imported and used within a new 3D system that uses new and different 3D user activity-based inputs. Input support process 1432 may make additional information available so that newer/modified application can take advantage/use more information about the user's 3D activity. Alternatively, this information may be leveraged by an old unmodified application that is linking against XR-compatible versions of UI frameworks, which can under-the-hood take advantage of this extra data on the app's behalf (e.g., a binary compatible app using a standard long press recognizer can benefit from an XR-based OS implementation that uses z-depth of the touch to more accurately recognize long press than a native 2D-only approach).

In some implementations, to enable use of both legacy 2D/touch-based applications and newer applications with additional, 3D recognition capabilities, the input support process may provide multiple types of information, e.g., interaction pose data to support touch-based input recognition by a legacy application as well as manipulator pose data to support applications with additional, 3D recognition capabilities.

Interpreting 3D user activity as 2D touch-based activity can require overcoming various challenges. For example, a user's hand movement in 3D space when performing a touch gesture may be equated with a touch-screen tap gesture but may lack the precision expected for a touch-screen tap gesture. A touch on a touch screen involves contact with a physical surface that stops the finger while a motion "virtually" touching a UI in a 3D XR environment may involve the user's hand poking through the UI element. A user may intend to tap the surface of a virtual button but actually poke through the surface at one position and then retract the hand/finger at a slightly different position. This user activity involving two different UI element positions can be interpreted (by an input support process) as a tap at a single point using various algorithms and/or machine learning processes, e.g., performing a trajectory correction. The application receives the single location (from the input support process) and recognizes it as a touch event. Thus, the input support process 1432 may classify and/or interpret user activity to account for unique circumstances of interacting within a 3D environment and package the data provided to the application so that the application does not need to itself distinguish between the action intended by the user and the action actually performed by the user.

The input support process 1432 may account for sensor inaccuracy/limitations, e.g., accounting for the fact that gaze direction that are identified may differ from actual gaze directions, in providing data to applications. The applications need not account for such inaccuracies themselves.

In formatting the data for the application in a format the application will understand, the input support process 1432 can resolve ambiguities, account for inaccuracies, and/or repackage input provided in an input modality that the application does not/need not itself understand into a format that the application does recognize.

In short, the input support process 1432 may perform various process that interpret raw 3D data for consumption by applications so that the applications (and their developers) need not perform those processes via manually-programmed processes. Additionally, performing such processes by a shared OS process can unify the input experience across all apps so that users receive consistent UI response behavior.

Moreover, a shared input support process 1432 may enable multiple interaction modalities, e.g., that provide different ways of a user selecting a button, and abstract the user activity data associated with those different modalities for the same types of interactions to provide that same data to the application for different types of input. The input modalities can thus be changed and/or added to over time without requiring changes to the applications, so long as the input support process 1432 can abstract the new or changed input modality user activities to the format understood by the applications.

In some implementations, an application utilizes a gesture recognizer that runs within the application process. The gesture recognizer may include a state machine that classifies inputs that are received in a stream of input data, e.g., a tap has started, a tap is ongoing, a tap has ended. An input support process 1432 may provide data to the application that are recognized by the gesture recognizer running within the application process as particular types of input, e.g., taps, that may correspond to a single input modality specific to the application, e.g., a touch-based input modality. The input support process 1432 may configure the data provided to the application to ensure that the application's process recognizes the user activity accurately, e.g., by provided data in a form that the gesture recognizer expects. In one example, the input support process 1432 converts user activity involving a user gaze and a hand gesture to data that can be recognized as touch input. In another example, the input support process 1432 converts user activity involve a 6DOF controller and a gaze to data that can be recognized as touch input.

An application developer need not write an application for different input modality platforms. Rather an application developer can write an application for a touch platform (or a generic 2D input modality) and the application may be imported with little or no effort to work within a 3D user activity platform. A single application may be used on mobile devices, laptop devices, tablet devices, desktop devices, and 3D XR devices. The techniques disclosed here can enable bin compat, i.e., an application being executable in different environments that utilize different input modalities.

In some implementations, an input support process 1432 provides a gesture flag and/or gesture classification to an application, e.g., indicating to the application that the user has raised their hand or recognizing that a particular gesture is a tap, swipe, scroll, etc. as a hint that the application can use in recognizing the gesture.

In some implementations, an input support process 1432 facilitates an application recognizing gaze-only input without providing raw gaze data to the application. This may involve periodically provide gaze data (i.e., the location on a UI element that the user is gazing at). Gaze-only data may be associated with an interaction state and data provided to the applications based on gaze-only data only when the gaze data is associated with a particular interaction state, e.g., providing data when a gaze-hover state is applicable. Such data may be provided only based on express user authorization. For example, when a user stares at a UI element for more than a threshold amount of time the application may be notified and an affordance may be displayed (e.g., a dot). If the user then looks at the affordance, the application may be notified that the stared at UI element has been hit/selected. In another example, a stare at a point within a UI element for more than a threshold amount of time may trigger a hover feedback, which may be handled out of process or by the application. A gaze-only input modality may be another input modality that is abstracted into data provided to an application such that the application can interpret the input, e.g., using a generic or touch-based gesture recognition process.

In some implementations, an input support process determines an interaction state for each hand (e.g., direct versus indirect) and/or an interaction state associated with a user gaze (e.g., gaze only or not gaze only).

Figure 16:
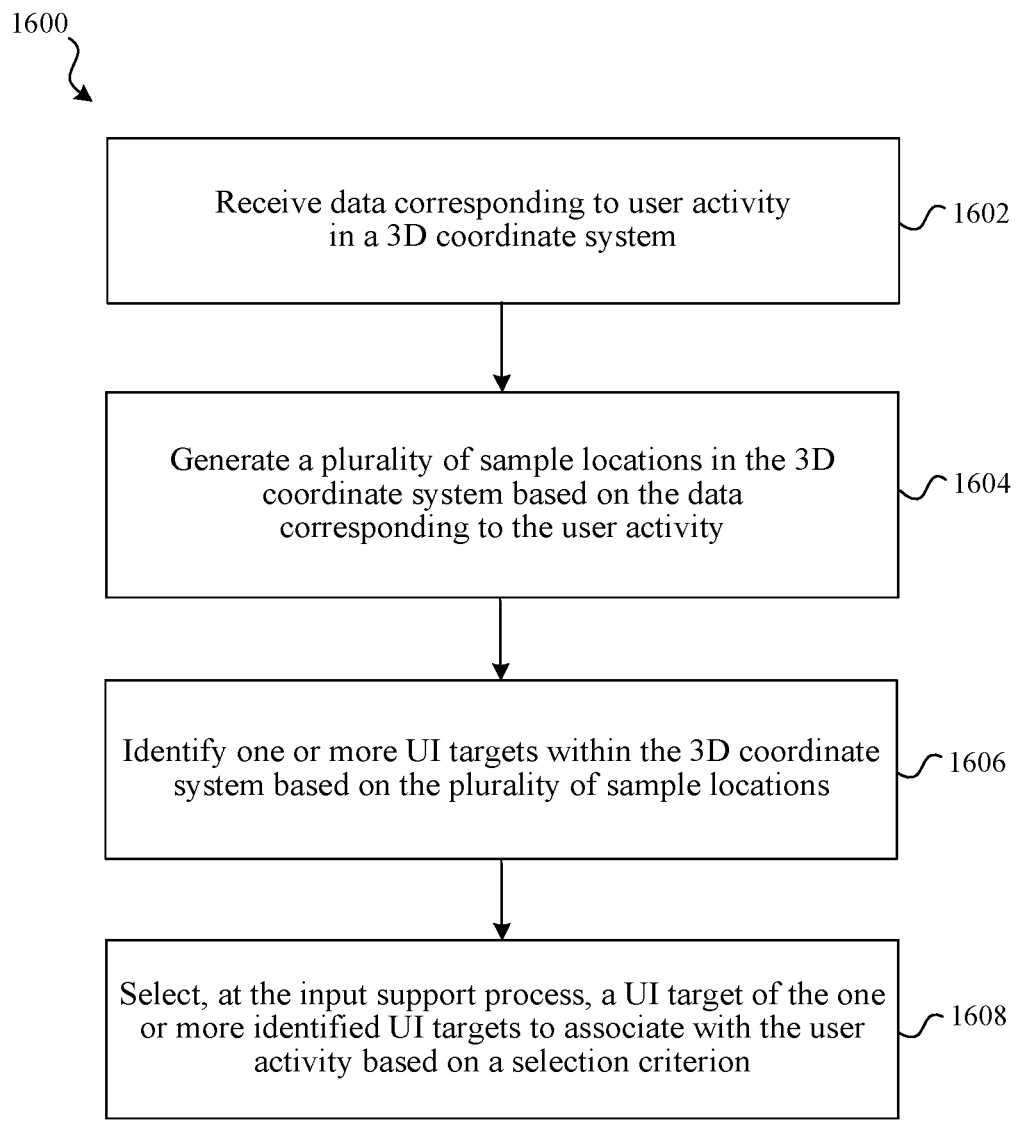
FIG. 16 is a flowchart illustrating a method for supporting application input recognition using sampling, in accordance with some implementations.

FIG. 16 is a flowchart illustrating a method 1600 for supporting application input recognition using sampling. In some implementations, a device such as electronic device 105 or electronic device 110 performs method 1600. In some implementations, method 1600 is performed on a mobile device, desktop, laptop, HMD, or server device. The method 1600 is performed by processing logic, including hardware, firmware, software, or a combination thereof. In some implementations, the method 1600 is performed on a processor executing code stored in a non-transitory computer-readable medium (e.g., a memory). The method 1600 may be performed at an input support process, e.g., via a OS or system-level process.

At block 1602, the method 1600 receives data corresponding to user activity in a 3D coordinate system. In some implementations, the data corresponding to the user activity is a gaze direction within the 3D coordinate system, the gaze direction determined based on sensor data, e.g., a gaze direction identified at every frame during indirect touch. In some implementations, the data corresponding to the user activity is a synthesized direction within the 3D coordinate system. Such a synthesized direction may be determined based on determining a hand position of a hand in the 3D coordinate system based on sensor data, determining an intersection position of the hand with at least one UI element based on the hand position, and determining the direction based on the intersection and a viewpoint position, e.g., a ray from eye to touch point synthesized on the first frame of a direct touch.

The data corresponding to the user activity may include but is not limited to including hands data, gaze data, and/or human interface device (HID) data. Various combinations of two or more different types of data may be received, e.g., hands data and gaze data, controller data and gaze data, hands data and controller data, voice data and gaze data, voice data and hands data, etc. Different combinations of sensor/HID data may correspond to different input modalities. In one exemplary implementation, the data includes both hands data (e.g., a hand pose skeleton identifying 20+ joint locations) and gaze data (e.g., a stream of gaze vectors), and both the hands data and gaze data may both be relevant to recognizing input via a direct touch input modality and an indirect touch input modality.

At block 1604, the method 1600 generates a plurality of sample locations (e.g., based on a pattern of rays) in the 3D coordinate system based on the data corresponding to the user activity. The 3D coordinate system may combine 3D virtual objects and 2D app content, e.g., providing 3D colliders at positions within the 3D coordinate system. The plurality of sample locations may be generated by generating a pattern of rays around a gaze direction or a synthesized direction corresponding to user activity. In various implementations, the pattern of rays has between 2 and 100 rays, or between 5 and 35 rays. In some implementations, the pattern of rays has 15 rays, 16, rays, 17 rays, 18 rays, 19 rays, 20 rays, 21 rays, 22 rays, or 23 rays. In some implementations, the pattern of rays comprises equally spaced rays. In some implementations, the pattern or rays form a square shape, a circular shape, a pentagon shape, a hexagonal shape, an octagon shape, etc. In some implementations, the pattern of rays forms a shape that is rotated relative to a horizon or a horizontal, e.g., a pattern of 15-25 rays in a pattern rotated by 5-10 degrees. In various implementations, the pattern may include locations or rays configured to be spaced to ensure that UI elements of particular size and/or shape are detected. The pattern may change over time, e.g., frame to time. For example, the pattern for each frame may include randomly positioned rays/points generated based on a user activity (e.g., gaze ray or gaze ray intersection point).

At block 1606, the method 1600 identifies UI targets within the 3D coordinate system based on the plurality of sample locations. Identifying the UI targets may involve identifying 3D virtual objects (e.g., based on intersections with colliders corresponding to 3D virtual objects) and/or UI elements (e.g., identifying 3D elements defined by one or more applications based on identifying intersections with colliders corresponding to UI high-level/high layer elements and then traversing the associated UI hierarchical structures to identify lower-level/lower-layer elements).

Identifying the UI targets may involve receiving data corresponding to positioning of UI elements of an application within the 3D coordinate system (e.g., in a UI geometry collision world), the data corresponding to the positioning of the UI element based at least in part on data (e.g., positions/shapes of 2D elements intended for a 2D window area) provided by the application. An application may provide a layered tree with some layers identified for remote input effects. Such information may be provided to a simulation process that positions the application element in the 3D space, e.g., by defining the 3D position of one or more colliders (e.g., each having a rectangular window area) in the 3D space for the app elements. Data provided by an application may include a layered tree structure defining the positional and containment relationships of the UI elements relative to one another on a 2D coordinate system. Data provided by the application may identifies external effects for some of the UI elements, where an external effect specifies that an OS process is to provide responses to a specified user activity relative to a specified UI element outside of an application process, (e.g., perform hover feedback on this button out of process.

Identifying the UI targets may be based on identifying intersections of the plurality of gaze sample locations with the UI elements of the application positioned within the 3D coordinate system. If a random sampling pattern is used for each frame, intersection locations may be tracked to resample the same locations on subsequent frames.

At block 1608, the method 1600 selects a UI target of the identified UI targets to associate with the user activity based on a selection criterion. Selecting the UI target to associate with the UI activity may involve, for each of the identified UI targets, determining a point on the respective UI target based on the user activity, and prioritizing the identified UI targets based on the point computed for each respective UI target. Determining the point on each respective UI target may involve determining a closest opaque point to a sample location associated with the user activity (e.g., a location the gaze direction/ray intersects the UI). It may involve determining a distance (e.g., angular distance) of the closest opaque point of each of the respective UI targets to the sample location associated with the user activity.

Selecting the UI target to associate with the UI activity may be based on determining that a closest opaque point within the UI target is within an angular distance threshold of a sample location associated with the user activity.

The UI target selected to associate with the UI activity may be selected based on determining that closest opaque points within multiple UI targets are within an angular distance threshold of a sample location associated with the user activity and selecting the UI target from the multiple UI targets based on a policy that ranks UI targets based on element type, UI layers, UI geometry, or hysteresis logic. In some implementations, when multiple targets are within a threshold (e.g., 1° of gaze) of the user activity location, the selected UI target is selected based on a policy that ranks targets according to type (e.g., ranking external effects above non-external effect type elements). The policy may select amongst elements of the same types based on other criteria, e.g., for targets of the same type prioritizing (1) nested targets and then (2) closest distance (angular) to user activity location. Some implementations apply hysteresis logic to prioritize previous targets to avoid flicker, as described with respect to FIG. 13.

In some implementations, the UI elements of the application occupy 2D region and the method 1600 further comprises, based on selecting the UI target to associate with the user activity, identifying a point within the 2D region to an associated application (e.g., the owner of the UI target) such that the application can recognize an action (e.g., selection/hit/hover) to associate with the UI element using a 2D app action recognition process.

In method 1600, the method provides views of a 3D environment including the UI targets and/or other 3D objects. Some or all of the UI targets may be 2D user interface elements provided by one or more applications. An input support process may recognizes the user activity in the 3D coordinate system and provide data to the one or more applications (e.g., to the respective owner of each UI element associated with a user activity) to recognize 2D user interface input.

In some implementations, the operating system manages information about a virtual and/or real content positioned within a 3D coordinate system. Such a 3D coordinate system may correspond to an XR environment representing the physical environment and/or virtual content corresponding to content from one or more apps. The executing application may provide information about the positioning of its UI elements via a layered tree (e.g., a declarative, hierarchical layer tree) with some layers identified for remote (i.e., out of app process) input effects. Such information may be provided via an inter-process communication to a simulation process (e.g., simulation system 1434 of FIGS. 14A and 14B) that positions the application UI element in the 3D coordinate system, e.g., by defining the 3D position of one or more colliders (e.g., each having a rectangular, cubic, or other-shaped window area) in the 3D coordination for the application UI elements to be positioned within.

The method 1600 may identify data for an application that may include interaction event data. Interaction events may be selected by identifying only certain types of activity, e.g., user activity determined to correspond to a first type of user activity versus one or more other types of user activity. In some implementations, this involves identifying user activity that satisfies criteria configured to distinguish intentional actions on UI elements from other types of user activity. In some implementations, identifying a first type of user activity involves identifying user activity of a first type that is deemed to be intentional and excluding types of activity such as gaze-only activity that are deemed to be unintentional interactions.

The interaction event data may include an interaction pose (e.g., 6DOF data for a point on the app's UI), a manipulator pose (e.g., 3D location of the stable hand center or pinch centroid), an interaction state (i.e., direct, indirect, hover, pinch, etc.) and/or identify which UI element is being interacted with.

The interaction data may exclude data associated with user activity occurring between intentional events. The interaction event data may exclude detailed sensor/HID data such as hand skeleton data. The interaction event data may abstract detailed sensor/HID data to avoid providing data to the application that is unnecessary for the application to recognize inputs and potentially private to the user.

The input support process may respond to some user activities on behalf of the application without necessarily involving or notifying the application of the user activity or the provided response. For example, the input support process may respond to some user activities by adjusting the appearance of displayed application content without notifying the application, e.g., providing hover feedback based on gaze without notifying the application of the user activity triggering the feedback or of provision of the hover feedback.

Access by the application to at least some of the data corresponding to the user activity may be withheld. An application process may recognize input to the application based on the data it receives, e.g., based on interaction event data. An input support process may provide data sufficient for the application to recognize input while avoiding providing the application access to user activity data that is not associated with identified interaction events. Similarly, it may provide abstracted data to avoid providing detailed user activity data, e.g., not providing access to hand skeleton data. The data may be formatted to be recognized by a 2D input recognition process executed within the application, e.g., by an input recognition process configured to recognize abstracted input data and/or input corresponding to an input modality from a legacy or different system, e.g., an input recognition process configured to receive 2D touch-based input.

The method 1600 may display a view of an XR environment corresponding to the 3D coordinate system, where the UI elements of the application are displayed in the view of the XR environment. Such an XR environment may include UI elements from multiple application processes corresponding to multiple applications and the input support process may identify the interaction event data for the multiple applications and route interaction event data to only the appropriate applications, e.g., the applications to which the interactions are intended by the user. Accurately routing data to only the intended applications may help ensure that one application does to misuse input data intended for another application.

The OS may provide an OS process (e.g., a shared 3D environment tracking/simulation process) configured to perform the method 1600 outside of the application process. The 3D environment/simulation may be provided for use in tracking virtual content provided by multiple sources, e.g., by the OS itself, multiple system and/or non-system applications provided by the OS provider and/or 3rd parties, etc. The OS may provide an OS process that includes a simulation process configured to perform a simulation of a 3D environment based on a physical environment associated with the 3D coordinate system. Such a simulation process positions the UI elements of the application within the 3D coordinate system based on data provided by the application. It may do the same for multiple applications and may adjust the positioning of such application content within the 3D coordinate system, e.g., based on which application the user is focused upon, user input, and/or other criteria. In one example, the simulation process positions the UI elements by: positioning one or more components within the 3D coordinate system (e.g., positioning colliders (e.g., each having a rectangular window area, cube shape, or other shape) with the 3D coordinate system; and positioning the UI elements of the application on/within the one or more components. The positioning of the UI elements of the application on the one or more components may be defined based on the data provided by the application. The application may be unaware of the positioning of the one or more components within the 3D coordinate system.

In some implementations, the data provided by the application includes a layered tree structure defining the positional and containment relationships of the UI elements relative to one another on a 2D coordinate system. In some implementations, the layered tree structure defines such positioning for a legacy input modality (e.g., a touch screen modality or 2D desktop/laptop cursor-driven modality). The data provided by the application may identify external effects for some of the UI elements. Such a external effect may specify that the OS process is to provide responses to a specified user activity relative to a specified UI element outside of the application process (e.g., perform hover feedback on this button out of process). The data provided by the application may be provided to the OS process via an inter-process communication link.

The data corresponding to the user activity may have various formats and be based on or include (without being limited to being based on or including) sensor data or HID data. In some implementations, the data corresponding to the user activity includes gaze data including a stream of gaze vectors corresponding to gaze directions over time during use of the electronic device. The data corresponding to the user activity may include hands data including a hand pose skeleton of multiple joints for each of multiple instants in time during use of the electronic device. The data corresponding to the user activity may include both hands data and gaze data. The data corresponding to the user activity may include controller data and gaze data. The data corresponding to the user activity may include, but is not limited to, any combination of data of one or more types, associated with one or more sensors or one or more sensor types, associated with one or more input modalities, associated with one or more parts of a user (e.g., eyes, nose, cheeks, mouth, hands, fingers, arms, torso, etc.) or the entire user, and/or associated with one or more items worn or held by the user (e.g., mobile devices, tablets, laptops, laser pointers, hand-held controllers, wands, rings, watches, bracelets, necklaces, etc.).

In some implementations, the interaction event data, which may be provided to an application, includes one or more of: an interaction pose including position and/or orientation data for an interaction point within the UI elements of the application; a manipulator pose including position and/or orientation data corresponding to a hand within the 3D coordinate system (e.g., 3D location of the stable hand center or pinch centroid); and/or an interaction state including data identifying a type of interaction. The interaction data may include interaction event data that includes an interaction pose, a manipulator pose, and an interaction state, and the receiving application's input recognition process may select which information to use. Some applications may only use some of the data (e.g., a touch-based input recognition process may use only interaction pose) while other applications may use all of the data.

The interaction event data may identify a UI element being interacted with during an interaction event. An application may use this to identify which of its UI elements is the target of the user's interaction or may use the other data (e.g., identifying which UI element an interaction pose is on) to identify which of the UI elements is the target of the user's interaction.

In some implementations, the interaction event data provided to the application excludes data associated with interaction events associated with applications other than the application.

In some implementations, the method 1600 is performed by an electronic device that is a head-mounted device (HMD) that may provide an XR environment that is a virtual reality environment or an augmented reality environment.

Some implementations provide output to applications that the apps can recognize as existing touchscreen/2D input, e.g., mobile device apps do not need to change their own 2D fuzzy hit testing or otherwise to account for the fuzziness of the underlying 3D user activity, e.g., inaccuracy in sensor data tracking gaze (indirect) or hand/joint position (direct).

Figure 17:
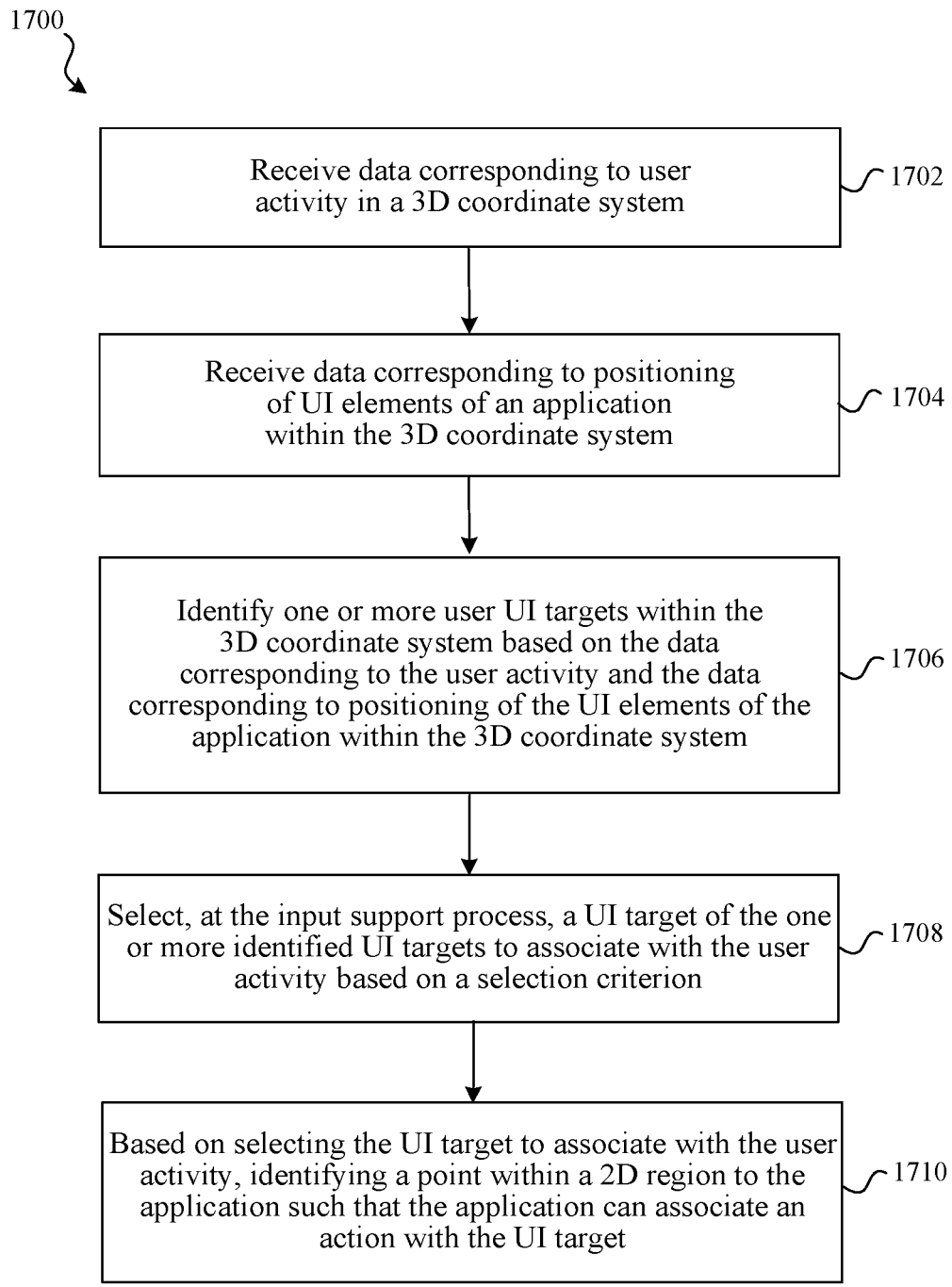
FIG. 17 is a flowchart illustrating a method for supporting application input recognition supporting application user activity recognition, in accordance with some implementations.

FIG. 17 is a flowchart illustrating a method 1700 for supporting application input recognition supporting application user activity recognition. In some implementations, a device such as electronic device 105 or electronic device 110 performs method 1700. In some implementations, method 1700 is performed on a mobile device, desktop, laptop, HMD, or server device. The method 1700 is performed by processing logic, including hardware, firmware, software, or a combination thereof. In some implementations, the method 1700 is performed on a processor executing code stored in a non-transitory computer-readable medium (e.g., a memory). The method 1700 may be performed at an input support process, e.g., via a OS or system-level process.

At block 1702, the method 1700 receives data corresponding to user activity in a 3D coordinate system. This may be similar to receiving data corresponding to user activity as described with respect to block 1602 of method 1600.

At block 1704, the method 1700 receives data corresponding to positioning of UI elements of an application within the 3D coordinate system (e.g., a UI geometry collision world). The data may correspond to the positioning of the UI element based at least in part on data (e.g., positions/shapes of 2D elements intended for a 2D window area) provided by the application. The data provided by the application may include a layered tree structure defining the positional and containment relationships of the UI elements relative to one another on a 2D coordinate system. The data provided by the application may identify external effects for some of the UI elements, where an external effect specifies that an OS process is to provide responses to a specified user activity relative to a specified UI element outside of an application process (e.g., perform hover feedback on this button out of process).

At block 1706, the method 1700 identifies UI targets within the 3D coordinate system based on the data corresponding to the user activity and the data corresponding to positioning of the UI elements of the application within the 3D coordinate system.

At block 1708, the method 1700 selects a UI target of the identified UI targets to associate with the user activity based on a selection criterion.

At block 1710, the method 1700, based on selecting the UI target to associate with the user activity, identifies a point within a 2D region to the application such that the application can associate an action (e.g., selection/hit/hover/etc.) with the UI target. The selection of the UI target to associate with the user activity may involve selection processes such as those described with respect to block 1608 of FIG. 16.

The application may include a 2D input recognition framework configured to associate actions with the UI targets based on 2D position data. Such a 2D input recognition framework may be configured to recognize (a) touch input corresponding to touch points on a 2D touch screen interface and/or (b) a 2D mouse cursor position or a 2D trackpad cursor position within a 2D user interface.

The method 1600 and 1700 may involve fuzzy hit testing as described and illustrated throughout this disclosure, e.g., using exemplary processes described with respect to FIG. 12 and elsewhere in this disclosure.

Figure 18:
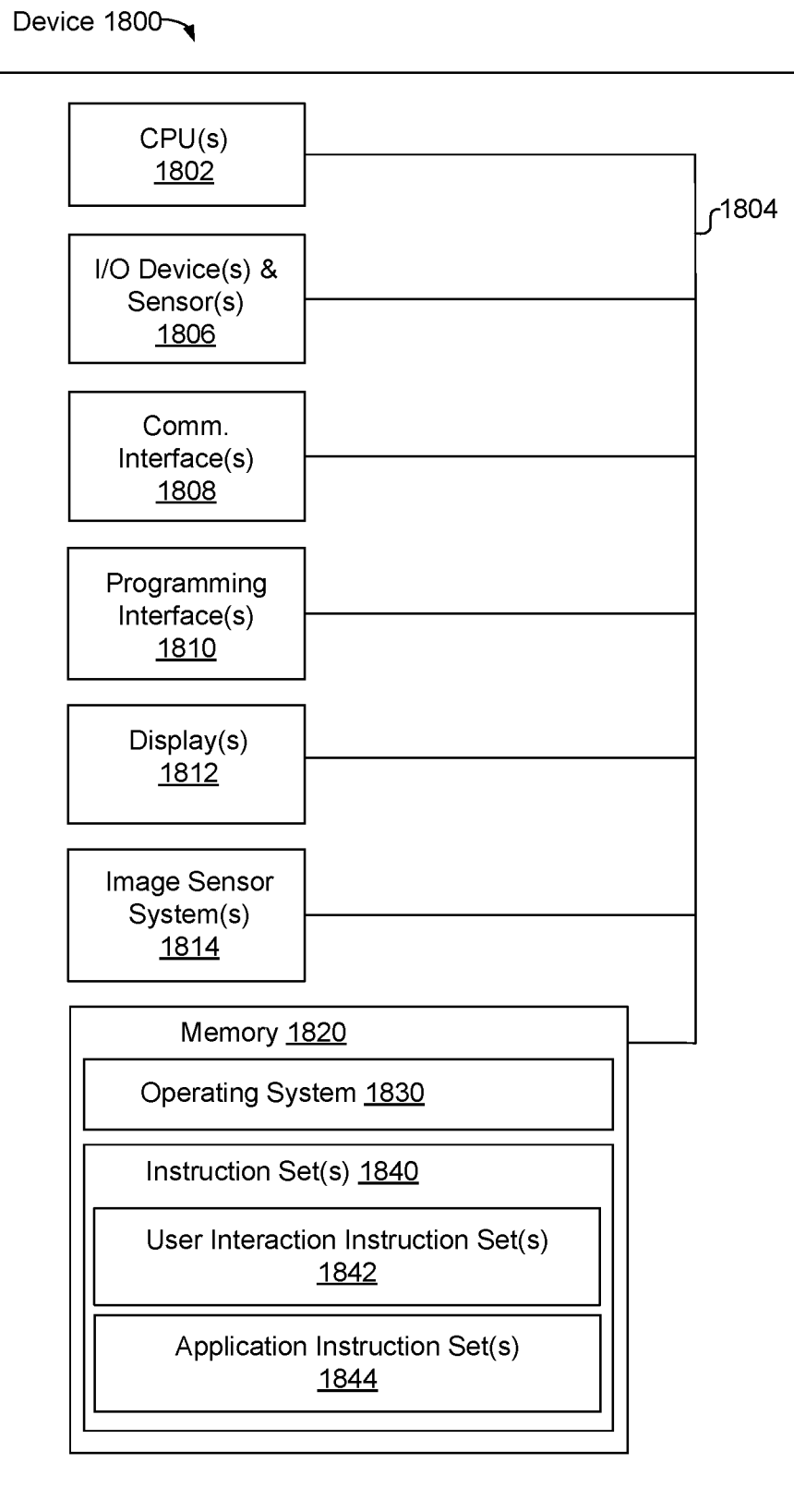
FIG. 18 is a block diagram of an electronic device of in accordance with some implementations.

FIG. 18 is a block diagram of electronic device 1800. Device 1800 illustrates an exemplary device configuration for electronic device 110 or electronic device 105. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1800 includes one or more processing units 1802 (e.g., microprocessors, ASICs, FPGAs, GPUs, CPUs, processing cores, and/or the like), one or more input/output (I/O) devices and sensors 1806, one or more communication interfaces 1808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1810, one or more output device(s) 1812, one or more interior and/or exterior facing image sensor systems 1814, a memory 1820, and one or more communication buses 1804 for interconnecting these and various other components.

In some implementations, the one or more communication buses 1804 include circuitry that interconnects and controls communications between system components. In some implementations, the one or more I/O devices and sensors 1806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 1812 include one or more displays configured to present a view of a 3D environment to the user. In some implementations, the one or more displays 1812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 1800 includes a single display. In another example, the device 1800 includes a display for each eye of the user.

In some implementations, the one or more output device(s) 1812 include one or more audio producing devices. In some implementations, the one or more output device(s) 1812 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 1812 may additionally or alternatively be configured to generate haptics.

In some implementations, the one or more image sensor systems 1814 are configured to obtain image data that corresponds to at least a portion of a physical environment. For example, the one or more image sensor systems 1814 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1814 further include illumination sources that emit light, such as a flash. In various implementations, the one or more image sensor systems 1814 further include an on-camera image signal processor (ISP) configured to execute a plurality of processing operations on the image data.

The memory 1820 includes high-speed random-access memory, such as DRAM, SRAM, DDR RAM, or other random-access solid-state memory devices. In some implementations, the memory 1820 includes non-volatile memory, such as one or more magnetic disk storage devices, optical disk storage devices, flash memory devices, or other non-volatile solid-state storage devices. The memory 1820 optionally includes one or more storage devices remotely located from the one or more processing units 1802. The memory 1820 comprises a non-transitory computer readable storage medium.

In some implementations, the memory 1820 or the non-transitory computer readable storage medium of the memory 1820 stores an optional operating system 1830 and one or more instruction set(s) 1840. The operating system 1830 includes procedures for handling various basic system services and for performing hardware dependent tasks. In some implementations, the instruction set(s) 1840 include executable software defined by binary information stored in the form of electrical charge. In some implementations, the instruction set(s) 1840 are software that is executable by the one or more processing units 1802 to carry out one or more of the techniques described herein.

The instruction set(s) 1840 include user interaction instruction set(s) 1842 configured to, upon execution, identify and/or interpret user gestures and other user activities, including by performing fuzzy hit testing, as described herein. The instruction set(s) 1840 include application instruction set(s) 1844 for one or more applications. In some implementations, each of the applications is provided for as a separately-executing set of code, e.g., capable of being executed via an application process. The instruction set(s) 1840 may be embodied as a single software executable or multiple software executables.

Although the instruction set(s) 1840 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    at an electronic device having a processor:
        receiving, at an input support process, data corresponding to user activity in a 3D coordinate system corresponding to a 3D environment in which a plurality of user interface (UI) targets of a user interface are positioned;
        generating, at the input support process, a plurality of sample locations in the 3D coordinate system based on the data corresponding to the user activity;
        identifying, at the input support process, a subset of the plurality of UI targets within the 3D coordinate system for evaluation using a UI target selection criterion, the subset identified based on the plurality of sample locations;
        selecting, at the input support process, a UI target of the identified subset to associate with the user activity based on the evaluation of subset of the plurality of UI targets using the UI target selection criterion; and
        interpreting, at the input support process, the user activity as input associated with the selected UI target based on the selected UI target being associated with the user activity.

2. The method of claim 1, wherein selecting the UI target to associate with the user activity comprises:
    for each UI target of the identified subset, determining a point on the respective UI target based on the user activity; and
    prioritizing the UI targets of the subset based on the point computed for each respective UI target.

3. The method of claim 2, wherein determining the point on each of the respective UI targets comprises:
    determining a closest opaque point to a sample location associated with the user activity; and
    determining a distance of the closest opaque point of each of the respective UI targets to the sample location associated with the user activity.

4. The method of claim 2, wherein selecting the UI target to associate with the user activity is based on determining that a closest opaque point within the UI target is within an angular distance threshold of a sample location associated with the user activity.

5. The method of claim 2, wherein the UI target to associate with the user activity is selected based on:
    determining that closest opaque points within multiple UI targets are within an angular distance threshold of a sample location associated with the user activity; and
    selecting the UI target from the multiple UI targets based on a policy that ranks UI targets based on element type, UI layers, UI geometry, or hysteresis logic.

6. The method of claim 1, wherein the UI targets of the subset comprise:
    3D virtual objects; and
    2D elements defined by one or more applications.

7. The method of claim 1, wherein identifying the subset comprises:
    receiving, at the input support process, data corresponding to positioning of UI elements of an application within the 3D coordinate system, the data corresponding to the positioning of the UI element based at least in part on data provided by the application; and
    identifying the subset by identifying intersections of the plurality of gaze sample locations with the UI elements of the application positioned within the 3D coordinate system.

8. The method of claim 7, wherein the UI elements of the application occupy a two-dimensional (2D) region and the method further comprises, based on selecting the UI target to associate with the user activity, identifying a point within the 2D region to the application such that the application can recognize an action to associate with the UI element using a 2D app action recognition process.

9. The method of claim 7, wherein the data provided by the application comprises a layered tree structure defining the positional and containment relationships of the UI elements relative to one another on a two-dimensional (2D) coordinate system.

10. The method of claim 7, wherein the data provided by the application identifies external effects for some of the UI elements, wherein an external effect specifies that an operating system (OS) process is to provide responses to a specified user activity relative to a specified UI element outside of an application process.

11. The method of claim 1, wherein the data corresponding to the user activity is a gaze direction within the 3D coordinate system, the gaze direction determined based on sensor data.

12. The method of claim 1, wherein the data corresponding to the user activity is a synthesized direction within the 3D coordinate system, the direction determined based on:
    determining a hand position of a hand in the 3D coordinate system based on sensor data;
    determining an intersection position of the hand with at least one UI element based on the hand position; and
    determining the direction based on the intersection and a viewpoint position.

13. The method of claim 1, wherein the plurality of sample locations are generated by generating a pattern of rays around a gaze direction or a synthesized direction corresponding to user activity.

14. The method of claim 13, wherein the pattern of rays has between 2 and 100 rays.

15. The method of claim 13, wherein the pattern of rays has between 5 and 35 rays.

16. The method of claim 13, wherein the pattern of rays comprises an outer set of rays forming a shape.

17. The method of claim 16, wherein the shape is rotated relative to a horizon or a horizontal.

18. The method of claim 1, wherein the electronic device provides views of a 3D environment including the UI targets, wherein at least some of the UI targets are 2D user interface elements provided by one or more applications, wherein the input support process recognizes the user activity in the 3D coordinate system and provides data to the one or more applications to recognize 2D user interface input.

19. A system comprising: memory; and one or more processors coupled to the memory, wherein the memory comprises program instructions that, when executed by the one or more processors, cause the system to perform operations comprising:
    receiving, at an input support process, data corresponding to user activity in a 3D coordinate system corresponding to a 3D environment in which a plurality of user interface (UI) targets of a user interface are positioned;
    generating, at the input support process, a plurality of sample locations in the 3D coordinate system based on the data corresponding to the user activity;
    identifying, at the input support process, a subset of the plurality of (UI) targets within the 3D coordinate system for evaluation using a UI target selection criterion, the subset identified based on the plurality of sample locations;

selecting, at the input support process, a UI target of the identified subset to associate with the user activity based on the evaluation of subset of the plurality of UI targets using the UI target selection criterion; and interpreting, at the input support process, the user activity as input associated with the selected UI target based on the selected UI target being associated with the user activity.

20. The system of claim 19, wherein selecting the UI target to associate with the user activity comprises:

for each UI target of the identified subset, determining a point on the respective UI target based on the user activity; and prioritizing the UI targets of the subset based on the point computed for each respective UI target.

21. The system of claim 20, wherein determining the point on each of the respective UI targets comprises:

determining a closest opaque point to a sample location associated with the user activity; and determining a distance of the closest opaque point of each of the respective to the sample location associated with the user activity.

22. The system of claim 20, wherein selecting the UI target to associate with the user activity is based on determining that a closest opaque point within the UI target is within an angular distance threshold of a sample location associated with the user activity.

23. The system of claim 20, wherein the UI target to associate with the user activity is selected based on:

determining that closest opaque points within multiple UI targets are within an angular distance threshold of a sample location associated with the user activity; and selecting the UI target from the multiple UI targets based on a policy that ranks UI targets based on element type, UI layers, UI geometry, or hysteresis logic.

24. The system of claim 19, wherein the identified subset UI comprise:

3D virtual objects; and 2D elements defined by one or more applications.

25. A non-transitory computer-readable storage medium, storing program instructions computer-executable on a computer to perform operations comprising:

receiving, at an input support process, data corresponding to user activity in a 3D coordinate system corresponding to a 3D environment in which a plurality of user interface (UI) targets of a user interface are positioned;

generating, at the input support process, a plurality of sample locations in the 3D coordinate system based on the data corresponding to the user activity;

identifying, at the input support process, a subset of the plurality of UI targets within the 3D coordinate system for evaluation using a UI target selection criterion, the subset identified based on the plurality of sample locations;

selecting, at the input support process, a UI target of the identified subset to associate with the user activity based on the evaluation of subset of the plurality of UI targets using the UI target selection criterion; and interpreting, at the input support process, the user activity as input associated with the selected UI target based on the selected UI target being associated with the user activity.

* * * * *